United States Patent
Prinz et al.

(10) Patent No.: US 12,441,434 B2
(45) Date of Patent: Oct. 14, 2025

(54) MULTIPLE SPROCKET ARRANGEMENT AND MODULAR SPROCKET ARRANGEMENT SYSTEM

(71) Applicant: SRAM DEUTSCHLAND GmbH, Schweinfurt (DE)

(72) Inventors: Alexander Prinz, Hassfurt (DE); Jakob Rohmer, Wuerzburg (DE); Sebastian Heigl, Wuerzburg (DE); Sven Buechner, Bergrheinfeld (DE); Andreas Vonend, Schweinfurt (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 18/545,194

(22) Filed: Dec. 19, 2023

(65) Prior Publication Data
US 2024/0208608 A1 Jun. 27, 2024

(30) Foreign Application Priority Data

Dec. 23, 2022 (DE) .................... 10 2022 134 676.5
Dec. 15, 2023 (DE) .................... 10 2023 135 307.1

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC .. B62M 9/12; F16H 55/12; F16H 9/06; F16H 55/30
USPC .......................................................... 474/160
See application file for complete search history.

(56) References Cited

U.S. PATENT DOCUMENTS

| | | | | |
|---|---|---|---|---|
| 8,197,371 B2* | 6/2012 | D'Aluisio | ............... | B62M 9/12 301/110.5 |
| 8,956,254 B2* | 2/2015 | Tokuyama | ............... | B62M 9/12 474/160 |
| 9,701,364 B2* | 7/2017 | Sugimoto | .............. | B62M 9/105 |
| 10,308,316 B2* | 6/2019 | Braedt | ...................... | B62M 6/55 |
| 10,378,637 B2* | 8/2019 | Ooishi | .................... | B62M 9/10 |
| 10,703,441 B2* | 7/2020 | Dos Santos | ............ | F16H 55/08 |
| 10,800,487 B2* | 10/2020 | Emura | ..................... | F16H 55/30 |
| 10,900,547 B2* | 1/2021 | Braedt | ...................... | F16H 9/24 |
| 10,927,940 B2* | 2/2021 | Ooishi | .................... | B62M 9/10 |
| 10,933,946 B2* | 3/2021 | Braedt | .................. | B62M 9/121 |
| 11,072,203 B2* | 7/2021 | Bots | ......................... | F16D 1/10 |

(Continued)

FOREIGN PATENT DOCUMENTS

| DE | 102010027228 | 5/2011 |
|---|---|---|
| DE | 102018111277 | 12/2018 |

(Continued)

*Primary Examiner* — Henry Y Liu

(57) ABSTRACT

A multiple sprocket assembly for assembly in a torque-transmitting manner in terms of a bicycle rear axle on a bicycle rear wheel driver device, and a modular system for generating multiple sprocket assemblies. The multiple sprocket assembly comprises an inboard terminating sprocket arrangement, a first sprocket cluster which is connectable to the inboard terminating sprocket arrangement, and an outboard terminating sprocket arrangement. The first sprocket cluster is configured to be rotatable on an outboard side in relation to the driver device by a rotational bearing device of the multiple sprocket assembly.

19 Claims, 21 Drawing Sheets

(56) References Cited

U.S. PATENT DOCUMENTS

| | | | |
|---|---|---|---|
| 11,618,531 B2* | 4/2023 | Carrasco Vergara | B62M 9/10 474/158 |
| 11,655,003 B2* | 5/2023 | Emura | F16H 55/06 474/160 |
| 11,724,772 B2* | 8/2023 | Marangon | F16H 55/30 474/160 |
| 11,767,079 B2* | 9/2023 | Geist | B21D 53/28 474/160 |
| 11,767,080 B1* | 9/2023 | Fujita | B60B 27/04 474/160 |
| 11,772,741 B2* | 10/2023 | Fujita | B62M 9/10 474/160 |
| 11,912,373 B2* | 2/2024 | Vonend | B62M 9/12 |
| 2008/0004143 A1* | 1/2008 | Kanehisa | B62M 9/10 474/160 |
| 2009/0042679 A1* | 2/2009 | Valle | B62M 9/10 474/160 |
| 2010/0004081 A1* | 1/2010 | Braedt | B62M 9/10 474/160 |
| 2010/0009794 A1* | 1/2010 | Chiang | B62M 9/10 474/160 |
| 2012/0220402 A1* | 8/2012 | D'Aluisio | B62M 9/12 474/160 |
| 2012/0302384 A1* | 11/2012 | Braedt | B62M 9/10 474/160 |
| 2012/0309572 A1* | 12/2012 | Braedt | B62M 9/10 474/160 |
| 2013/0017914 A1* | 1/2013 | Braedt | F16D 1/108 403/299 |
| 2013/0225343 A1* | 8/2013 | Spahr | B60B 27/023 474/160 |
| 2016/0083045 A1* | 3/2016 | Lin | F16H 55/30 474/160 |
| 2016/0176477 A1* | 6/2016 | Bernardele | B62M 9/12 474/160 |
| 2016/0200395 A1* | 7/2016 | Braedt | B62M 9/10 403/299 |
| 2016/0362159 A1* | 12/2016 | Braedt | F16H 55/30 |
| 2017/0217539 A1* | 8/2017 | Braedt | B62M 9/10 |
| 2018/0022415 A1* | 1/2018 | Oishi | B62M 9/10 474/160 |
| 2018/0022416 A1* | 1/2018 | Oishi | B62M 9/12 474/160 |
| 2018/0178880 A1* | 6/2018 | Akanishi | B62M 9/10 |
| 2018/0194433 A1* | 7/2018 | Dos Santos | B62M 9/1248 |
| 2018/0202531 A1* | 7/2018 | Ooishi | B62M 9/10 |
| 2019/0225302 A1* | 7/2019 | Emura | F16H 55/30 |
| 2019/0248445 A1* | 8/2019 | Braedt | B62M 6/55 |
| 2019/0359285 A1* | 11/2019 | Emura | B62M 9/10 |
| 2020/0062033 A1* | 2/2020 | Bots | F16D 1/10 |
| 2021/0261218 A1* | 8/2021 | Vonend | B62M 9/12 |
| 2021/0284281 A1* | 9/2021 | Carrasco Vergara | B62M 9/121 |
| 2022/0135180 A1* | 5/2022 | Marangon | F16H 55/30 474/160 |

FOREIGN PATENT DOCUMENTS

| | | |
|---|---|---|
| DE | 102021000448 | 8/2021 |
| EP | 3533701 | 11/2019 |

\* cited by examiner

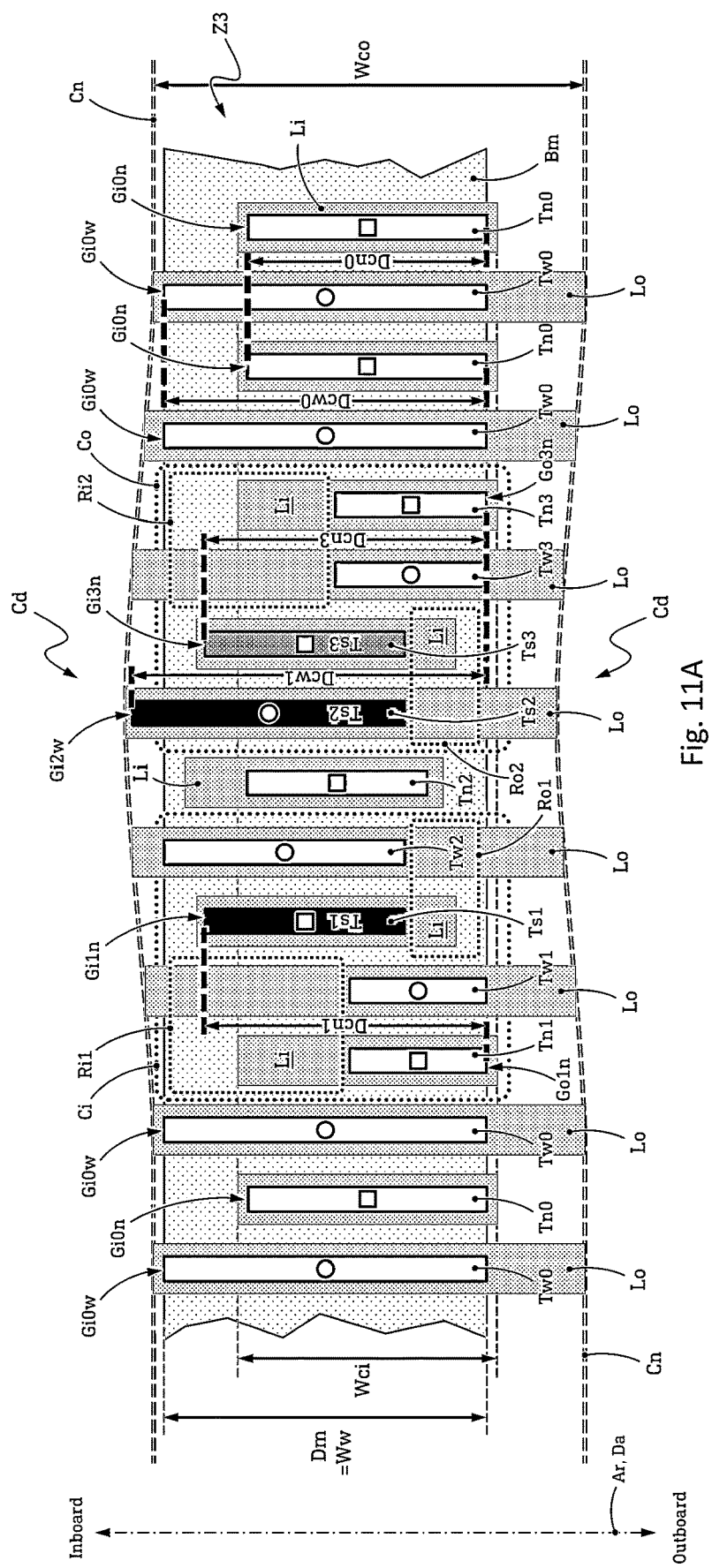
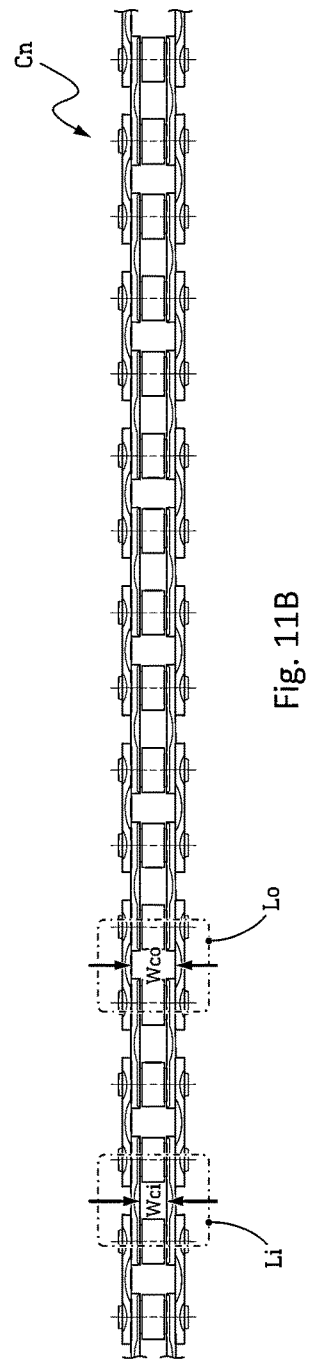
Fig. 11A
Fig. 11B

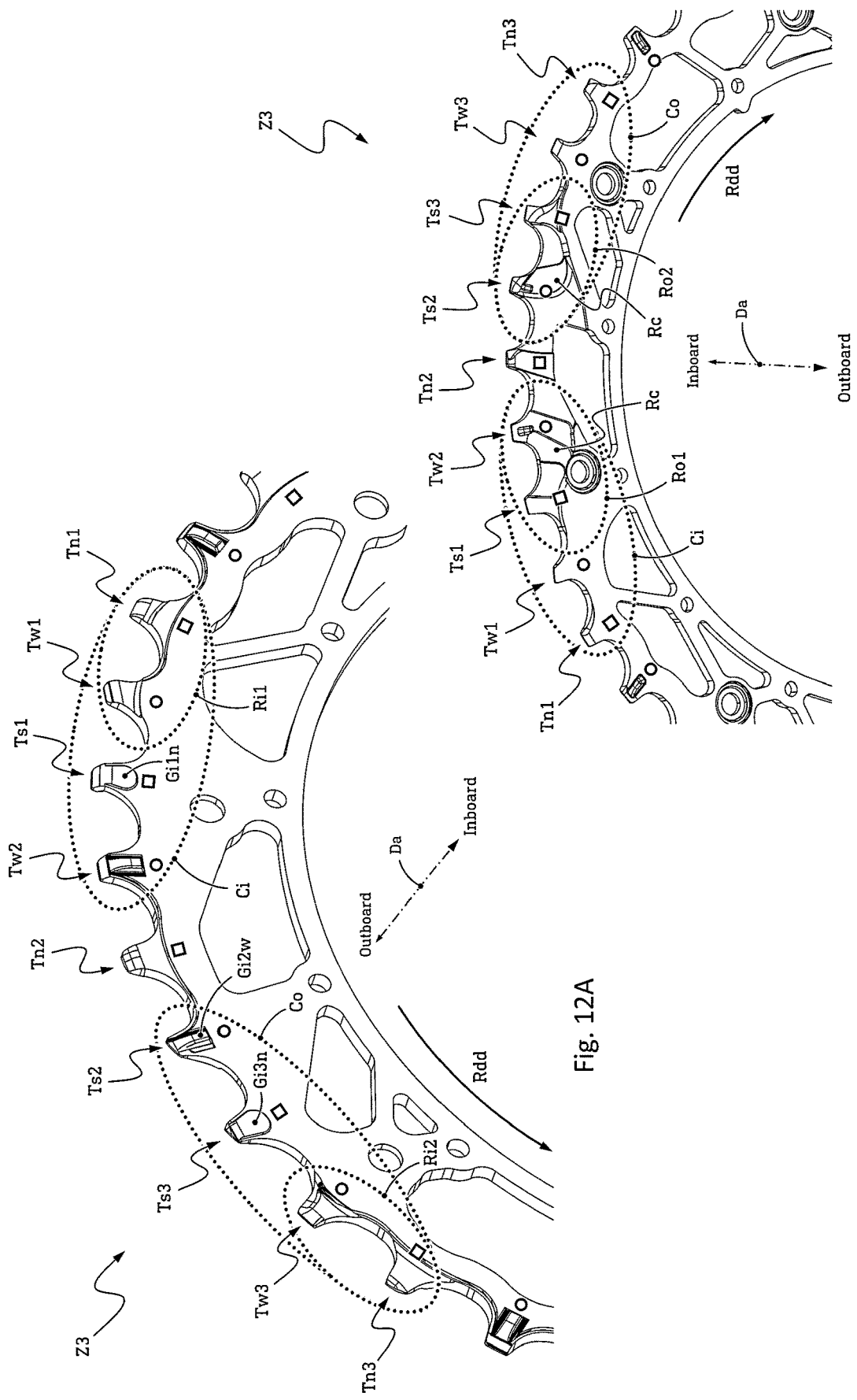

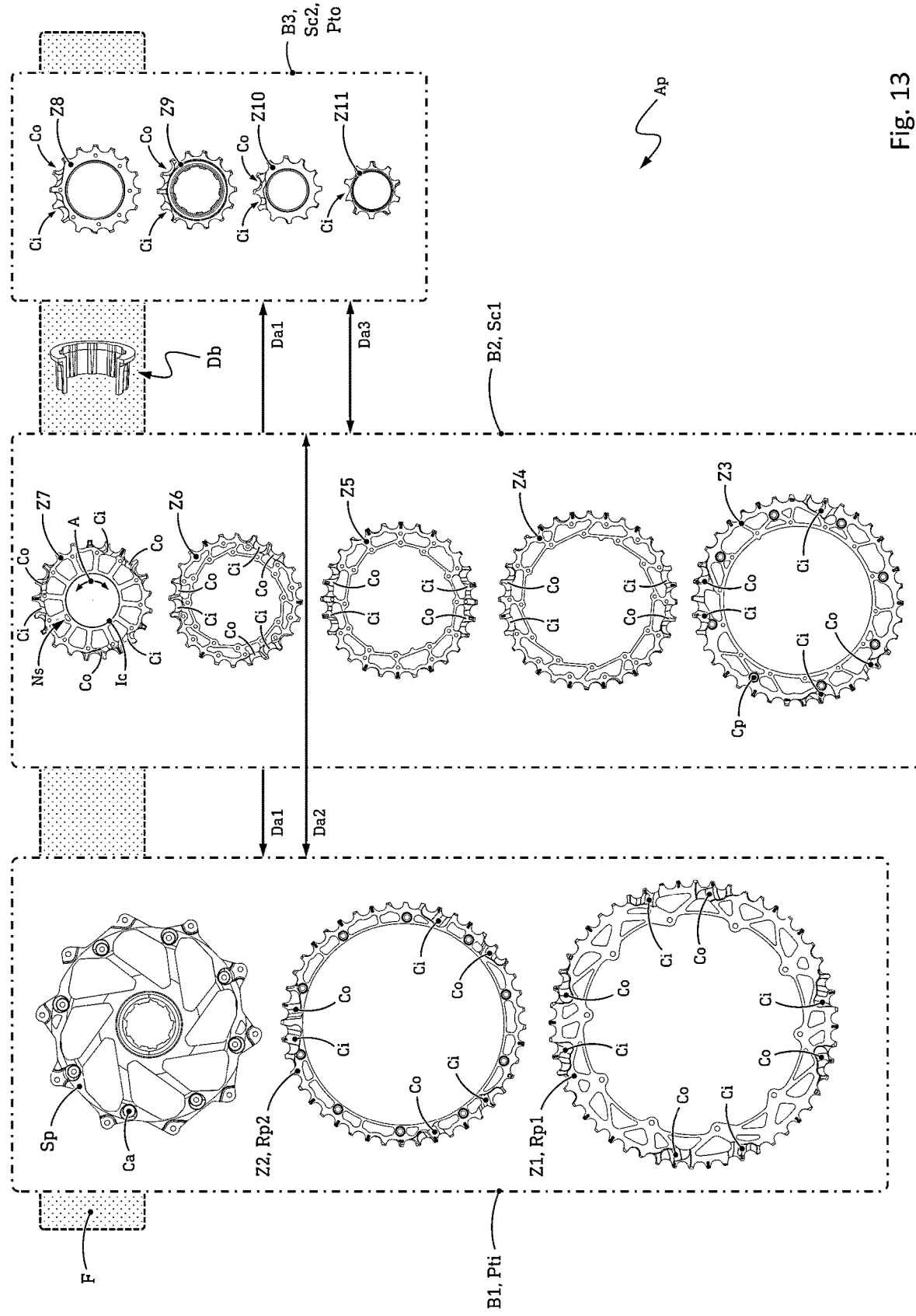

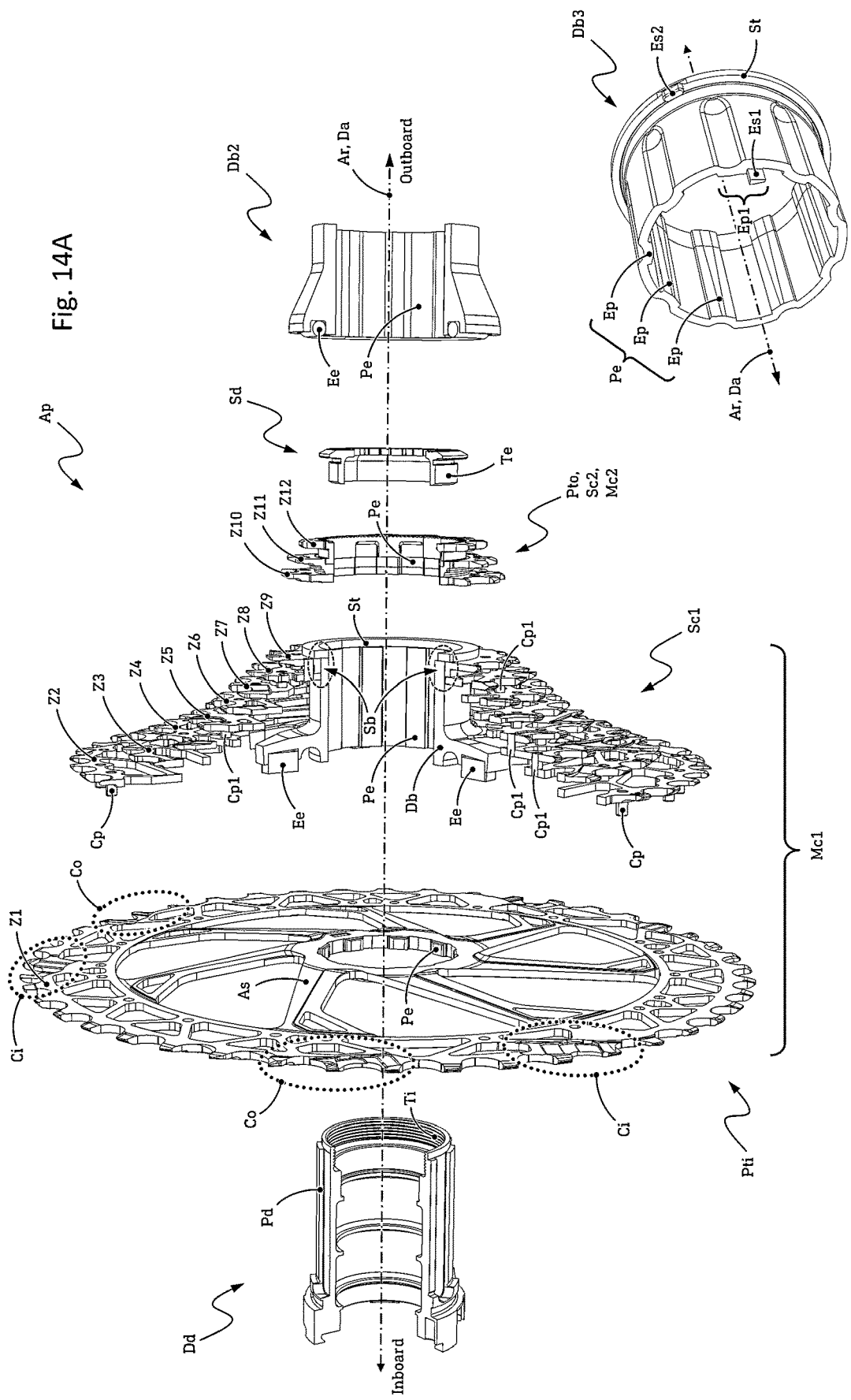

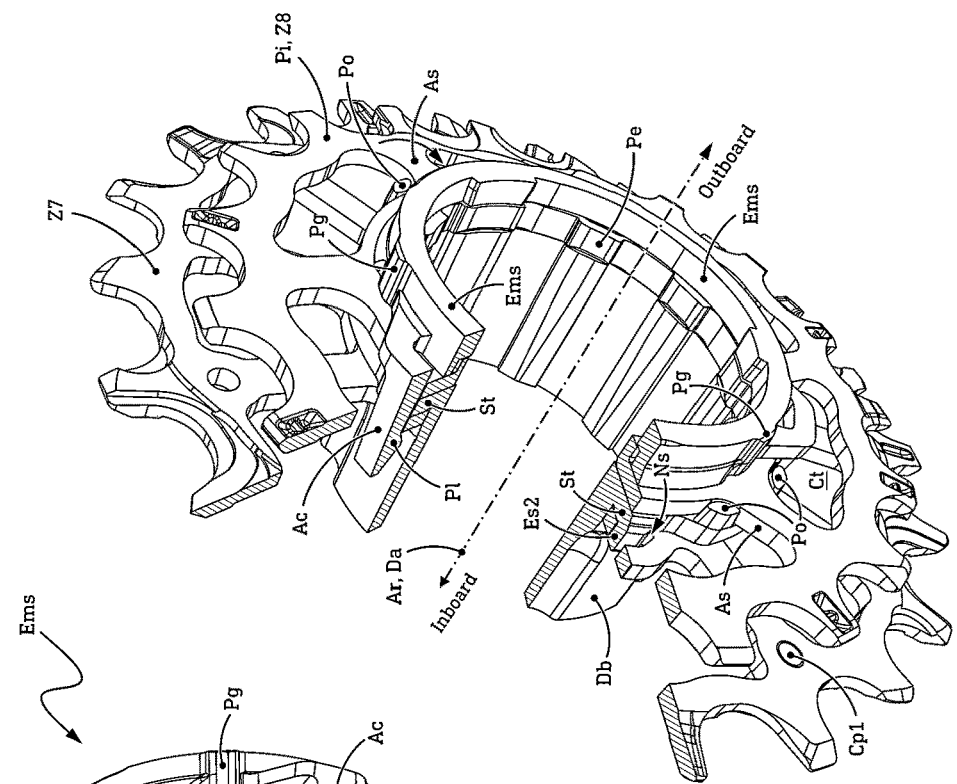
Fig. 17B
Fig. 17C
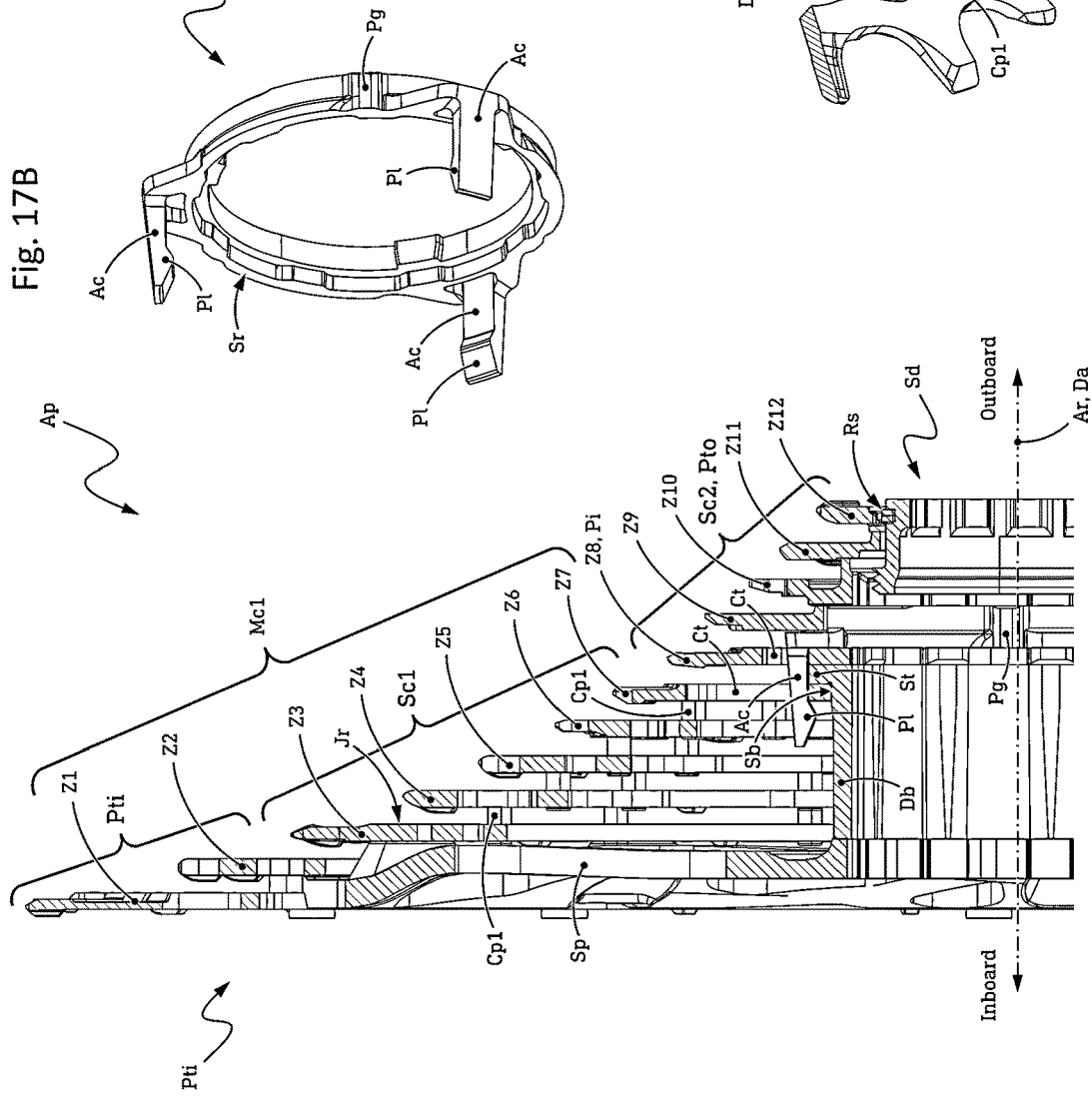
Fig. 17A

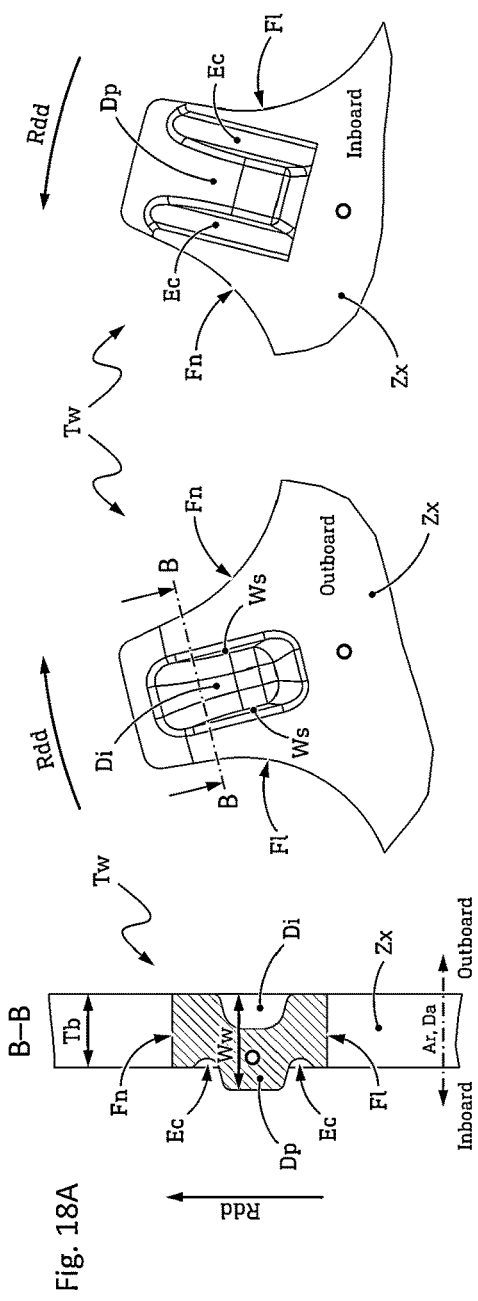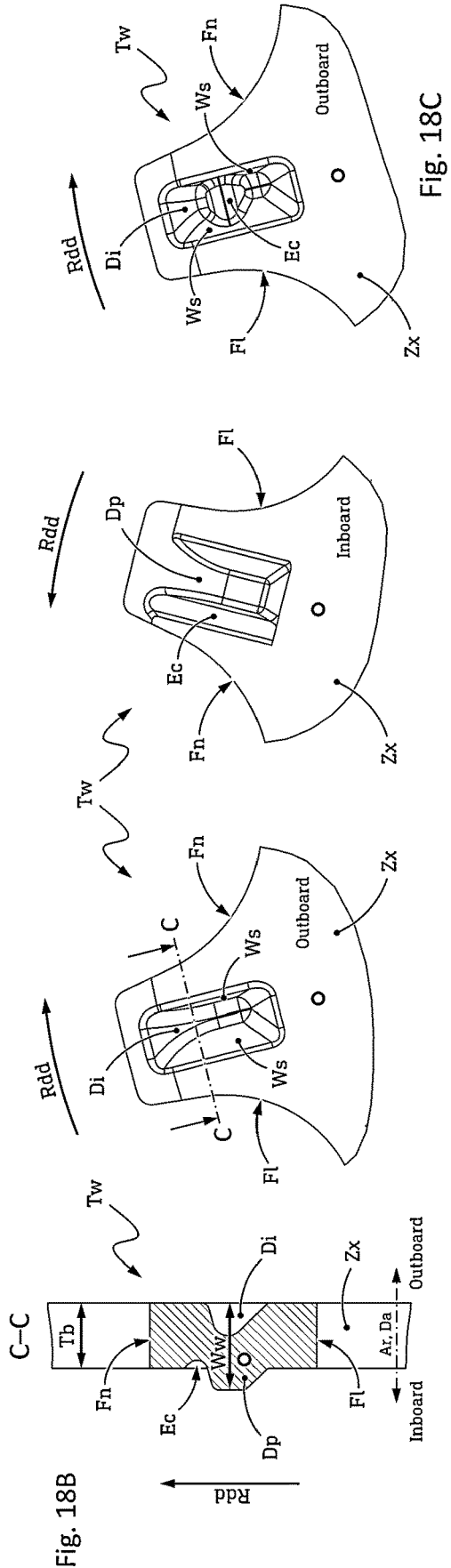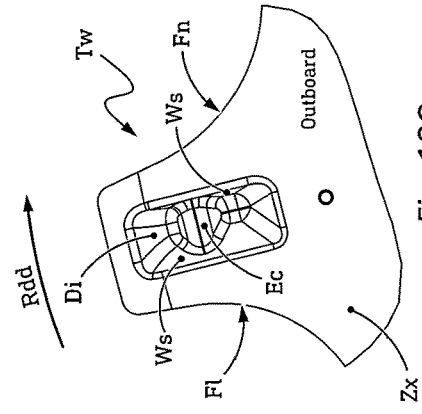
Fig. 18A
Fig. 18B
Fig. 18C

MULTIPLE SPROCKET ARRANGEMENT AND MODULAR SPROCKET ARRANGEMENT SYSTEM

This application claims priority to German Patent application 10 2022 134 676.5, filed on Dec. 23, 2022, and German Patent application 10 2023 135 307.1, filed on Dec. 15, 2023, the contents of which are hereby incorporated by reference in their entirety.

FIELD OF THE DISCLOSURE

This disclosure relates generally to bicycle components and, more specifically, to multiple sprocket arrangements for bicycles.

BACKGROUND

Generic multi-sprocket assemblies, which in the bicycle industry and in the description hereunder are also synonymously referred to as sprocket cassettes or cassettes form a constituent part of the drive train on the bicycle that serves for transmitting the propulsion force from the chainring on the bicycle bottom bracket bearing to the rear wheel.

A bicycle is usually equipped with a drive train, for example a chain drive train. Bicycle drive trains of this type serve for transmitting a drive torque from a rider to a rear running wheel of the bicycle, so as to drive the bicycle in this way. For example, such a bicycle drive train can transmit the torque from a front chain arrangement via a chain to a rear sprocket, for instance a sprocket of a multi-gear sprocket cassette, so as to drive the rear running wheel.

Front chain wheel arrangements for bicycle drive trains can have one or a plurality of front chain wheels, which are also referred to as chainrings in the industry.

The rear chain wheels on the bicycle are usually referred to as sprockets. A plurality of rear chain wheels or sprockets can be referred to as cassette, sprocket cassette or sprocket pack. Such a sprocket cassette is typically configured in such a way that it can be fastened to a freewheel part of a rear running wheel. For this purpose, a sprocket cassette can be fastened to a freewheel member of a rear running wheel with the aid of, for example, a multi-groove connection, or a driven profile, and/or with the aid of a threaded connection.

Bicycle sprocket cassettes comprise a multiplicity of sprockets spaced apart in the axial direction of the rear axle, having staggered, different tooth counts. Depending on the gear ratio chosen by the rider, the bicycle chain is placed onto one of the sprockets by means of a rear derailleur, thereby determining—in conjunction with the tooth count of a chainring on the bottom bracket bearing—the gear ratio and the parameters exerted by the rider, such as torque and pedaling frequency.

In recent years, the bicycle industry, in particular in the field of mountain bikes, has moved towards reducing the number of bottom bracket bearing chainrings from traditionally three chainrings of different sizes first to two, and in the meantime in most instances to only a single chainring, at least in the top-end market. The drive train can be significantly simplified with such bicycles drives, which are also known as "single" or "1×" bicycle drives, and the reliability and low-maintenance characteristic can be enhanced in the process. Moreover, the shift activation and shift logic, which in this instance is reduced to only one shift lever, is significantly simplified for the rider.

Furthermore, the front derailleur in the area of the bottom bracket bearing is thereby also dispensed with, as are the actuation thereof and the installations on the bicycle frame and the handlebar required for fastening said derailleur. A noticeable reduction in the weight of the bicycle is also associated with the omission of the front derailleur, additional chainrings and shift levers and accessories.

In most instances, a plurality of chainrings for shifting are also dispensed with in bicycles with electric auxiliary drives, inter alia for reasons of installation space and in order to simplify the drive train, in favor of only one chainring.

As that participating factor of the gear ratio range on the bicycle that was previously provided by a plurality of chainrings on the bottom bracket bearing and typically was in the range from 180 to 200% is now dispensed with, it has become necessary, however, to substantially increase the gear ratio range provided by the sprocket cassette.

This necessity has led to the development of sprocket cassettes which have very small sprockets with as few as 11 teeth and fewer, in particular down to 9 teeth, on the outboard side, and very large sprockets with as many as 50 teeth and more on the inboard side. In this way, these cassettes reach gear ratio ranges in the order of magnitude of up to or over 500% and thus provide a suitable gear ratio for almost all cycling situations.

However, sprocket cassettes with large inboard sprockets of this type lead, inter alia, to weight issues, in particular when the sprocket cassette is traditionally assembled largely from individual disc-shaped sprockets, wherein each sprocket is directly connected to the freewheel driver of the rear wheel hub.

In order to address in particular the weight-related issues of such sprocket cassettes, two fundamental primary concepts have been pursued to date. One of these concepts is the use of so-called sprocket spiders in which a plurality of adjacent ring sprockets are disposed on a common carrier.

A ring sprocket is defined in that—as opposed to a disc-shaped cassette sprocket or stub sprocket—it is not disposed directly on the driver of the rear wheel hub and not connected thereto in a torque-transmitting manner, but is configured as a ring which is comparatively narrow in radial terms.

In sprocket cassettes with a spider construction, the connection to the driver and the torque transmission from the sprocket toothing to the driver therefore takes place so as to be pooled for in most instances two or a plurality of adjacent ring sprockets which are each conjointly fastened to one sprocket spider.

However, the large number of sprockets on current cassettes, typically in the range of ten and more sprockets, leads to the necessity of either providing a plurality of relatively flat spiders and of fastening in each case typically 2 to 4 sprockets to each of the flat spiders, or of embodying an individual sprocket spider three-dimensionally, having a substantial thickness or extent in the axial direction, so as to be able to accommodate a multiplicity of ring sprockets next to one another on the spider.

These two known approaches to designing spider sprocket cassettes are thus sub-optimal with a view to the desired weight reduction, and moreover lead to a complex construction of the cassette with numerous functional groups which are complex to manufacture and assemble.

A further known concept for reducing the weight of sprocket cassettes with a very high gear ratio range lies in configuring the sprocket cassette so as to be an at least partially self-supporting sprocket cluster, which is also referred to as a dome cassette in the industry.

Here, all sprockets—with the exception of the largest inboard sprocket—are often milled from one piece of solid material, or else as many as possible of the intermediate sprockets situated between the largest and the smallest sprocket are configured as ring sprockets which are typically connected to one another by connecting elements such as rivets or pins so as to form a conical or frustoconical, self-supporting, three-dimensional support structure. The latter variant is also referred to as a pinned sprocket cluster in the industry.

Generally, and independently of the manufacturing technology, a self-supporting sprocket cluster can be defined as consisting of three or more sprockets, having an inboard terminating sprocket and an outboard terminating sprocket, wherein the inboard and the outboard terminating sprocket each can be connected to connection components such as spiders, carrier sprockets, mini-clusters or drivers. In contrast, the third sprocket, or usually a plurality of intermediate sprockets disposed between the inboard and the outboard terminating sprocket of the sprocket cluster, is/are disposed so as to be cantilevered, thus do not have any dedicated or direct connection to the spider, carrier sprocket or driver. Instead, these intermediate sprockets are only connected directly to the inboard and/or the outboard terminating sprocket, or indirectly thereto by way of additional adjacent sprockets.

However, the sprocket cluster concept is also approaching its limits due to the ever increasing numbers of gears and sprocket sizes. Sprocket clusters milled from a solid material require ever larger blanks and more complex and thus more expensive production steps, while pinned sprocket clusters, owing to the multiplicity of pin or rivet structures disposed in series, cause an ever increasing complexity in production, above all due to the tolerance chains associated therewith.

Sprocket cassettes with a self-supporting sprocket cluster of a smaller size, in which one or a plurality of further sprockets, which are configured, for example, in the form of a multiple-part or integral mini-cluster, adjoin the sprocket cluster on the outboard side, have been developed against this background. Sprocket cassettes of this type are known, for example, from publication DE 10 2010 027 228 A1.

In these sprocket cassettes, the outboard terminating sprocket of the sprocket cluster is fixedly axially clamped between adjacent functional groups of the sprocket cassette on the outboard side, for example between a mini-cluster and a tubular distance piece. In particular when the smaller sprockets of the sprocket cluster are impinged with a comparatively high torque, this may lead to uncontrolled microrotations of the clamped outboard terminating sprocket due to the torsional elasticity of the sprocket cluster. In turn, these microrotations can lead to significant vibrations and thus to undesirable crunching or squeaking noises. Moreover, the durability of the sprocket cluster may be compromised if microrotations of this type arise frequently.

SUMMARY

An example multiple sprocket assembly disclosed herein for assembly in a torque-transmitting on a driver of a bicycle rear axle. The driver has a toothed driven profile disposed on an outer circumference of a driver device. The multiple sprocket assembly comprises a plurality of sprocket arrangements having in each case at least one sprocket. The plurality of sprocket arrangements includes an inboard terminating sprocket arrangement, a first sprocket cluster configured to be connectable to the inboard terminating sprocket arrangement, and an outboard terminating sprocket arrangement. A rotational bearing device for mounting of the first sprocket cluster so as to be rotatable on an outboard side in relation to the driver device.

An example modular system disclosed herein for generating multi-sprocket assemblies comprises three functional groups which comprises an inboard terminating sprocket arrangement, a first sprocket cluster, and an outboard terminating sprocket arrangement. The three functional groups are interchangeable in a modular manner. At least one of the three functional groups is able to be assigned to a functional group family of at least two members and, while retaining the other functional groups, is interchangeable with another member of the functional group family which, for example, is made of another material or is of a different manufacturing quality. A rotational bearing device for mounting of the first sprocket cluster so as to be rotatable on the outboard side in relation to the driver device. The rotational bearing device is formed by a distance unit which, in a state of the multiple sprocket assembly in which it is assembled on the driver device, is specified to establish the relative distances in an axial direction of the bicycle rear axle and to transmit assembly tensioning forces in the axial direction of the bicycle rear axle between the functional groups.

BRIEF DESCRIPTION OF THE DRAWINGS

FIG. 11A shows a fragment of a schematic flat developed view of a sprocket of the sprocket assembly according to FIGS. 2 to 11, having a bicycle chain running thereon.

FIG. 11B shows a bicycle chain of a drive train according to FIG. 1 in a schematic illustration.

FIG. 12A shows the sprocket according to FIG. 11A in an oblique view from the rear.

FIG. 12B shows the sprocket according to FIG. 11A and FIG. 12A in a frontal view.

FIG. 13 shows an overall illustration of a modular system for generating multi-sprocket assemblies according to FIGS. 2 to 10 or 14.

FIG. 14A shows a further embodiment of a sprocket assembly having a first sprocket cluster which is rotatably mounted outboard on a bearing device, conjointly with an associated driver device.

FIG. 14B shows an alternative embodiment of a bearing device for the sprocket assembly according to FIG. 14A.

FIG. 17A is an axial longitudinal section of the sprocket arrangement shown in FIG. 16.

FIG. 17B shows a multi-function spacer element of the sprocket arrangement according to FIGS. 16 and 17A.

FIG. 17C shows an arrangement consisting of multi-function spacer element, intermediate sprocket, outboard-side end sprocket of the first sprocket cluster and bearing device in highly perspective sectional view.

FIGS. 18A-C are schematic sectional or detailed views of sprocket teeth of a sprocket arrangement according to FIGS. 2 to 17C.

DETAILED DESCRIPTION

Figure 1:
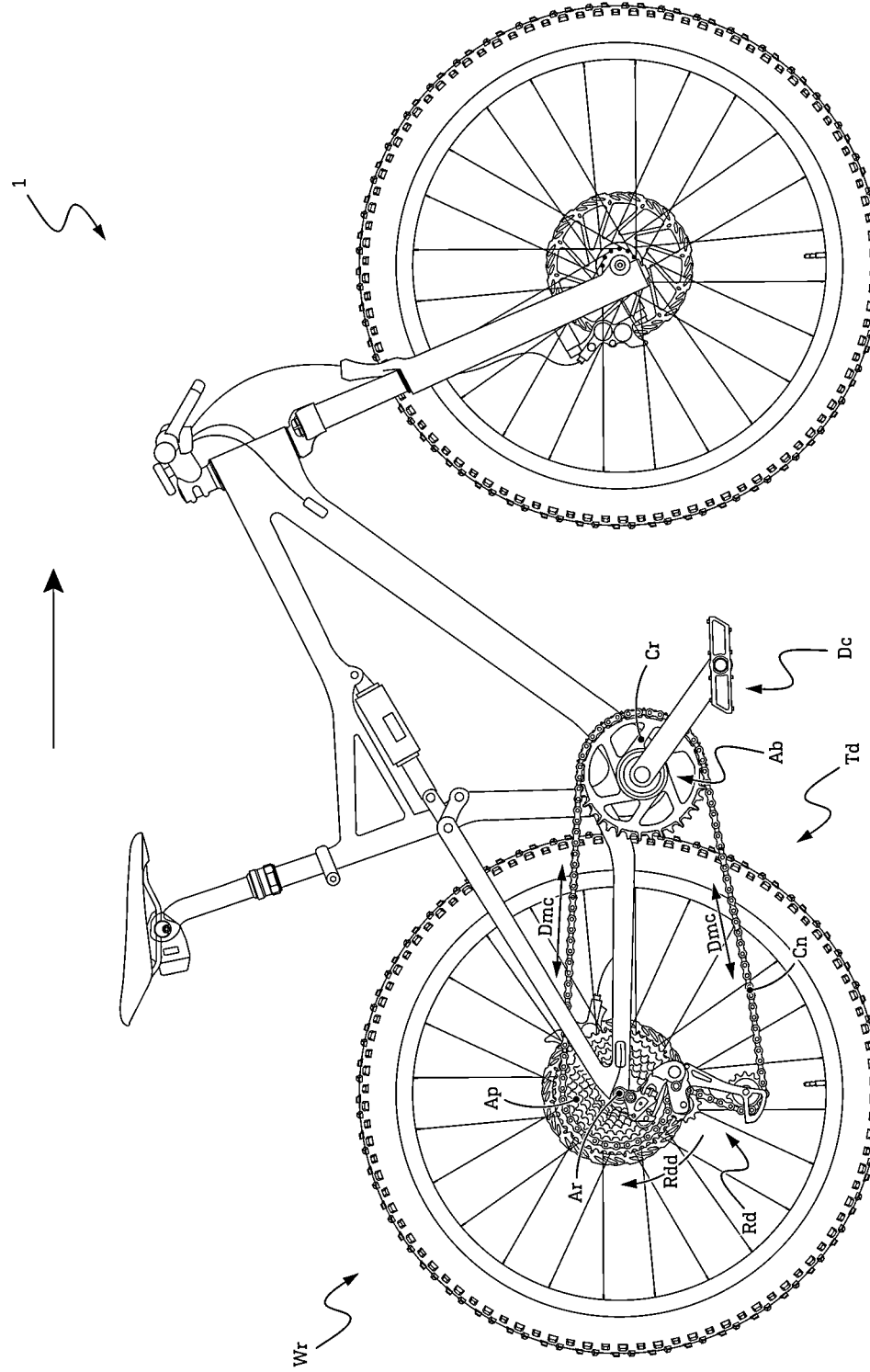
FIG. 1 shows a bicycle having a chain drive train and a sprocket assembly.

Proceeding from the prior art described above, it is the object of the present disclosure to provide a sprocket cassette, or multiple sprocket assembly, and a modular system for generating sprocket cassettes or multi-sprocket assemblies, by way of which the above-described disadvantages can be overcome.

As per the generic type, the multi-sprocket assembly is provided for assembly—in a torque-transmitting manner in terms of a bicycle rear axle—on a bicycle rear wheel driver device. A matching driver device for receiving the sprocket assembly typically has a toothed driven profile which is disposed on the outer circumference of the driver device, while the sprocket assembly has an engagement profile which, for engaging in a form-fitting, torque-transmitting manner in the driven profile of the driver device, corresponds in terms of shape to the driven profile of the driver device.

The sprocket assembly comprises a plurality of sprocket arrangements, wherein each sprocket arrangement has at least one sprocket which has corresponding sprocket teeth and is provided for engaging in a torque-transmitting manner with a bicycle chain. The sprocket arrangements of the sprocket assembly include inter alia an inboard terminating sprocket arrangement, a first sprocket cluster, in particular self-supporting sprocket cluster, which has a plurality of sprockets and is connectable or is connected to the inboard terminating sprocket arrangement in a connection area of the inboard terminating sprocket arrangement, and an outboard terminating sprocket arrangement.

The sprocket assembly according to the present disclosure is distinguished by a rotational bearing device by means of which the first sprocket cluster in the area of its outboard side is mounted so as to be rotatable in relation to the driver device.

In contrast, as described at the outset, the first sprocket cluster in the prior art is typically received on the outboard side in a clamping manner so as to be in a force flow running in the axial direction of the rear axle between adjacent sprockets, sprocket arrangements, or distance elements of the sprocket assembly, and is thus not rotatably mounted.

When the sprockets of the first sprocket cluster, in particular the smaller outboard sprockets of the first sprocket cluster, are impinged with a driving torque, the first sprocket cluster will attempt to inherently twist elastically. When a specific limit torque is exceeded, this leads, in the outboard clamping of the first sprocket cluster, to the breakaway torque of this clamping action being exceeded, as a result of which the first sprocket cluster in the outboard clamping abruptly starts to rotate by a minor angular value.

The breakaway of this outboard clamping of the first sprocket cluster and the subsequent rotation of the first sprocket cluster in the outboard clamping often lead to undesirable noises such crunching and squeaking. Due to the uncontrolled occurrence of this breakaway effect and the associated abrupt change in the force flows in the first sprocket cluster, and due to the heavy vibrations arising in the process, this may also compromise the durability of the first sprocket cluster.

These undesirable effects are avoided thanks to the mounting of the first sprocket cluster on a rotational bearing device so as to be rotatable on the outboard side in relation to the driver device according to the present disclosure. The mounting of the first sprocket cluster so as to be rotatable on the outboard side leads, when the sprockets of the first sprocket cluster, in particular the smaller sprockets of the first sprocket cluster on the outboard side, are impinged with a driving torque, to the first sprocket cluster being able to rotate in a controlled manner on the outboard side and thus inherently deform elastically without strong breakaway effects or vibrations arising in the first sprocket cluster in the process. This improves the durability of the first sprocket cluster and prevents the generation of undesirable noises such as crunching and squeaking. Owing to the durability being improved in this way, the first sprocket cluster can also be embodied with generally thinner walls and thus with a lighter weight.

According to one embodiment, the bearing device is formed by a distance unit which, in a state in which the sprocket assembly is assembled on the driver device, is at the same time specified to establish a relative distance between at least two sprocket arrangements of the sprocket assembly in the axial direction of the rear axle.

The bearing device herein is configured to transmit an assembly tensioning force in the axial direction of the rear axle between at least two sprocket arrangements of the sprocket assembly, wherein, in a state in which the sprocket assembly is assembled on the driver device, the assembly tensioning force is part of a closed force flow running substantially parallel to the rear axle through the driver device and the sprocket assembly.

The bearing device is particularly configured to establish the relative distance between the inboard and the outboard terminating sprocket arrangement in the axial direction of the rear axle, and also to transmit the assembly tensioning force between the inboard and the outboard terminating sprocket arrangement.

Advantageous multiple functions of the bearing device are derived from the aforementioned embodiments, not only for the mounting of the first sprocket cluster so as to be rotatable on the outboard side, but also as an axial tensioning element for assembling the sprocket assembly on the driver device, and likewise as a distance element for establishing the relative distance between at least two sprocket arrangements of the sprocket assembly.

The bearing device is configured to establish the relative axial distance between the inboard terminating sprocket arrangement and an outboard sprocket of the first sprocket cluster. In this way, the bearing device, in its dual function as a distance device, ensures that the correct width of the first sprocket cluster is established.

The bearing device is particularly configured with multiple functions for establishing the relative distances in the axial direction of the rear axle and for transmitting the assembly tensioning forces in the axial direction of the rear axle between the inboard and the outboard terminating sprocket arrangement, and the outboard sprocket of the first sprocket cluster, in other words for establishing all relevant relative distances and for transmitting all substantial assembly tensioning forces between the inboard and the outboard terminating sprocket arrangement as well as the outboard sprocket of the first sprocket cluster.

The bearing device is likewise composed of a non-metallic material, for example of an organic polymer. As a result, production costs can be saved, corrosion is avoided, and the micromovements of the sprocket arrangements of the sprocket assembly, in particular the elastic rotation of the outboard terminating sprocket of the first sprocket cluster, are facilitated without undesirable noises or vibrations being created as a result.

According to one embodiment, it is provided that the outboard terminating sprocket arrangement comprises an additional sprocket cluster which is configured as a substantially integral module. A substantially integral module herein is to be understood to mean sprocket clusters which are either materially integral, for example milled from solid material, or such sprocket clusters which are assembled from a plurality of sprocket arrangements or sprockets, for example by welding, laser welding or by pinning or riveting, or the like.

The additional sprocket cluster has on an inner circumference an engagement profile for allowing the sprocket cluster to engage in a torque-transmitting manner in the driven profile of the driver device, wherein the engagement profile of the additional sprocket cluster is configured so as to correspond in terms of shape to the driven profile of the driver device.

According to a further embodiment, the sprocket assembly comprises a closure screw device which is specified to engage in an outboard internal thread of the driver device for assembling and fastening the sprocket assembly on the driver device. By means of the closure screw device, the additional sprocket cluster can be pushed or pressed onto the driver device along an axial direction of the rear axle in relation to the bearing device. Established in this way is a closed force flow which runs substantially parallel to the rear axle through the driver device and through the sprocket assembly and which connects the sprocket assembly and the driver device.

A further embodiment provides that the additional sprocket cluster comprises at least one sprocket of which the tooth root diameter is smaller than the outer diameter of the driver device in the area of the driven profile. In this respect, a sprocket center plane of this at least one sprocket, or sprocket center planes of two sprockets of the additional sprocket cluster, runs/run, in a state of the sprocket assembly in which it is assembled on the driver device, outside an axial end face of the driver device on the outboard side.

This makes it possible that sprockets with a particularly low tooth count can be included in the sprocket assembly, thus enabling the advantageous enlargement of the gear ratio range of the sprocket assembly. In particular, the additional sprocket cluster can in this way comprise one or a plurality of sprockets of which the tooth root diameter, and thus the maximum possible inner diameter thereof, is smaller than the outer diameter of the driver device in the area of the driven profile of the driver device.

Nevertheless, the fastening of such particularly small sprockets, and the torque transmission from these sprockets to the driver device, are guaranteed in that the additional sprocket cluster, in particular on the inboard side and in particular in the area of at least one sprocket of the sprocket cluster of which the tooth root diameter is larger than the outer diameter of the driver device, has on an inner circumference an engagement profile which corresponds in terms of shape to the driven profile of the driver device.

The above embodiments which relate to the additional sprocket cluster can also be implemented independently of the presence of the rotational bearing device, or the distance unit, described further above.

According to a further embodiment, it is provided that the sprocket assembly, in a state in which it is assembled on the driver device, has three axial portions mutually spaced apart in the axial direction of the rear axle, which have in each case on an inner circumference an engagement profile that corresponds in terms of shape to the driven profile of the driver device, for engaging in a form-fitting and torque-transmitting manner in the driven profile.

For this purpose, at least one additional sprocket arrangement is disposed in the axial direction between the first sprocket cluster and the additional sprocket cluster. The additional sprocket arrangement has on an inner circumference an engagement profile that corresponds in terms of shape to the driven profile of the driver device, for engaging in a form-fitting and torque-transmitting manner in the driven profile of the driver device.

In this way, a triple torque-transmitting connection between the sprocket assembly and driver device is derived, specifically at three different locations which are mutually spaced apart axially on the rear axle. The triple torque-transmitting connection takes place on the inboard terminating sprocket arrangement, on the additional sprocket arrangement disposed between the first sprocket cluster and the additional sprocket cluster, and on the additional sprocket cluster. More than one additional sprocket arrangement can be provided, for example two or more additional sprocket arrangements, resulting in a four-fold or multiple torque-transmitting connection between the sprocket arrangement and the driver device.

This serves to achieve module-specific optimized load paths between the inboard terminating sprocket arrangement and the driver device, between the additional sprocket arrangement and the driver device, and between the additional sprocket cluster and the driver device. As a result of the load paths which in this way can be optimized for each of these modules and the load situation thereof, in particular the respective typical torque load thereof, the durability and the operational reliability of the sprocket assembly can be increased or the dimensions thereof can be accordingly reduced.

According to a further embodiment, the teeth of at least one even-numbered sprocket, a plurality of or all even-numbered sprockets, of the sprocket assembly are assigned in an alternating manner in the circumferential direction to either a narrow or wide tooth group, wherein the teeth of the narrow tooth group are narrow teeth, and wherein the wide tooth group comprises at least one wide tooth or a plurality of wide teeth.

Narrow teeth are such teeth which are narrower than the available width, or the inner link clear width, of an inner chain link of a bicycle chain which is assigned to the sprocket assembly, and is thus provided for operation with the sprocket assembly, in such a way that narrow teeth of this type can thus completely plunge into, or engage in, the chain link intermediate space of the inner chain links of the bicycle chain. Wide teeth are teeth which are wider than the available width, or the inner link clear width, of the inner chain links of a bicycle chain assigned to the sprocket assembly, in such a manner that the wide teeth can indeed plunge into the outer chain link intermediate space of the outer chain links of the bicycle chain, but not into the inner link intermediate space of the inner chain links of the bicycle chain.

The design of even-numbered sprockets alternating with narrow and wide teeth, also known in the industry as thick-thin chain wheels, or chain wheels or sprockets with thick-thin teeth, significantly improves the stability of the normal run of the chain on the respective sprocket, thus of the substantially straight run of the chain, as long as no shifting procedure takes place.

This improvement in the stability of the run of the chain by wide and narrow sprocket teeth disposed in an alternating manner can be traced back above all to the fact that the chain, as opposed to customary chain wheels or sprockets which have only narrow teeth, is guided laterally on the chain wheel or the sprocket not only in the area of the inner chain links, but due to the presence of the at least one wide tooth, or the plurality of wide teeth, is also imparted lateral guiding in the area of the outer chain links.

Using the sprocket assembly according to the present disclosure, it is possible for the most current sprocket technology of thick-thin sprockets to be combined with the standard driver devices or standard cassette hubs which have been known for decades, and thus to be adapted to almost every bicycle or rear running wheel, respectively, which has a standard driver device or standard cassette hub of this type.

The above embodiment, which relates to thick-thin sprockets, can also be implemented independently of the presence of the rotational bearing device, or distance unit, described further above.

A further embodiment of the sprocket assembly according to the present disclosure is distinguished in that at least one sprocket of the sprocket assembly has, in the area of at least one outboard shift channel of the sprocket and/or in an area adjacent to the at least one outboard shift channel, in an area of an inboard shift channel of the sprocket adjacent to the outboard shift channel, at least one stabilization tooth which is assigned to the narrow tooth group and/or at least one stabilization tooth which is assigned to the wide tooth group. The inboard chain guiding surface of the at least one stabilizing tooth projects in the inboard direction beyond the inboard chain guiding surface of a widest tooth of the same tooth group in such a manner that the chain, when running, in particularly normally, on the sprocket, is deflected inboard by the inboard-projecting inboard chain guiding surface of the at least one stabilization tooth.

The normal run of the chain, or normal chain run, is the chain run in which the chain and the sprocket assembly are moved in the drive direction, or counter to the drive direction, of a drive train of the bicycle without a shifting procedure, or a change of gear, thus a changeover of the chain from one sprocket of the sprocket assembly to another, adjacent sprocket of the sprocket assembly, takes place in the process.

The inboard deflection of the chain during the normal run of the chain on the sprocket thus takes place due to the effect of the at least one stabilization tooth, wherein the stabilization tooth is disposed in the area of an outboard shift channel of the sprocket of the sprocket assembly. Alternatively or additionally, the inboard deflection of the chain during the normal run of the chain can also take place in an area of the sprocket that is adjacent to the outboard shift channel, in particular in an area of an inboard shift channel adjacent to the outboard shift channel, whilst, alternatively or additionally to the aforementioned stabilization tooth, a stabilization tooth is disposed in this area.

The inboard deflection of the chain caused by the at least one stabilization tooth during the normal run of the chain stabilizes and improves the straight run of the chain on the sprocket of the sprocket assembly in particular in the area of the inboard shift channel. In other words, as a result of the effect of the stabilization tooth, the chain is slightly deflected inboard in the area of the inboard shift channel, this preventing that the chain, in the area of the inboard shift channel, which like an outboard shift channel has in particular outboard recesses in the area of the sprocket teeth, undesirably shifts outboard, which could compromise the uniform and jolt-free shifting procedure, disturb the synchronous run of the chain on the thick-thin teeth of the sprocket assembly, and also lead to damage of the sprocket assembly and/or the chain—at least when shifting under load.

A further advantage of the inboard chain guiding surface of the stabilization tooth that is displaced inboard lies in that the stabilization tooth in this way is imparted a greater tooth width, which increases the resistance of the stabilization tooth to deformation and wear. This is particularly advantageous when the stabilization tooth is situated in the area of a shift channel, as is preferably the case, and thus has an outboard recess, or a reduced outboard tooth width, which may otherwise compromise the stability of the tooth.

A stabilization tooth with the same characteristics of an inboard chain guiding surface, which is displaced inboard in relation to the inboard chain guiding surface of the widest tooth of the same tooth group, and which in this way likewise leads to the chain, during the normal run of the chain, being deflected inboard by said tooth's inboard chain guiding face that projects inboard, can additionally or alternatively also be characterized by an enlarged cross-tooth chain guide dimension, as explained hereunder.

In the thin or narrow teeth of a thick-thin sprocket, a cross-tooth chain guide dimension corresponds to the distance between an inboard chain guiding surface of a first narrow tooth and an outboard chain guiding surface of an additional narrow tooth adjacent to the first narrow tooth, thus of the next narrow tooth of the thick-thin sprocket that precedes or follows the first narrow tooth.

The width, and in particular the position (axially with respect to the rear axle) of the cross-tooth chain guide dimension of adjacent narrow teeth determines, at least in the area of these teeth, the relative axial position—with respect to the rear axle—of the chain on the sprocket, because the outboard inner face of a chain inner link is guided by the outboard chain guiding surface of the first narrow tooth, and the inboard inner face of an adjacent chain inner link is simultaneously guided by the inboard chain guiding surface of the additional narrow tooth adjacent to the first narrow tooth.

If therefore the position of the cross-tooth chain guide dimension of two narrow teeth is changed along the axial direction—with respect to the rear axle—relative to a sprocket centre plane, the relative axial position—with respect to the rear axle—of the chain in relation to the sprocket centre plane also changes accordingly.

Since the stabilization tooth is characterized in that its inboard chain guiding surface is displaced inboard in relation to the inboard chain guiding surface of a widest tooth associated with the same tooth group, the position of a cross-tooth chain guide dimension assigned to the stabilization tooth i.e. of a cross-tooth chain guide dimension in the axial direction with respect to the rear axle, that is formed for the chain by the stabilization tooth conjointly with a following tooth along a circumferential direction of the sprocket, thus also changes.

As a result, the position of the cross-tooth chain guide dimension in the area of the stabilization tooth is in particular likewise displaced inboard. Moreover, the cross-tooth chain guide dimension assigned to the stabilization tooth is potentially thereby also enlarged in relation to the cross-tooth chain guide dimensions of the remaining teeth of the tooth group of the stabilization tooth, this leading to a slightly oblique run of the chain in the area of the cross-tooth chain guide dimension and thus contributing towards the desired inboard displacement of the chain.

The person skilled in the art will recognize that the above example of a narrow stabilization tooth, which is thus assigned to the narrow tooth group of the thick-thin teeth, can also be applied analogously to wide stabilization teeth, while retaining the same principle. With a view to a wide stabilization tooth, a cross-tooth chain guide dimension which in the area of a wide stabilization tooth is displaced inboard in relation to the cross-tooth chain guide dimensions of other wide teeth can likewise be defined in an analogous manner. The cross-tooth chain guide dimension of a wide tooth can also potentially be configured to be wider than the cross-tooth chain guide dimensions of other wide teeth, this likewise again leading to a slightly oblique run of the chain in the area of the cross-tooth chain guide dimension of the stabilization tooth and thus contributing towards the desired inboard displacement of the chain in the area of the stabilization tooth.

This also results in the run of the chain being deflected inboard in the area of the wide stabilization tooth, having the same effects and advantages as described above with regard to the narrow stabilization tooth.

The person skilled in the art also understands that the narrow and wide stabilization teeth according to the present disclosure can be combined with one another in such a way that at least one narrow as well as at least one wide stabilization tooth, which conjointly cause the chain run displaced inboard as desired and thus prevent undesirable outboard shifting in the area of the shift channel, can be situated in the area of an outboard shift channel and/or in an area of a thick-thin sprocket adjacent to the outboard shift channel, in particular in an area of an inboard shift channel adjacent to the outboard shift channel.

Furthermore, the person skilled in the art recognizes that the principle of the wide or narrow stabilization teeth, which displace inboard the chain run in the area of an outboard shift channel so as to prevent undesirable inboard shifting of the chain in the area of the outboard shift channel, can also be applied in an analogous manner to wide or narrow stabilization teeth which displace outboard the chain run in the area of an inboard shift channel so as to prevent undesirable outboard shifting of the chain in the area of the inboard shift channel.

For this purpose, an outboard chain guiding surface of the stabilization tooth is displaced outboard in relation to the outboard chain guiding surface of the remaining teeth of the same tooth group in such a way that a cross-tooth chain guide dimension assigned to the stabilization tooth is likewise displaced outboard and potentially also widened. In this way, the chain run is displaced outboard in the area of the stabilization tooth, as a result of which the undesirable inboard shifting in the area of the outboard shifting channel can be prevented.

Finally, it is also apparent to the person skilled in the art that the principle of the stabilization tooth, which displaces inboard or outboard the normal run of the chain depending on the positioning of the displaced chain guiding surface of the stabilization tooth in specific areas of the sprocket, can also be implemented independently of the presence of thick-thin teeth. In other words, stabilization teeth having an inboard chain guiding surface displaced inboard, or an outboard chain guiding surface displaced outboard, can also be used in standard sprockets without thick-thin technology, thus in sprockets in which substantially all teeth are thin sprocket teeth which can thus engage in the inner link clear width of the inner chain links of the bicycle chain.

Against this background of the use of stabilization teeth on a sprocket without thick-thin teeth and/or an odd-numbered sprocket, further embodiments (hereunder referred to as variants 1 and 2) of the sprocket assembly lie in that at least one sprocket of the sprocket assembly has at least one stabilization tooth in the area of at least one outboard shift channel of the sprocket and/or in an area adjacent to the at least one outboard shift channel, preferably in an area of an inboard shift channel of the sprocket that is adjacent to the outboard shift channel (variant 1: for preventing the outboard shifting at an undesirable location), alternatively in the area of at least one inboard shift channel of the sprocket and/or in an area adjacent to the at least one inboard shift channel, preferably in an area of an outboard shift channel of the sprocket that is adjacent to the inboard shift channel (variant 2: for preventing the inboard shifting at an undesirable location). The inboard chain guiding surface (variant 1), or the outboard chain guiding surface (variant 2), of the at least one stabilization tooth herein projects in the inboard direction (variant 1) or outboard direction (variant 2) in relation to the inboard chain guiding surface (variant 1) or in relation to the outboard chain guiding surface (variant 2) of the other teeth of the sprocket, or in relation to a widest tooth of the sprocket, in such a manner that the chain, when running on the sprocket, in particular in the normal chain run, is deflected inboard (variant 1) or outboard (variant 2) by the inboard chain guiding surface projecting inboard (variant 1) or by the outboard chain guiding surface projecting outboard (variant 2) of the at least one stabilization tooth.

As an alternative to a projecting inboard chain guiding surface (variant 1) or outboard chain guiding surface (variant 2) of the at least one stabilization tooth, the stabilization tooth can also be distinguished in that, conjointly with an adjacent tooth, it forms a cross-tooth chain guide dimension which is larger than the width of the other teeth of the sprocket, or larger than the widest tooth of the sprocket, and/or which is displaced inboard (variant 1) or outboard (variant 2) in relation to the cross-tooth chain guide dimension of the other teeth of the sprocket or of the widest sprocket tooth.

In terms of definitions and explanations pertaining to the cross-tooth chain guide dimension, reference is made to the introduction to the description and to the description with reference to FIG. 11A.

The above embodiments, which relate to the at least one stabilization tooth, can also be implemented independently of the presence of the rotational bearing device or distance unit of the sprocket cassette, as described further above.

Furthermore, the present disclosure relates to a modular system for generating multi-sprocket assemblies. The modular system comprises at least the functional groups "inboard terminating sprocket arrangement", "first sprocket cluster", and "outboard terminating sprocket arrangement", which can be interchanged in a modular manner. At least one of the functional groups that can be interchanged in a modular manner herein belongs to a functional group family having at least two family members, or can be assigned to such a functional group family, or—while retaining the remaining functional groups—is interchangeable so as to replace another member of the functional group family which is composed of another material, for example, or is of a different manufacturing quality than the at least one other member of the same functional group family.

This means that a functional group family is defined, or can be defined, for the at least one functional group, and comprises at least two family members in the sense of at least two differently configured variants of the at least one functional group which are mutually interchangeable.

Using the example of the outboard terminating sprocket arrangement, which can be formed, for example, by an additional sprocket cluster, a functional group family can be understood to mean a family, or series, of additional sprocket clusters of different construction, of different materials, or of different manufacturing quality. For example, an additional sprocket cluster assembled from individual sprockets by laser-welding, and an additional sprocket cluster produced from individual sprockets by pinning or riveting, can form the foundation of a functional group family for the outboard terminating sprocket arrangement.

Using the example of the inboard terminating sprocket arrangement of the sprocket assembly according to the present disclosure, a carrier sprocket of steel and a carrier sprocket of aluminium can form the foundation of a functional group family for the inboard terminating sprocket arrangement, for example.

For example, it is provided that different spider sprockets, sprocket spiders, ring sprockets or carrier sprockets of different materials, for example of steel, aluminium and titanium, and/or sprocket spiders, ring sprockets or carrier sprockets with different surface treatment, are provided within a functional group family for the inboard terminating sprocket arrangement. Likewise, the foundation of a functional group family can potentially be formed by, for example, a sprocket spider having sprocket rings that can be fastened thereto, and by a spider sprocket having at least one sprocket ring that can be fastened thereto, as long as the connection interfaces to the adjacent modular functional group, presently thus to the first sprocket cluster, are identical on the sprocket spider as well as on the spider sprocket in such a way that the first sprocket cluster can selectively be connected to the sprocket spider or to the spider sprocket.

While retaining the remaining functional groups, thus while retaining the first sprocket cluster and the outboard terminating sprocket arrangement in the exemplary case discussed above, a plurality of sprocket assemblies can in this way be provided for different specific applications and of different quality with little complexity in terms of development and production.

The same applies in an analogous manner to the other functional groups of the sprocket assembly, thus for example to an outboard terminating sprocket arrangement which is interchangeable in a modular manner, or to a first sprocket cluster which is interchangeable in a modular manner.

Thanks to the modular system, sprocket assemblies with different functionalities or value propositions for different target groups or target markets can be easily realized in this way, by selecting materials of different density and strength, or a different production mode or surface quality, for the various modular functional groups of the modular system.

Overall, the modular system results in a multiplicity of variants for the sprocket assembly according to the present disclosure, which can in each case be suitable, or be optimized, for different price or market segments and for specific applications associated therewith, for example for occasional leisure use in one market segment up to extreme use in sports in another market segment. This is possible without having to deviate from the modular fundamental construction of the sprocket assembly, and without the entire sprocket assembly having to be newly developed and separately produced in terms of all of the individual parts.

Unless expressly mentioned otherwise, locational or directional indications such as "left", "right", "front", "rear", "top", "bottom", etc. used in the present disclosure correspond to the perspective of the rider of a bicycle. The same applies in an analogous manner to directional indications which are customary in the industry, such as "inboard" (left, or towards the left, or in the direction towards a larger sprocket of a sprocket cassette) and "outboard" (right, or towards the right, or in the direction towards a smaller sprocket of a sprocket cassette), and which relate to shifting procedures, or directions or sprocket positions on a sprocket cassette of a bicycle rear wheel.

FIG. 1 shows a bicycle 1 having a drive train Td, wherein the drive train Td comprises a crank assembly Dc which is rotatably mounted on a bottom bracket bearing device Ab and has a chainring Cr, a sprocket assembly Ap which conjointly with a rear wheel Wr is rotatably mounted on a rear wheel axle Ar, a drive chain Cn and a rear derailleur Rd for shifting gears. The arrow Rdd indicates the direction of rotation of the rear wheel Wr or the sprocket arrangement Ap when driven by the bicycle chain Cn.

Figure 2:
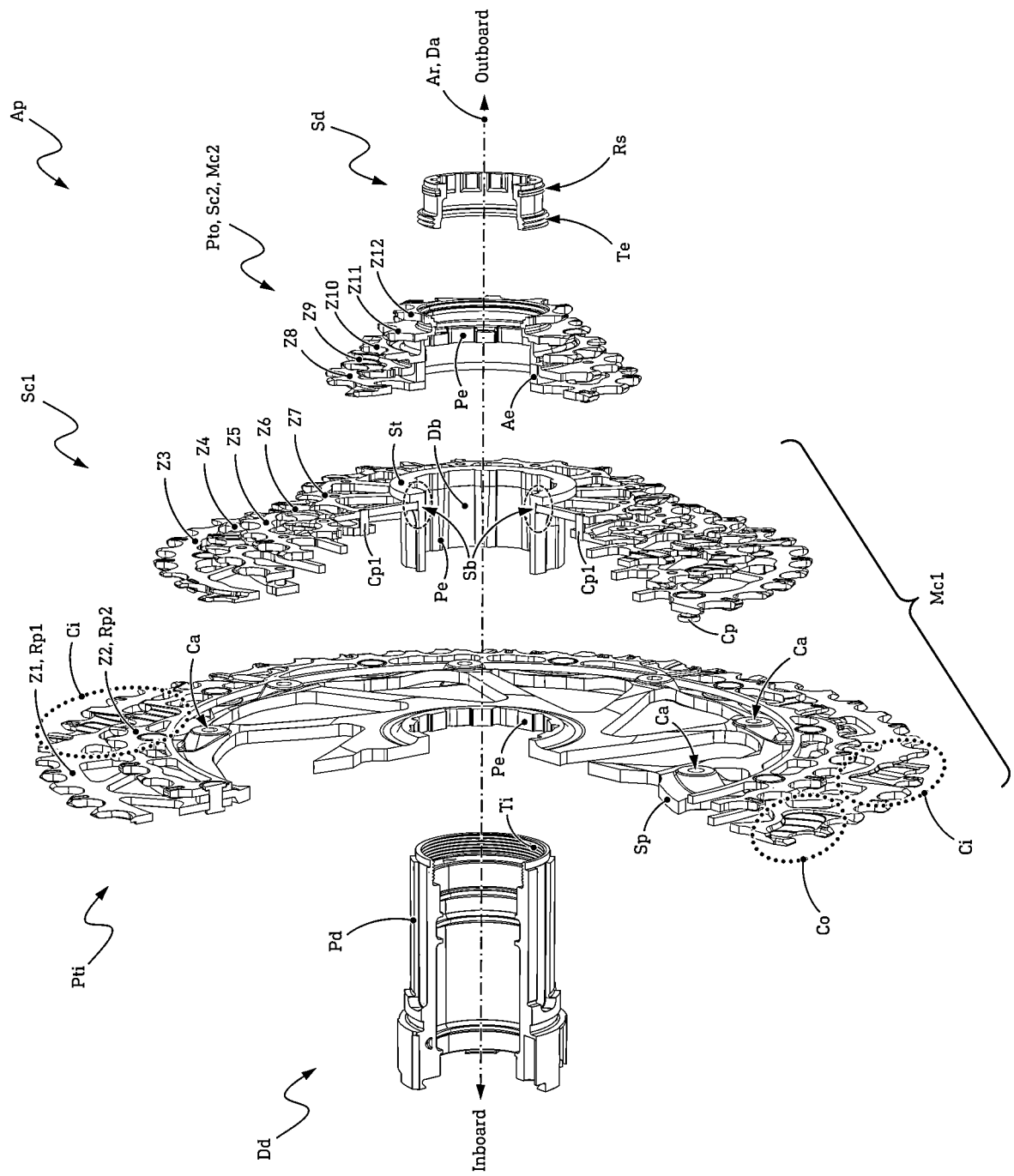
FIG. 2 shows a multiple sprocket assembly having a first sprocket cluster which is rotatably mounted outboard on a rotational bearing device in an isometric, partially sectional, exploded illustration, conjointly with an associated driver device.

FIG. 2 shows a sprocket assembly Ap according to the present disclosure, conjointly with a driver device Dd. The driver device Dd is provided in the usual manner conjointly with a freewheel device (not illustrated) for assembly on a rear wheel hub of the bicycle 1 so as to transmit torque in the driving direction. The driver device Dd comprises in particular a customary toothed driven profile Pd which is disposed on an outer circumference. The driver device Dd can in particular be a standard driver device Dd as has been widely used for decades in the bicycle industry in so-called standard cassette hubs.

The sprocket assembly Ap comprises at least one engagement profile Pe which is configured so as to correspond in terms of shape to the driven profile Pd of the driver device Dd, in order for the sprocket assembly Ap to engage in a torque-transmitting manner with the driver device Dd.

To be seen is the modular construction of the sprocket assembly Ap, which comprises an inboard terminating sprocket arrangement Pti, a self-supporting first sprocket cluster Sc1, and an outboard terminating sprocket arrangement Pto. The inboard terminating sprocket arrangement Pti and the first sprocket cluster Sc1 together define a cassette module Mc1.

The sprocket cluster Sc1 can be connected to, or is connectable to, the inboard terminating sprocket arrangement Pti in a connection area Ca of the inboard terminating sprocket arrangement Pti, for example by means of pins or rivets Cp. The connection between the inboard terminating sprocket arrangement Pti and the sprocket cluster Sc1 can alternatively also take place by way of a threaded connection and/or an adhesive bond in the connection area Ca.

Furthermore to be seen is a closure screw device Sd which serves for assembling and fastening the sprocket assembly Ap on the driver device Dd, as well as a bearing device Db on which the first sprocket cluster Sc1 is mounted on its outboard side on a bearing section Sb, configured substantially in the shape of a cylindrical surface, of the bearing device Db, so as to be rotatable in relation to the driver device Dd.

The outboard side of the first sprocket cluster Sc1, which is specified for rotatable mounting on the bearing device Db, is in this embodiment the outboard terminating sprocket Z7. The outboard sprocket Z7 of the first sprocket cluster Sc1 has on the inner circumference thereof, for the mounting of the first sprocket cluster Sc1 so as to be rotatable on the outboard side, an inner circumferential area Ic which is configured so as to correspond in terms of shape to the bearing section Sb of the bearing device Db, presently thus also configured so as to be in the shape of a cylindrical surface (cf. FIG. 10, FIG. 13 and FIG. 15A).

The advantages, in particular in terms of noise reduction and increased durability by virtue of the mounting of the first sprocket cluster Sc1 on a bearing device Db so as to be rotatable on the outboard side are illustrated in detail further above in the introduction to the description.

Figure 3:
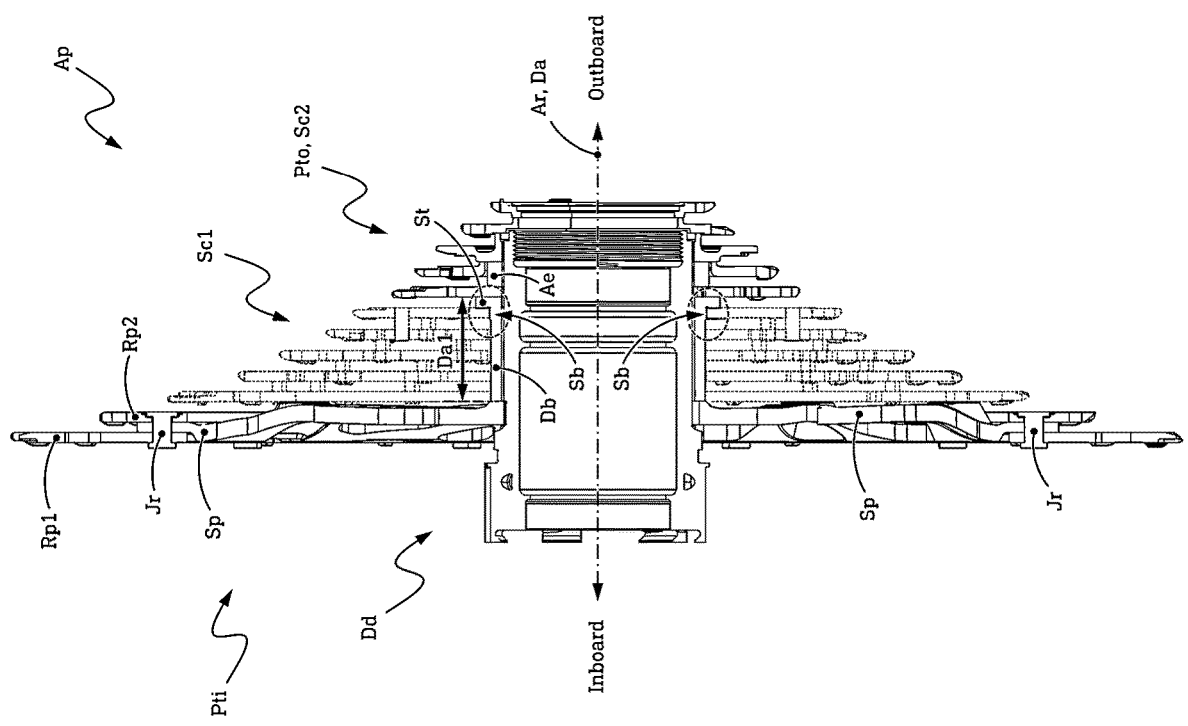
FIG. 3 shows a multiple sprocket assembly and the driver device according to FIG. 2, having a rotational bearing device configured as a distance unit in the axial longitudinal section.

FIG. 3 shows the sprocket assembly Ap assembled on the driver device. The closure screw device Sd has been omitted for the sake of clarity in FIG. 3.

To be seen are an inboard terminating sprocket arrangement Pti, a self-supporting first sprocket cluster Sc1, and an outboard terminating sprocket arrangement Pto. The inboard terminating sprocket arrangement Pti in the embodiment illustrated comprises a sprocket spider Sp on which two ring sprockets Rp1 and Rp2 are disposed and connected to the sprocket spider Sp by means of a rivet joint Jr.

The first sprocket cluster Sc1 in FIG. 3 is only illustrated with dashed lines so as to highlight the bearing device Db. The bearing section Sb, configured here in the shape of a cylindrical surface, of the bearing device Db, which serves for the mounting of the first sprocket cluster Sc1 so as to be rotatable on the outboard side, offering the advantages described further above, can be seen again.

The bearing device Db here simultaneously forms a distance unit which, in a state of the sprocket assembly Ap in which it is assembled on the driver device Dd, is specified to establish a relative distance Da1 in the axial direction of the rear axle Da between at least two sprocket arrangements of the sprocket assembly.

In the embodiment illustrated, the bearing device Db is specified to establish the relative distance Da1 between the sprocket spider Sp and an outboard terminating sprocket arrangement Pto. This means that the bearing device Db here performs a dual function in that it serves for the mounting of the sprocket cluster Sc1 so as to be rotatable on the outboard side, on the one hand, as described above, and on the other hand for setting and maintaining the relative distance Da1 between the sprocket spider Sp and the outboard terminating sprocket arrangement Pto. Maintaining exact axial relative distances such as the relative distance Da1 is important for the permanent reliability and precision when shifting gear by means of the rear derailleur Rd according to FIG. 1.

Figure 4:
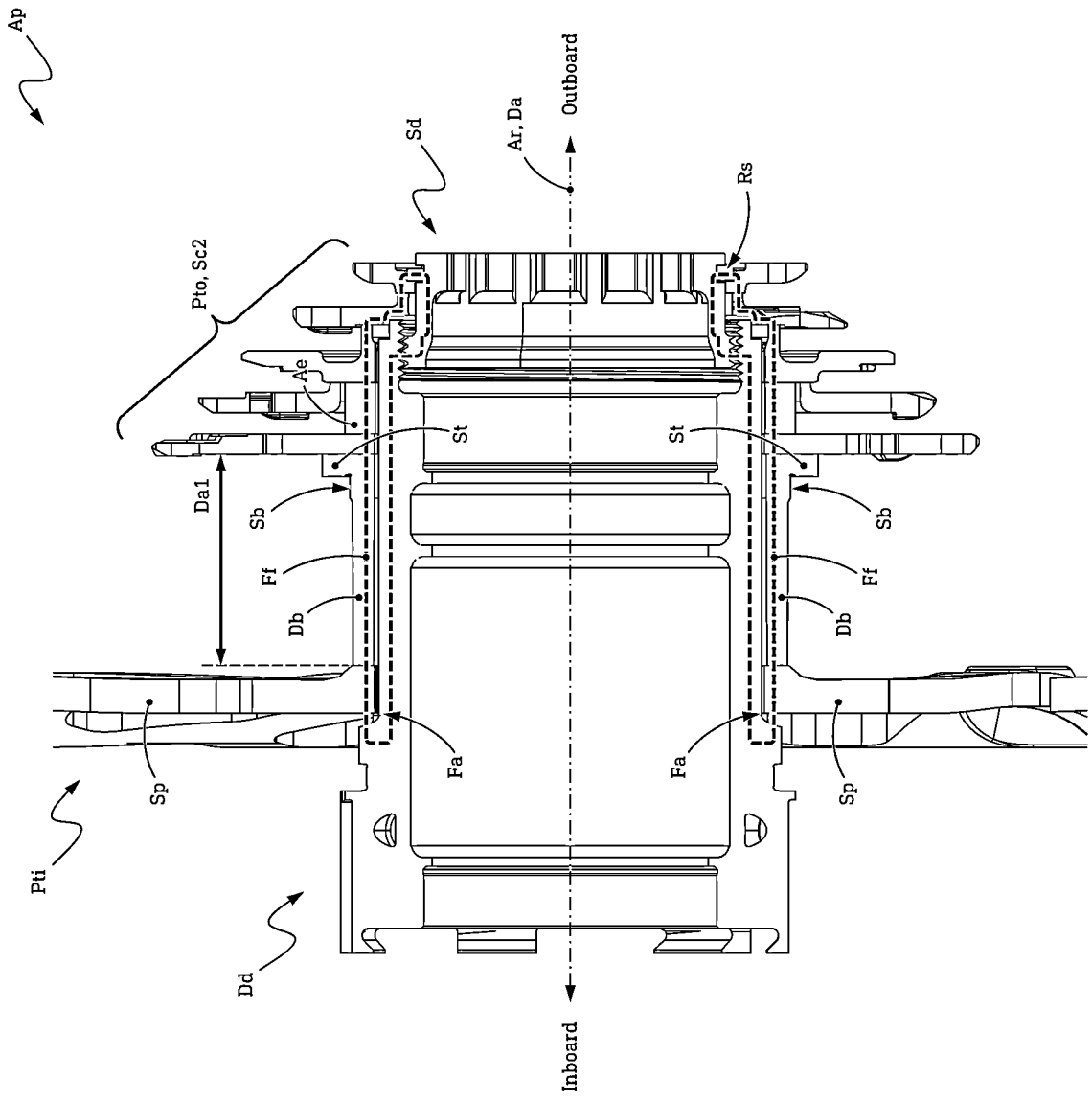
FIG. 4 shows the driver device and parts of the multiple sprocket assembly according to FIGS. 2 and 3, which an illustration of the rotational bearing device configured as an axial tensioning element, in an enlarged axial longitudinal sectional illustration.

FIG. 4 shows the driver device Dd and parts of the sprocket assembly Ap assembled on the driver device Dd according to FIGS. 2 and 3.

It can be seen that the bearing device Db here, in addition to the two aforementioned functions of the mounting Sb of the first sprocket cluster Sc1 so as to be rotatable on the outboard side (cf. FIG. 2) and the setting and maintaining of the relative distance Da1 between the sprocket spider Sp and the outboard terminating sprocket arrangement Pto, also fulfils the function of an axial tensioning element for assembling the sprocket assembly Ap on the driver device Dd.

The bearing device Db in this embodiment serves in particular for transmitting an assembly tensioning force in the axial direction of the rear axle Da between the inboard terminating sprocket arrangement Pti and the outboard terminating sprocket arrangement Pto. The assembly tensioning force, in a state of the sprocket assembly Ap in which it is assembled on the driver device Dd, here is part of a closed fixing force flow Ff running substantially parallel to the rear axle through the driver device Dd and the sprocket assembly Ap.

The fixing force flow Ff is generated by the closure screw device Sd (cf. FIG. 2), in that the closure screw device Sd, which for this purpose has an external thread Te, is screwed into an internal thread Ti of the driver device Dd. As a result, the outboard terminating sprocket arrangement Pto is pushed or pressed onto the driver device Dd by way of an encircling protrusion of the closure screw device Sd that is configured as a snap ring Rs, for example, the outboard terminating sprocket arrangement Pto accordingly pressing onto the bearing device Dd, the latter herein simultaneously forming a distance unit as described above. The bearing device Db in turn pushes against a corresponding axial stop on the inboard terminating sprocket arrangement Pti, in FIG. 4 thus against the sprocket spider Sp which in turn as a result is pressed against a corresponding axial stop Fa of the driver device Dd, cf. also FIGS. 7 and 8.

Overall, this creates a closed force flow Ff which runs substantially parallel to the rear axle through the sprocket assembly Ap and through the driver device Dd, and which axially compresses the sprocket assembly Ap, on the one hand, and on the other hand ensures that the sprocket assembly Ap is fastened on the driver device Dd.

Figure 5:
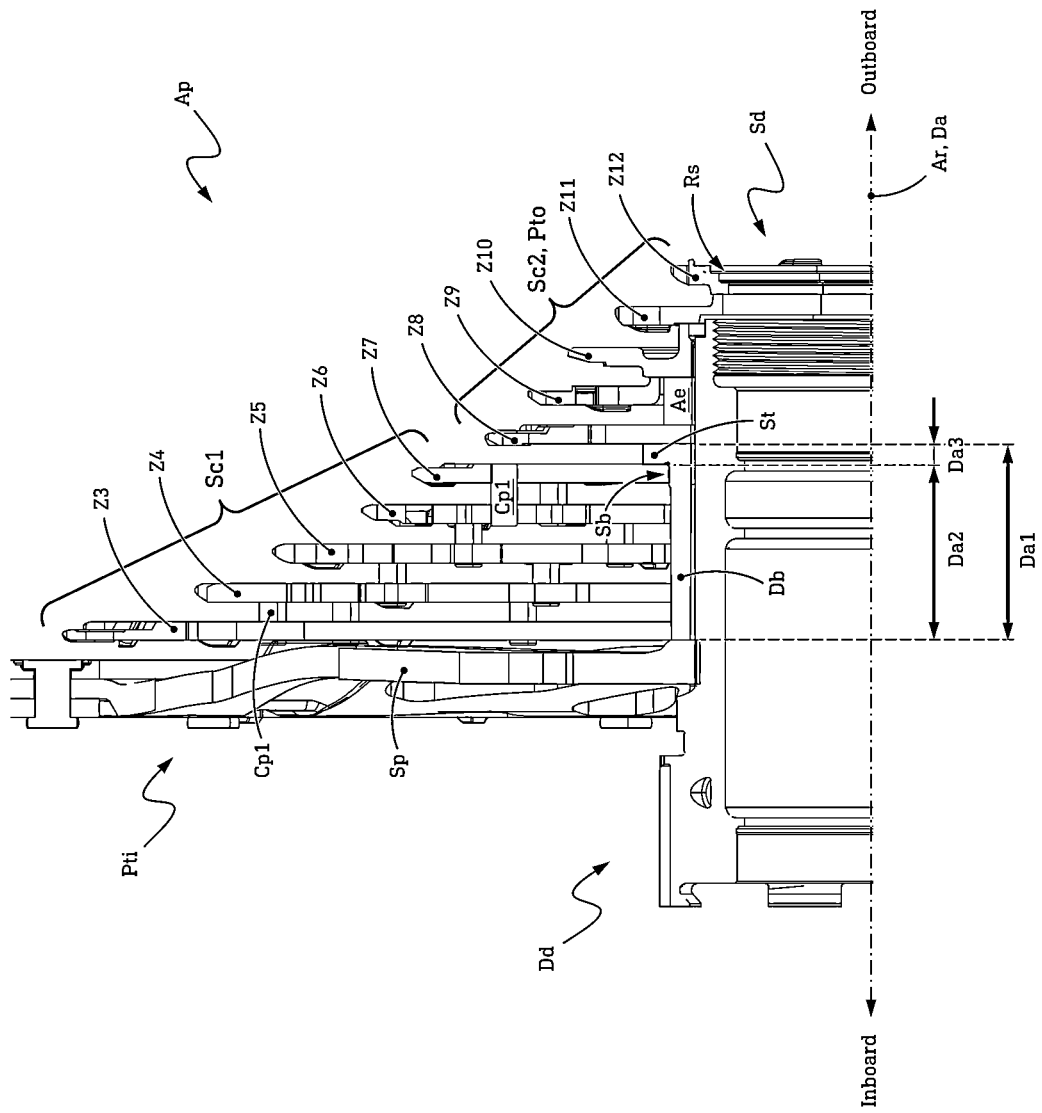
FIG. 5 shows the driver device and the sprocket assembly according to FIGS. 2 to 4 in the axial longitudinal section.

FIG. 5 highlights further multiple functions of the bearing device Db.

It can be seen that the bearing device Db is specified not only to establish and maintain the relative distance Da1 between the inboard terminating sprocket arrangement, here thus the sprocket spider Sp, and the outboard terminating sprocket arrangement Pto, but also to establish and maintain the relative distance Da2 between the inboard terminating sprocket arrangement (here the sprocket spider Sp) and the outboard terminating sprocket Z7 of the first sprocket cluster Sc1.

This means that the bearing device Db also assumes the task of establishing and maintaining the width Da2 of the first sprocket cluster Sc1. For this purpose, the first sprocket cluster Sc1 is manufactured so as to be slightly oversized in terms of width in comparison to the width Da2. As a result, when assembling the sprocket assembly Ap on the driver device Dd, the sprocket cluster Sc1 is at least slightly elastically axially compressed in the axial direction of the rear axle Da by virtue of the force flow Ff (cf. FIG. 4) and is in this way fixed in the sprocket assembly Ap and on the driver device Dd without play in the axial direction Da.

In addition, the bearing device Db according to FIG. 5 is furthermore specified to establish and maintain the relative distance Da3 between the outboard side of the first sprocket cluster Sc1 and the inboard side of the outboard terminating sprocket arrangement, the latter here being formed by the second sprocket cluster Sc2 (cf. also FIGS. 2 to 4). The relative distance Da3 is guaranteed by the effect and width of a collar stop St which in this embodiment is integrally moulded on the bearing device Db.

In other words, the bearing device Db in the embodiment illustrated is configured with an advantageous multiple function for establishing all relative distances Da1, Da2, Da3 in the axial direction of the rear axle Da, and moreover also for transmitting all tensioning forces along the axial direction of the rear axle Da between the inboard terminating sprocket arrangement Pti, the outboard terminating arrangement Pto, the outboard terminating sprocket Z7 of the first sprocket cluster Sc1, and the driver device Dd.

In contrast to the prior art mentioned at the outset, the outboard terminating sprocket Z7 of the first sprocket cluster Sc1 is however not clamped in the axial force flow Ff according to FIG. 4, which in the prior art leads to the disadvantages described at the outset in particular in terms of the noise generation and durability of the sprocket assembly, but remains elastically rotatable in relation to the driver device Dd in an almost force-free manner.

Figure 6:
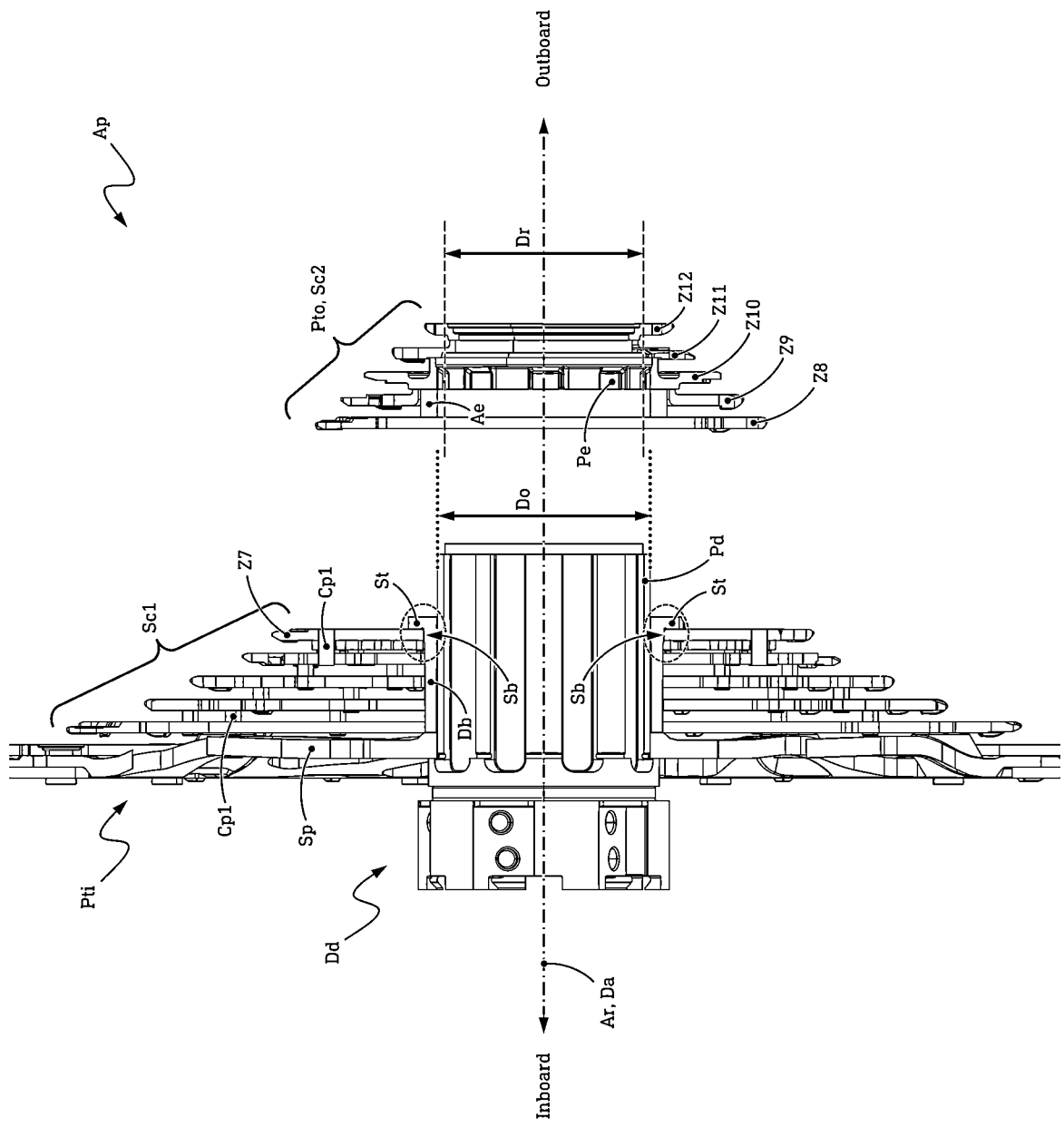
FIG. 6 shows the driver device and the sprocket assembly according to FIGS. 2 to 5 in a partially sectional longitudinal illustration, having a removed additional sprocket cluster.

FIG. 6 shows the sprocket assembly according to FIGS. 2 to 5 in a partially disassembled state in which in particular the outboard terminating sprocket arrangement Pto has been removed from the driver device Dd. It can be seen that the outboard terminating sprocket arrangement Pto here is configured as an additional sprocket cluster Sc2.

The additional sprocket cluster Sc2 herein can be configured as a substantially integral module, for example be milled from one piece. Alternatively, the additional sprocket cluster Sc2 can be assembled from a plurality of sprocket arrangements, or sprockets Z8-Z12, wherein the plurality of sprocket arrangements or sprockets are welded to one another, for example by laser welding. Likewise possible and provided are embodiments of the additional sprocket cluster Sc2 in which the plurality of sprocket arrangements or sprockets Z8-Z12 of the additional sprocket cluster Sc2 are connected to one another by riveting or pinning.

Furthermore to be seen in FIG. 6 is an engagement profile Pe which is disposed on an inner circumference of the additional sprocket cluster Sc2. The engagement profile Pe is configured so as to correspond in terms of shape to the driven profile Pd of the driver device Dd and is disposed in an axial area of at least one sprocket of the additional sprocket cluster Sc2, here in the axial area of the sprocket Z10 of the additional sprocket cluster Sc2. There is sufficient radial installation space available in the axial area of the sprocket Z10 on an inner circumference of the sprocket Z10 in order for the engagement profile Pe to be disposed therein.

In this context, the configuration of the additional sprocket cluster Sc2 as a substantially integral module leads to the advantage that the additional sprocket cluster Sc2 can have sprockets in which an inner diameter, in particular a tooth root diameter Dr, is smaller, or substantially smaller, than the outer diameter Do of the driver device Dd. In this way, sprocket assemblies Ap having particularly small outboard sprockets can be implemented, here for example having the sprockets Z11 and Z12, including in particular sprockets which have a tooth count of 10 or less.

This enables sprocket assemblies Ap with a particularly large gear ratio range to be generated, which are particularly suitable for the 1× drive trains on the bicycle which were mentioned at the outset and in which only one chainring Cr is present in the area of the bottom bracket bearing device Ab, cf. FIG. 1.

Figure 7:
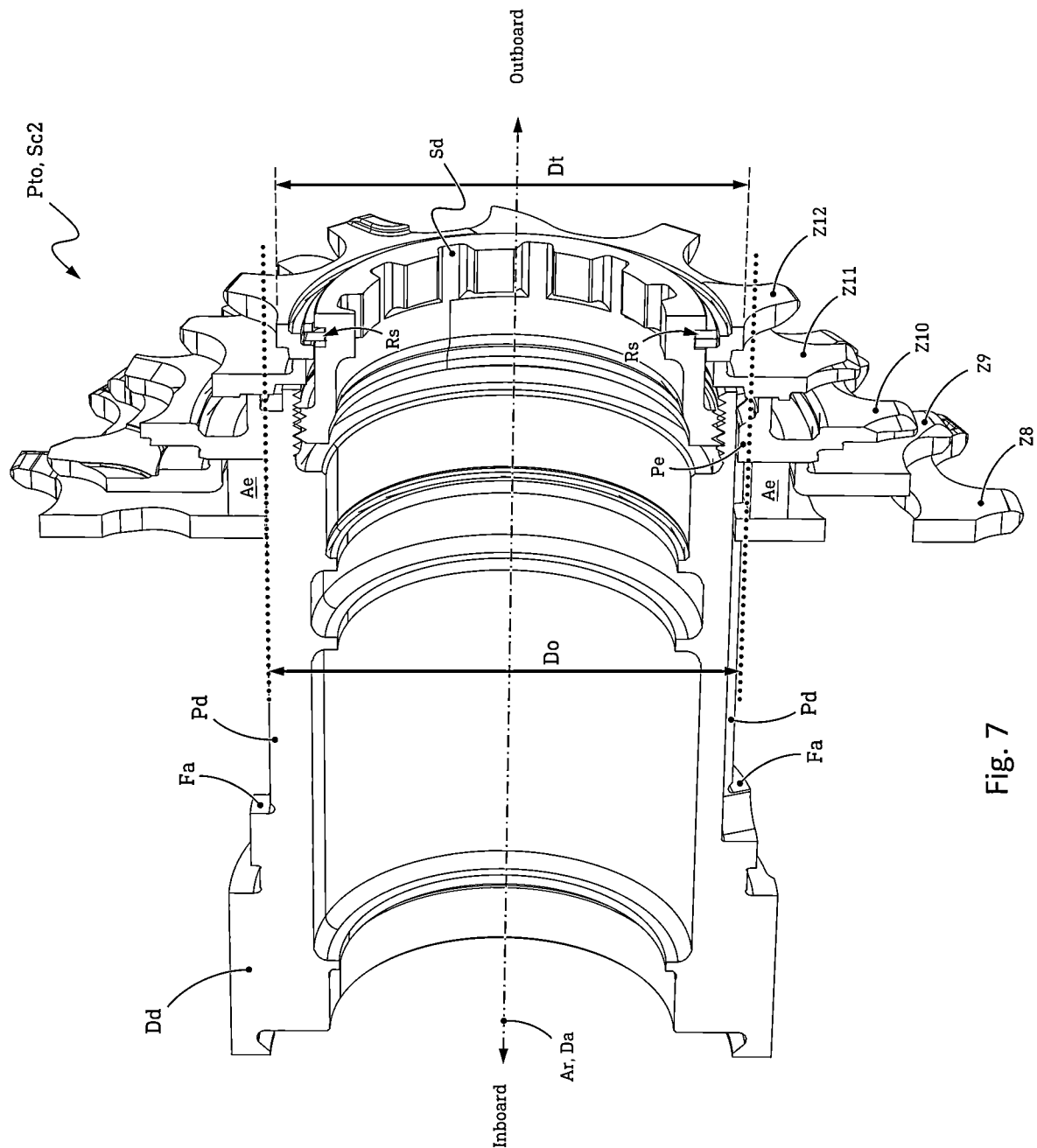
FIG. 7 shows the driver device and the additional sprocket cluster according to FIG. 6 in a perspective isometric illustration for highlighting the diameter proportions.

The disposal of particularly small sprockets having a tooth count of 10 or less on a standard driver device Dd is yet again illustrated in FIG. 7. It can be seen that the 10-tooth sprocket Z12 in particular has a tooth root diameter Dr which is significantly smaller than the outer diameter Do of the driver device Dd in the area of the driven profile Pd of the driver device Dd. By virtue of the substantially integral configuration of the further sprocket cluster Sc2, the drive torque can nevertheless also be transmitted from the smallest sprockets, in particular from the 10-tooth sprocket Z12, along the axial direction Da inboard by way of the sprocket Z11 and from the latter to the sprocket Z10. Finally, the drive torque of the sprocket Z12 can be transmitted from the sprocket Z10 to the driven profile Pd of the driver device Dd by means of the engagement profile Pe.

Figure 8:
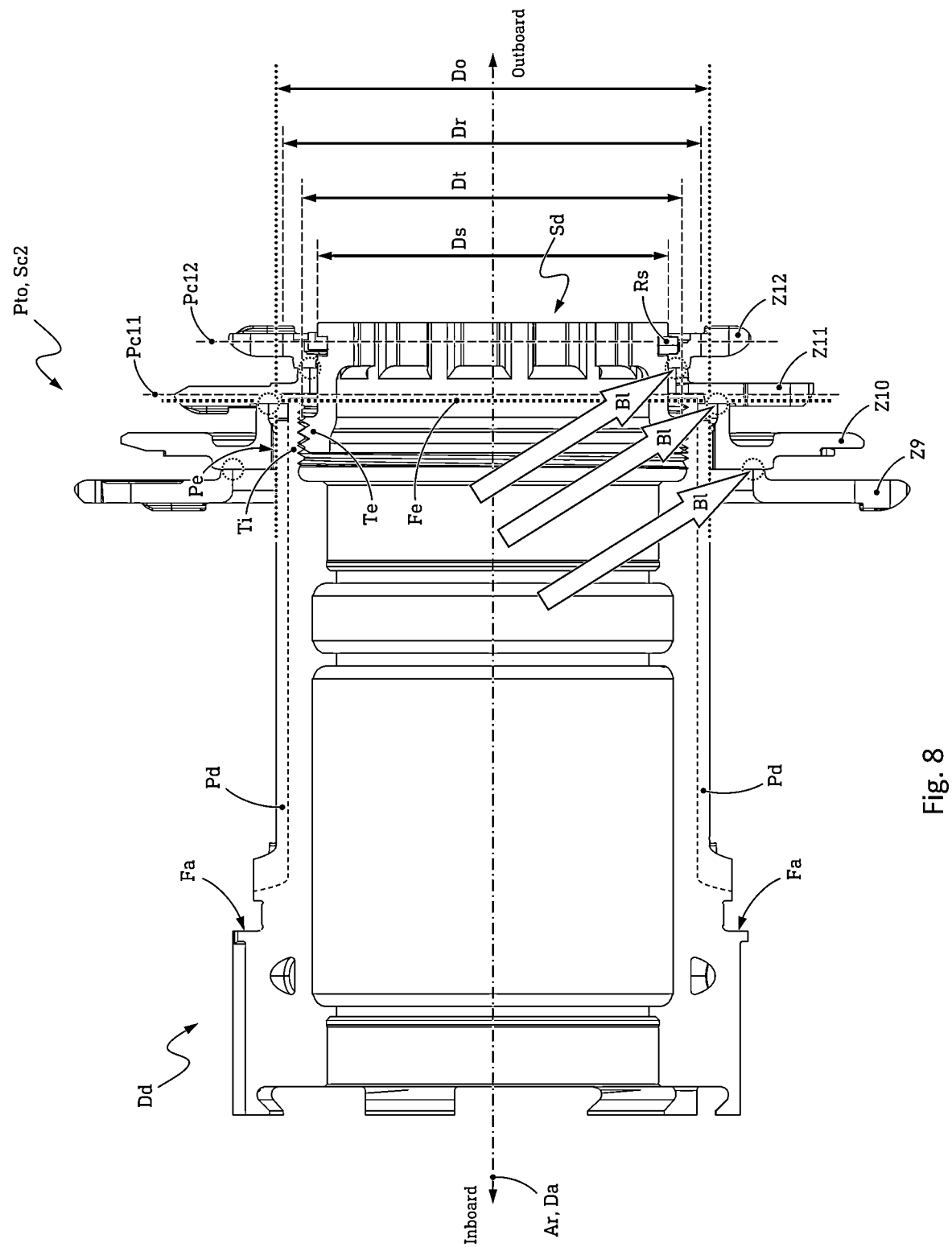
FIG. 8 shows the driver device and the additional sprocket cluster according to FIGS. 6 and 7 for highlighting the axial position of specific sprockets in relation to the driver device.

The design described above of the additional sprocket cluster Sc2 as a substantially integral module having an engagement profile Pe, disposed in the area of at least one of the larger sprockets Z10 of the additional sprocket cluster Sc2, for engaging in the driven profile Pd of the driver device Dd, also allows, or has the consequence, that the sprocket centre planes Pc11, Pc12 of at least one of the smallest sprockets Z11, Z12 are positioned so as to be spaced apart on the outboard side from the outboard end face Fe of the driver device Dd, this being illustrated in FIG. 8.

Apart from the use of particularly small sprockets, this also enables the installation space which is situated on the outboard side next to the outboard end face Fe of the driver device Dd, between the driver device Dd and a frame dropout end of the bicycle 1 (not illustrated; known to the person skilled in the art), to be effectively used. In this way, either sprocket assemblies Ap having a higher sprocket or gear count can be realized, or sprocket assemblies Ap can be positioned in the outboard direction outside of the rear wheel Wr.

The installation space which as a result becomes vacant on the inboard side of the sprocket assembly Ap can be utilized, for example, for increasing the distance of the spoke flanges of a rear wheel Wr hub of the bicycle 1, the stability of the rear wheel Wr being improved as a result.

FIG. 8 furthermore shows yet again in detail the construction of the closure screw device Sd with its external thread Te which is specified to engage in the internal thread Ti of a standard driver device such as the driver device Dd according to FIGS. 2 to 9.

It can be seen in particular that the closure screw device Sd for receiving particularly small sprockets, presently for receiving in particular the smallest sprocket Z12, here having 10 teeth, has a shaft diameter Ds which is significantly smaller than the tooth root diameter Dr of the sprocket Z12 as well as smaller than the thread diameter Dt of the internal thread Ti of the standard driver Dd.

By virtue of this design of the closure screw device Sd, and by virtue of the embodiment of the closure screw device Sd with the mentioned small shaft diameter, and with a snap ring Rs which is disposed in an encircling groove in the outboard area on the shaft of the closure screw device Sd, the closure screw device Sd can be introduced into the sprocket cluster Sc2 from the inboard side (when the snap ring Rs is removed, thus from the left in terms of FIG. 8).

Subsequently, the snap ring Rs is disposed in the encircling groove of the closure screw device Sd, as a result of which the substantially axial force flow Ff through the sprocket assembly Ap and the driver device Dd is produced while the closure screw device Sd is later screwed into the internal thread Ti of the driver device Dd, said force flow Ff fixing the sprocket assembly Ap on the driver device Dd, as has been set forth further above in the context of FIG. 4. In this way, very small sprockets having tooth counts of 10 or less can be used conjointly with a standard driver device Dd, while requiring a minimal number of parts and a minimal effort in terms of construction.

It is moreover schematically illustrated in FIG. 8 in which way the additional sprocket cluster Sc2 is assembled as a substantially integral module from individual sprockets Z9-Z12. This may be performed by laser welding, whereby the directions of exemplary laser welding beams are indicated by block arrows B1 in FIG. 8. In other words, this means that the laser welding of the individual sprockets Z9-Z12, from which the sprocket cluster Sc2 in the embodiment illustrated is assembled, takes place obliquely from the inside, as a result of which fillet welds Wf are formed in the respective areas indicated in a punctiform manner. In this way, the individual sprockets Z9-Z12 can be fixedly connected to one another so as to form an integral sprocket cluster Sc2, whereby an optimal weld seam can be generated by virtue of the geometrically positive accessibility of the fillet welds Wf from radially inside.

Figure 9:
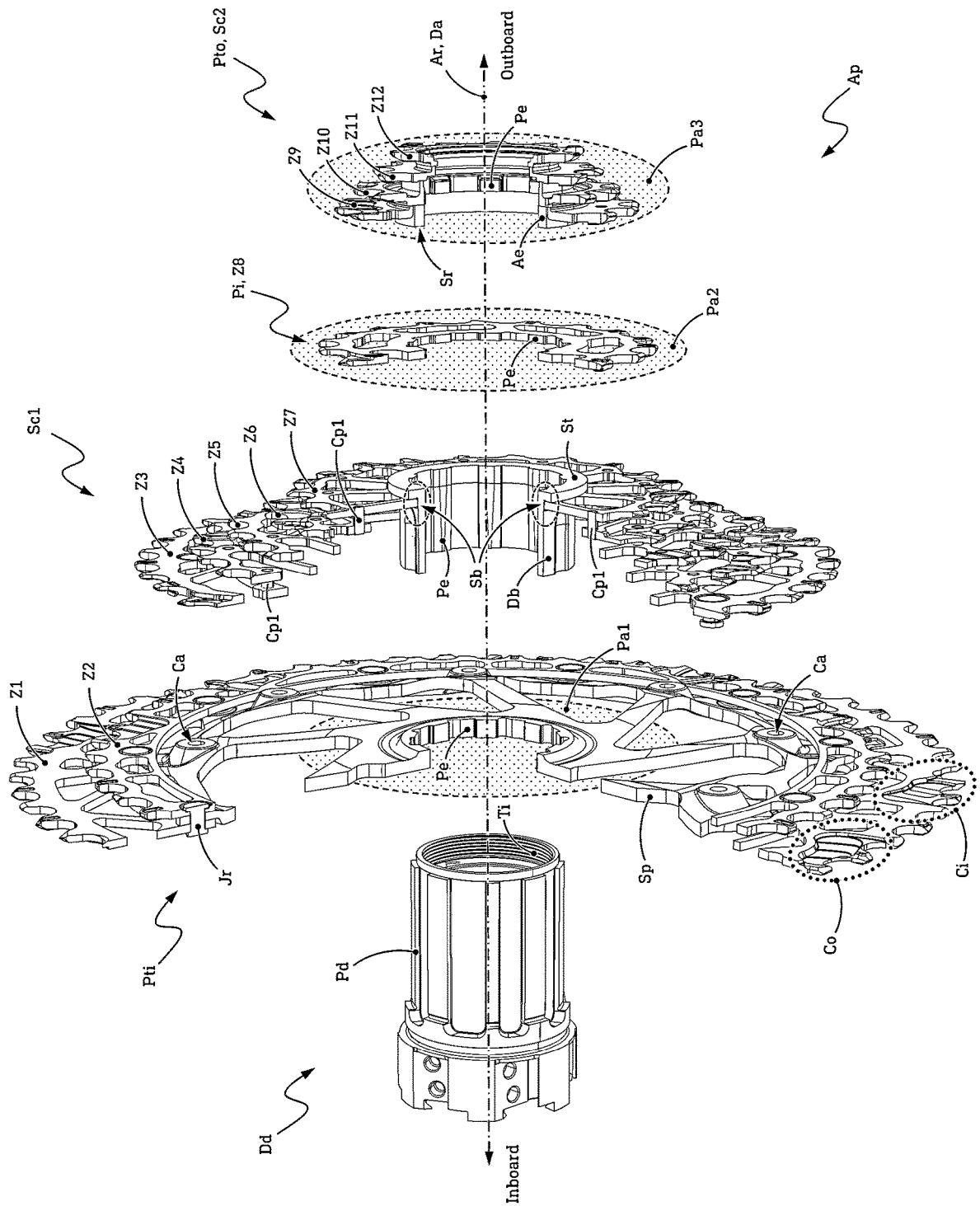
FIG. 9 shows the driver device and the sprocket assembly in an isometric, partially sectional, exploded illustration, conjointly with an associated driver device, for highlighting the torque transmission between the sprocket assembly and the driver device.

FIG. 9 shows a further embodiment of a sprocket assembly Ap. Here too, the mounting Sb of the first sprocket cluster Sc1 so as to be rotatable on the outboard side, as has been described further above, can first be seen again. In contrast to the sprocket assembly described further above, for example according to FIG. 2, which is assembled substantially from the modules "inboard terminating sprocket arrangement Pti", (e.g. sprocket spider Sp having ring sprockets Z1, Z2 fastened thereto), "first sprocket cluster Sc1" and "outboard terminating sprocket arrangement Pto" (for example additional sprocket cluster Sc2), the sprocket assembly Ap according to FIG. 9 has an additional sprocket arrangement Pi which here is configured as an individual sprocket Z8. It can be seen that the individual sprocket Z8 is able to be received in a clamping manner in the axial direction Da between a collar stop St of the bearing device Db and a ring-shaped stop Sr in the area of the outboard sprocket cluster Sc2.

The ring-shaped stop Sr can be, for example, a stop face which is disposed directly or integrally on the outboard sprocket cluster Sc2, or a stop face Sr on a separate annular distance element Ae, which is may be composed of plastics material.

The advantage of the disposal of an individual sprocket Z8 between the first sprocket cluster Sc1 and the second, or outboard, sprocket cluster Sc2 lies in particular in that the individual sprocket Z8 can be replaced in a simple and cost-effective manner in the event of wear. In the case of the individual sprocket Z8, which in the sprocket assembly illustrated has a tooth count of 18 teeth, this is also important in the sense that, according to statistical research by the applicant, this sprocket is one of the most frequently used sprockets and is therefore exposed to particularly extensive wear.

This applies particularly to e-bikes, or pedelecs, in which the load on the drive train Td and in particular on the sprockets of the sprocket assembly Ap is greater than in bicycles without an electric auxiliary drive.

The disposal of an individual sprocket Z8 between the first sprocket cluster Sc1 and the second, or outboard, sprocket cluster Sc2 also leads, in the exemplary embodiment illustrated in FIG. 9, to the sprocket assembly Ap being specified to transmit the drive torque to the driver device in three axial portions Pa1, Pa2, Pa3 which are mutually spaced apart in the axial direction Da. The positions Pa1, Pa2, Pa3 include the axial portion Pa1 of the engagement profile Pe disposed on the sprocket spider Sp, furthermore the axial portion Pa2 of the engagement profile Pe disposed on the outboard sprocket cluster Sc2, and finally the axial portion Pa3 on the inner circumference of the individual sprocket Z8, the latter for this purpose likewise having an engagement profile Pe for engaging in a torque-transmitting manner with the driver device Dd.

Figure 10:
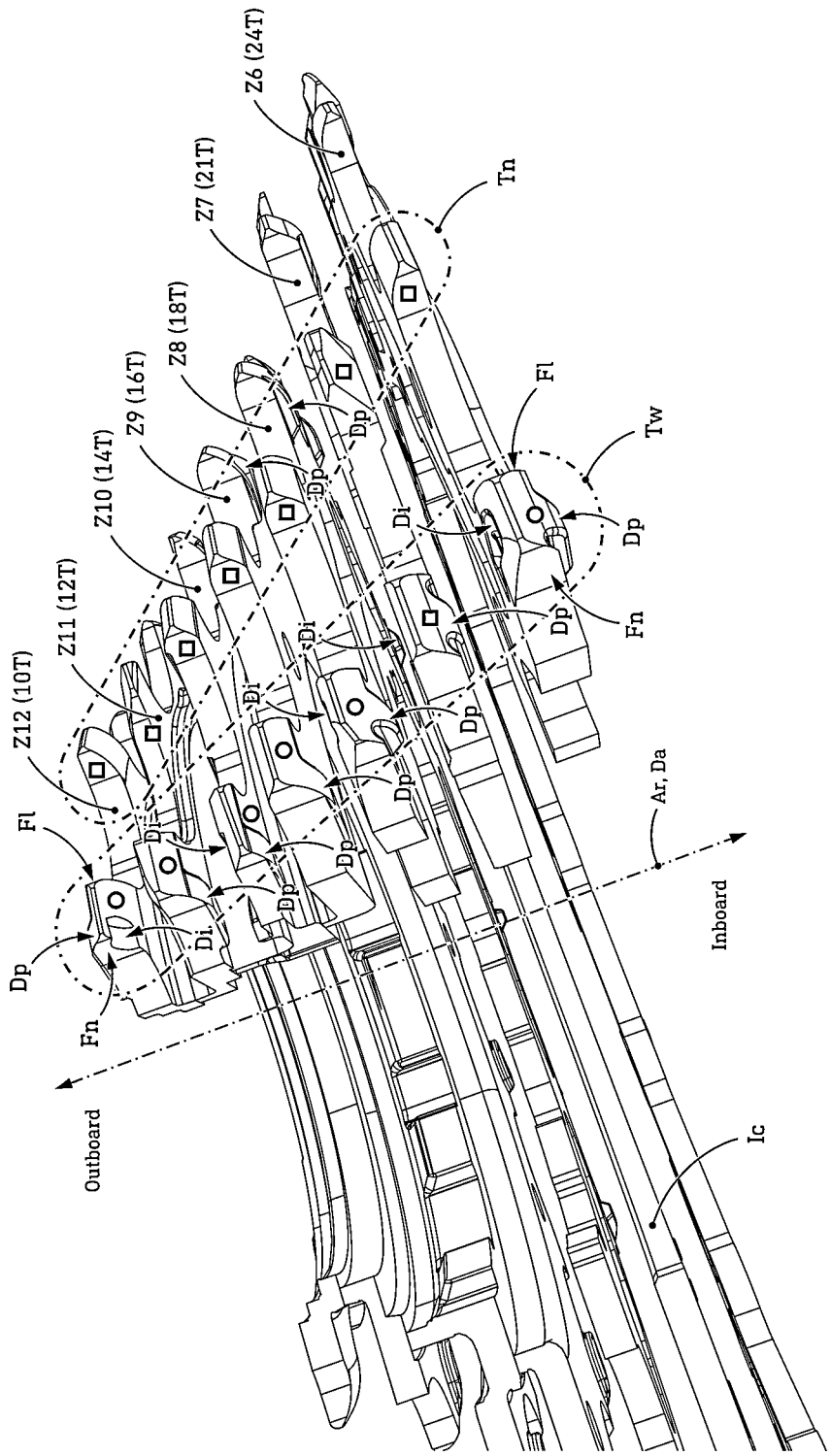
FIG. 10 shows a number of outboard sprockets of a sprocket assembly according to FIGS. 2 to 9, in a perspective, partially sectional illustration.

FIG. 10 shows a number of outboard sprockets Z6 to Z12 in a sprocket assembly Ap according to FIGS. 2 to 9, in a perspective, partially sectional illustration. The tooth counts of the sprockets of this exemplary embodiment are stated here in brackets behind the reference signs Z6 to Z12. The sprockets Z6 to Z12 are not illustrated in the actual mutual rotational relative position but for reasons of illustration are mutually rotated in such a way that the design in particular of the thick-thin teeth is apparent.

The even-numbered sprockets Z6 and Z8 to Z12 are thick-thin sprockets which have already been described further above and the teeth of which are thus assigned in an alternating manner to a narrow or a wide tooth group having in each case a different tooth width. The teeth of the narrow tooth group here are narrow teeth which are narrower than the inner link clear width Wci of an inner chain link Li of a bicycle chain Cn assigned to the sprocket assembly, while the wide tooth group comprises at least one wide tooth which is wider than the inner link clear width Wci of the inner chain link but narrower than the outer link clear width Wco of an outer chain link Lo (cf. bicycle chain Cn in FIG. 11B).

The thick-thin sprockets ensure a stabilization of the chain run on the respective sprocket occupied by the chain Cn, as long as no shifting procedure takes place, and minimize inter alia the undesirable lifting of the chain from the sprocket, for example in the event of heavy impacts or chain shocks. Furthermore, the thick-thin sprockets ensure synchronization between the chain Cn and the sprocket occupied by the chain Cn in such a manner that inner chain links Li come to engage specifically with the associated narrow teeth of the sprocket, while outer chain links Lo come to engage specifically with the associated wide teeth of the sprocket. This enables a design of the wide and narrow teeth of the sprocket to be specifically optimized in terms of the engagement with outer chain links Lo or inner chain links Li, respectively.

In FIG. 10, the wide sprocket teeth Tw, which are thus provided for engagement in outer chain links Lo and are visible in the foreground, are provided with small circular markings for easier identification. Likewise, the narrow sprocket teeth Tn, which are thus provided for engagement in inner chain links Li and are visible in the foreground, are provided with small square markings for easier identification.

It is to be taken into account here that not every tooth Tw that is associated with the group of wide sprocket teeth Tw of a thick-thin sprocket of a multi-sprocket cassette actually has a width which corresponds substantially to the clear width Wco of the outer chain links Lo of an associated chain Cn according to FIG. 11B. The reason for this is that thick-thin sprockets of a multi-sprocket cassette typically have shift recesses Ri, Ro on one or on both end faces in the area of shift channels Ci, Co. The width of the sprocket teeth situated in the area of the shift channels Ci, Co, or shift recesses Ri, Ro, in particular the width of the teeth Tw of the group of the two sprocket teeth Tw, is typically reduced (cf. for this purpose FIGS. 11A and 12, and the associated description further below).

Teeth of different widths are indeed also present in the sprocket Z7 according to FIG. 10, which has an odd-numbered tooth count of 21 teeth. However, not all teeth of the sprocket Z7 are wider than the available width, or than the inner link clear width Wci of the inner chain links Li according to FIG. 11B. This is due to the fact that the above-described synchronization with the chain Cn cannot take place in principle in an odd-numbered sprocket such as the sprocket Z7, because in each rotation of the sprocket all sprocket teeth of an odd-numbered sprocket come to engage in an alternating manner with inner chain links Li and outer chain links Lo.

The sprockets Z6 to Z12 depicted in FIG. 10 are sprockets which are produced by the stamping method. It can be seen that the different width of the teeth, in the even-numbered sprockets in particular the different width of the wide teeth Tw and of the narrow teeth Tn, is generated in that indentations Di are typically performed on an outboard end face of the sprockets, which indentations Di lead during stamping of the sprockets to a displacement of material and to corresponding protrusions Dp on the opposite end face, thus typically on the inboard end face, of the respective sprocket.

The opposite applies only to the smallest sprocket Z12, because stamped indentations Di on the latter are disposed on an inboard end face of the sprocket Z12, and corresponding protrusions Dp are disposed on an outboard end face of the sprocket Z12.

The indentations Di and protrusions Dp can be disposed on the sprocket teeth here so as to be substantially centric in terms of a circumferential direction of the respective sprocket, as is the case in the sprockets Z6, Z7 and Z8 according to FIG. 10, for example. Alternatively, the indentations Di and protrusions Dp can also be disposed on the sprocket teeth laterally in terms of a circumferential direction of the respective sprocket, as is the case in the sprockets Z9 to Z12, for example. The disposal of the indentations Di and protrusions Dp so as to be lateral on the sprocket teeth, in the exemplary case of FIG. 10 on a respective non-load flank Fn of the respective sprocket tooth, has advantages in terms of the ease of production of the indentations Di and protrusions Dp by means of the stamping method and in terms of the load bearing capability and resistance to wear in particular of the load flanks Fl of the sprocket teeth, which by way of this disposal of the indentations Di and protrusions Dp on the non-load flanks Fn are weakened to a lesser extent.

FIG. 11A shows in a highly schematic manner part of a flat developed view of the circumference of an even-numbered thick-thin sprocket Z3 of the sprocket assembly Ap according to the present disclosure, including a bicycle chain Cn running on the sprocket Z3. The run of the bicycle chain Cn on the sprocket Z3 in FIG. 11A here is symbolized by double dashed lines, the profile of the latter corresponding approximately to the profile of the inner surfaces of the outer chain links Lo according to FIG. 11B.

To be seen in the background of FIG. 11A is first the main body Bm of the sprocket Z3 which has a thickness Dm and is shown by light-coloured dots. The thickness Dm of the sprocket main body Bm here also corresponds to the tooth width Ww of the "normal" wide teeth Tw0 in those areas of the sprocket in which no shift channels, thus neither inboard shift channels Ci nor outboard shift channels Co, are situated, cf. examples of inboard shift channels Ci and outboard shift channels Co in FIG. 2, FIG. 9 and FIGS. 12 to 14.

The sprocket Z3 in FIG. 11A may in particular be a milled sprocket, in which the thickness Dm of the base material usually corresponds to the width Ww of the wide teeth. In contrast, in the case of a sprocket produced by a stamping-pressing process, the thickness of the base material often coincides with the width of the narrow teeth, cf. for example FIG. 10 and the associated description. However, the geometric considerations made with reference to FIGS. 11A and 11B are of a fundamental nature and can therefore be applied both to milled sprockets and to stamped/pressed sprockets.

Areas of the sprocket Z3 according to FIG. 11A without shift channels Ci, Co are situated in the left and the right area of the depicted developed view of the sprocket Z3, having the "normal" wide teeth Tw0 and "normal" narrow teeth Tn0 that can be seen in those areas.

The "normal" wide teeth Tw0 have a tooth width that allows these wide teeth Tw to engage in each case in an outer chain link Lo of a bicycle chain Cn according to FIG. 11B, wherein the outer chain links Lo have an available width, or an outer link clear width Wco, respectively.

The "normal" narrow teeth Tn0 have a tooth width that allows these narrow teeth Tn to engage in each case in an inner chain link Li of the bicycle chain Cn. The inner chain links Li according to FIG. 11A have an available width, or an inner link clear width Wci, respectively.

In the central area of the developed view of the sprocket depicted in FIG. 11A, the sprocket Z3 has two shift channel areas (which are initially known per se), specifically an inboard shift channel area Ci for the changeover of the chain Cn from a smaller sprocket adjacent in the outboard direction and not depicted in FIG. 11A to the sprocket Z3 during the shifting procedure, and an outboard shift channel area Co for the changeover of the chain Cn from the sprocket Z3 to the smaller sprocket adjacent in the outboard direction and not depicted during the shifting procedure.

In the case of the outboard shifting procedure it is important that the chain Cn in fact changes over to the adjacent, next smaller sprocket only in the outboard shift channel area Co, by way of the special sprocket shift features situated therein, such as, for example, inboard recesses Ri and outboard recesses Ro as well as bevels and supporting edges of the teeth (see also examples of outboard shift channel areas Co in FIG. 2, FIG. 9 and FIGS. 12 to 14). If this is unsuccessful and the chain changes over to the adjacent, next smaller sprocket in an area outside an outboard shift channel Co, this may lead to malfunctions in the chain run, to noises, to jumping of the chain, and when shifting under load also to damage to the chain and/or sprockets.

In thick-thin sprockets such as, for example, the sprocket Z3 according to FIG. 11A, the changeover of the chain Cn to the respective adjacent sprocket exclusively in the shift channel areas Co, Ci is even more important than in the case of sprockets without alternating thick-thin teeth Tw and Tn, because a changeover of the chain Cn outside the shift channel areas Co, Ci may also cause desynchronization of the chain run on the respective sprocket. In the process, inner chain links Li would come to lie on wide sprocket teeth Tw, whereby the wide sprocket teeth Tw by virtue of their width Dm could not enter the inner chain links Li having their clear width Wci. In such cases, the chain Cn may slip on the thick-thin sprocket Z3, with corresponding disadvantageous or damaging, or even dangerous, consequences for the operation of the bicycle.

Against this background, the sprocket Z3 according to FIG. 11A has stabilization teeth Ts1, Ts2, Ts3 which are disposed in the outboard shift channel area Co, or in the inboard shift channel area Ci adjacent to the outboard shift channel area Co of the sprocket Z3, respectively. The stabilization teeth Ts1 and Ts3 are part of the tooth group of narrow teeth Tn of the thick-thin sprocket, thus part of the narrow teeth Tn, while the stabilization tooth Ts2 is part of the wide tooth group of teeth of the thick-thin sprocket, thus part of the wide teeth Tw. In FIG. 11A, the teeth Tw of the wide tooth group are again identified by small circular markings, and the teeth Tn of the narrow tooth group are again identified by small square markings.

In the case of the two stabilization teeth Ts1 and Ts3, which are part of the narrow teeth Tn, an inboard chain guiding surface Gi1n and Gi3n projects in each case in the inboard direction in relation to the inboard chain guiding surfaces Gi0n of the remaining "normal" narrow teeth Tn0 of the narrow tooth group.

In the exemplary embodiment illustrated, in the narrow stabilization teeth Ts1 or Ts3, in each case conjointly with the next adjacent narrow tooth Tn1 or Tn3, respectively, this results in a cross-tooth chain guide dimension Dcn1 or Dcn3 which is enlarged and displaced inboard in relation to the "normal" cross-tooth chain guide dimension Dcn0 of adjacent narrow teeth Tn0 to be found in areas without shift channels Ci, Co, as can be seen in FIG. 11A.

In an analogous manner, in the exemplary embodiment illustrated, in the wide stabilization tooth Ts2, here likewise conjointly with the tooth Tn3, this results in a cross-tooth chain guide dimension Dcw1 which is enlarged and displaced inboard in relation to the "normal" cross-tooth chain guide dimension Dcw0 of wide teeth Tw0 to be found in areas without shift channels Ci, Co.

In general, a cross-tooth chain guide dimension (e.g. the cross-tooth chain guide dimension Dcn1) is a chain guide dimension, or effective chain guide width, which results due to the interaction between, for example, an inboard chain guiding surface of a sprocket tooth (e.g. inboard chain guiding surface Gi1n of the sprocket tooth Ts1) and an outboard chain guiding surface (e.g. outboard chain guiding surface Go1n of the sprocket tooth Tn1) which is next in the circumferential direction of the sprocket Z3 and is in contact with an inner face of the chain Cn.

Another example of a cross-tooth chain guide dimension is the effective chain guide width, or chain guide dimension Dcw1, which results due to the interaction between the inboard chain guiding surface Gi2w of the sprocket tooth Ts2 and an outboard chain guiding surface Go3n of the sprocket tooth Tn3 which is next in the circumferential direction of the sprocket Z3 and is in contact with the chain Cn.

This cross-tooth chain guide dimension Dcw1 thus results in that the chain bears on the inboard chain guiding surface Gi2w of the sprocket tooth Ts2 by way of an inner face of an outer chain link Lo, and, as the next in the circumferential direction of the sprocket Z3, on the outboard chain guiding surface Go3n of the sprocket tooth Tn3 by way of an inner face of an inner chain link Li.

In this way, the position of the chain Cn on the sprocket Z3 in the axial direction of the rear axle Da in the area of the sprocket teeth Ts2 to Tn3 is established by the chain Cn bearing in such a manner inboard (at Gi2w) and next outboard (at Go3n), and by the cross-tooth chain guide dimension Dcw1 formed in this way in this area.

A cross-tooth chain guide dimension Dcn, Dcw thus establishes the position of the chain Cn on the sprocket Z3 in the axial direction of the rear axle Da in a respective observed circumferential portion of the sprocket Z3.

For further explanations relating to the cross-tooth chain guide dimension and the influence of the latter on the chain run, reference is also made to the explanations further above in the introduction to the description.

In the sprocket illustrated in FIG. 11A, the "normal" cross-tooth chain guide dimension Dcn0 of the narrow teeth Tn, to be found in areas without shift channels Ci and Co, corresponds substantially to the width of the narrow teeth Tn (when viewed in the axial direction of the rear axle Da).

The above comments pertaining to the two stabilization teeth Ts1 and Ts3 of the group of narrow teeth Tn apply in an analogous manner to the stabilization tooth Ts2 which is part of the group of the wide teeth Tw. As can likewise be derived from FIG. 11A, in the case also of the wide stabilization tooth Ts2, an inboard chain guiding surface Gi2w projects in the inboard direction in relation to the inboard chain guiding surfaces Gi0w of the other, "normal" wide teeth Tw0 of the wide tooth group.

The cross-tooth chain guide dimensions Dcn1, Dcw1 and Dcn3 enlarged and displaced inboard in this manner, or the respective inboard chain guiding surfaces Gi1n, Gi2w and Gi3n of the stabilization teeth Ts1, Ts2 and Ts3 which are displaced inboard, respectively, lead in each case to the chain Cn being slightly displaced inboard in the axial direction of the rear axle Da at Cd in the area of the stabilization teeth Ts1, Ts2 and Ts3, respectively, which is visualized in FIG. 11A by the profile of the chain Cn indicated by a double broken line.

The inboard deflection Cd of the chain Cn caused in this way by one or a plurality of the stabilization teeth Ts1, Ts2 and Ts3 during the normal chain run stabilizes the run of the chain Cn on the sprocket Z3 of the sprocket assembly Ap, for example and in particular in the area of an inboard shift channel Ci, cf. shift channels Ci in FIG. 2, FIG. 9, FIG. 12, FIG. 13 and FIG. 14A.

In other words, as a result of the effect of one or a plurality of the stabilization teeth Ts1, Ts2 and Ts3, the chain Cn is imparted a slight inboard deflection Cd, in particular in the area of the inboard shift channel Ci. It is prevented as a result that the chain Cn undesirably shifts outboard in the area of the inboard shift channel Ci, which like an outboard shift channel Co has in particular outboard recesses Ro on the sprocket teeth. Faulty shifting of this type would compromise the uniform and jolt-free shifting procedure, disturb the synchronous run of the chain Cn on the thick-thin teeth Tw, Tn of the sprocket assembly Ap, and may also lead to damage to the sprocket assembly Ap and/or to the chain Cn, at least when shifting under load.

The orderly outboard shifting in the area of the outboard shifting channel Co is not compromised by the stabilization teeth Ts1, Ts2, Ts3 and by the deflection Cd of the chain Cn, because outboard shifting in the area of the outboard shifting channel Co is already initiated by the rear derailleur Rd according to FIG. 1 before the chain reaches the stabilization teeth Ts1, Ts2, Ts3. In other words, the chain already assumes an oblique chain run through the areas Ri2 and Ro2 of the outboard shift channel Co (cf. FIG. 12B) when shifting outboard, and is thus no longer caught on the inboard side by the stabilization teeth Ts1, Ts2 and Ts3 and thus also not deflected inboard.

A further advantage of the inboard chain guiding surface Gi1$n$, Gi2$w$ and Gi3$n$ of the at least one stabilization tooth Ts1, Ts2, Ts3 being displaced inboard lies in that the respective stabilization tooth Ts1, Ts2, Ts3 in this way obtains a larger tooth width which increases the wear resistance of the stabilization tooth Ts1, Ts2, Ts3. This is advantageous in particular when the at least one stabilization tooth Ts1, Ts2, Ts3 is situated in the area of a shift channel Ci, Co, which is preferable, and in this way has an outboard recess, or a tooth width reduced on the outboard side, at Ro.

It is to be pointed out once again that the illustration of FIG. 11A is highly schematic and in particular not true-to-scale in terms of the actual conditions on a sprocket Z3. The chain Cn in FIG. 11B is also only schematically illustrated, whereby the width of the chain Cn is in particular enlarged in comparison to the width of an actual bicycle chain for illustrative reasons.

FIG. 12A and FIG. 12B show the sprocket Z3 having the stabilization teeth Ts1, Ts2 and Ts3 according to FIG. 11A in two different views. The sprocket Z3 in FIG. 12A is illustrated obliquely from the rear, thus from the inboard side, while the sprocket Z3 in FIG. 12B is shown when viewed towards the front side, thus onto the outboard side. The arrows Rdd each show the direction of rotation of the sprocket when driven by the bicycle chain Cn as shown in FIG. 1.

Since the sprocket Z3 is an even-numbered thick-thin sprocket, the sprocket teeth which are part of the group of wide teeth Tw are again identified by circular markings and the sprocket teeth which are part of the group of narrow teeth Tn are again identified by square markings in FIG. 12A and FIG. 12B.

An outboard shift channel is situated in the area identified by Co, and an inboard shift channel is situated in the area identified by Ci (cf. shift channels Ci and Co in FIG. 11A and the shift channel areas Co and Ci, marked for example on the sprocket Z1, in FIG. 2, FIG. 9 and FIG. 13).

In the shift channel areas Co and Ci, there are according to FIG. 12A recesses on the inboard side at Ri1 and Ri2 and teeth Tw1, Tn1 and Tw3, Tn3 narrowing on the rear side, cf. also FIG. 11A. On the outboard side, there are according to FIG. 12B shift channel recesses Rc and teeth Ts1, Tw2 and Ts2, Ts3 narrowing on the front side at Ro1 and Ro2 respectively, cf. also FIG. 11A.

As already discussed above, for maintaining the shift performance and avoiding faulty shifting it is necessary that the chain Cn changes over to the next smaller sprocket Z4 on the outboard side (not illustrated in FIG. 12A and FIG. 12B, see e.g. FIG. 2) only in the area of an outboard shift channel Co. In order to avoid that the chain Cn changes over to the next smaller sprocket Z4 on the outboard side in the area of the inboard shift channel Ci instead, the sprocket Z3 has the stabilization teeth Ts1, Ts2 and Ts3. The stabilization teeth Ts1, Ts2 and Ts3 displace the chain run in the area of the stabilization teeth Ts1, Ts2 and Ts3 by a small measure in the range of tenths of millimetres, for example by approx. 0.25 mm, inboard, as is symbolized by means of the run of the chain Cn illustrated by doubled dashed lines at Cd in FIG. 11A.

It is avoided by this straight guiding of the chain Cn reinforced by virtue of the stabilization teeth Ts1, Ts2 and Ts3 that the chain Cn—in particular after the latter during the rotation of the sprocket Z3 has passed the outboard shift channel Co without shifting to the next smaller sprocket Z4 having taken place therein—undesirably shifts outboard in the area of the inboard shift channel Ci, in particular in the area Ri1 having therein the teeth Tn1 and Tw1 narrowing on the rear side, as a result of which the straight guiding of the chain on the sprocket Z3 is reduced.

The thickening of the stabilization teeth Ts1 and Ts3 on the rear or inboard side, which are part of the group of narrow teeth Tn, and the inboard displacement of the inboard chain guiding surfaces Gi1$n$ and Gi3$n$ associated therewith, can be clearly seen in FIG. 12A, cf. FIG. 11A. A thickening on the rear or inboard side is also present in the stabilization tooth Ts2, which is part of the group of wide teeth Tw, this being associated with an inboard displacement of the inboard chain guiding surface Gi2$w$ of the stabilization tooth Ts2, and a correspondingly reinforced straight guiding of the chain Cn in this area.

The effect of the stabilization teeth Ts1, Ts2 and Ts3, presently in particular of the "wide" stabilization tooth Ts2, is also of importance when pedalling backwards. When the drive train Td of the bicycle 1 (cf. FIG. 1) is moved backwards in that the rider pedals backwards with the pedal cranks Dc, there is the risk, in particular with the chain on one of the larger sprockets such as Z1 to Z3, for example, that the chain falls from the respective sprocket inboard by virtue of the intense oblique chain run in this case, which may lead to damage to the drive train, in particular to the rear derailleur Rd.

This risk is particularly prevalent in the area of the shift channels Ci and Co in which teeth Tn1, Tw1 and Tw3, Tn3 which are narrowing on the rear, thus inboard, side are present, cf. the areas Ri1 and Ri2 in FIG. 11 and FIG. 12A, having the teeth Tn1, Tw1, Tw3, Tn3 which are narrowing on the rear side therein. In this case of backwards pedalling, the straight guiding of the chain Cn is also reinforced by the stabilization teeth Ts1, Ts2 and Ts3 which are thickened on the rear side, the tendency of said chain towards jumping off during backwards pedalling being reduced in this way. This applies in particular to the two shift channel teeth Tw3 and Tn3 in the area Ri2, which are narrowing on the rear side and moreover are provided with an oblique bevel on the front side (cf. FIG. 12B), which would particularly facilitate the chain jumping off undesirably when pedalling backwards—if it were not for the particular counteraction of the stabilization tooth Ts2, which is thickened on the rear side.

Stabilization teeth Ts1, Ts2 and Ts3 can also be disposed on sprockets of the sprocket assembly Ap other than the sprocket Z3. Furthermore, the stabilization teeth Ts1, Ts2 and Ts3 can also be used independently of one another; for example, only one or two of the stabilization teeth Ts1, Ts2 and Ts3 may be disposed on a sprocket.

The application of the stabilization teeth Ts1, Ts2 and Ts3 is also not limited to thick-thin sprockets. Rather, stabilization teeth such as, for example, the stabilization teeth Ts1, Ts2 and/or Ts3, can also be used in standard sprockets without thick-thin technology, thus in sprockets in which substantially all teeth are thin sprocket teeth, the latter thus being able to engage in the inner link clear width of the inner chain links of the bicycle chain.

Furthermore, the application of stabilization teeth is also not limited to the above-described prevention of outboard shifting at an undesirable location on a sprocket. Apart from the above-described stabilization teeth having inboard chain guiding surfaces which are displaced inboard, or having a correspondingly enlarged cross-tooth chain guide dimension displaced inboard, for preventing the outboard shifting at an undesirable location, stabilization teeth can also be embodied with an outboard chain guiding surface displaced outboard, or with a correspondingly enlarged cross-tooth chain guide dimension displaced outboard, and be used for preventing the inboard shifting at an undesirable location on a sprocket of a multi-sprocket cassette Ap.

The application of stabilization teeth is also not limited to sprocket cassettes or rear wheel sprocket assemblies Ap, but can also take place on multi-chainrings Cr of a bicycle drive train Td according to FIG. 1.

FIG. 13 visualizes by way of example a modular system for generating multi-sprocket assemblies, which can be implemented by means of the sprocket assembly according to the present disclosure.

To be seen in FIG. 13 are three modular functional groups B1, B2 and B3 of the sprocket assembly which are delimited by vertical flat regions, wherein the functional group B1 in the exemplary embodiment shown is formed by an inboard terminating sprocket arrangement Pti, the functional group B2 is formed by a first sprocket cluster Sc1, and the functional group B3 is formed by an additional sprocket cluster Sc2.

The functional group B1, which in the exemplary embodiment shown is formed by the inboard terminating sprocket arrangement Pti, is present in this embodiment as a sprocket spider Sp having two ring sprockets Z1/Rp1 and Z2/Rp2 which are able to be fastened to the sprocket spider Sp, for example screwed, riveted or pinned thereto, cf. FIG. 2, FIG. 3 and FIG. 9 having the respective unit of the sprocket spider Sp and the ring sprockets Z1/Rp1 and Z2/Rp2 riveted to the sprocket spider Sp illustrated therein.

The functional group B2, which here is formed by the first sprocket cluster Sc1, is composed in this embodiment of the modular system of five individual sprockets Z3-Z7, cf. FIG. 2, FIG. 5, FIG. 6 and FIG. 9.

The functional group B3, which here is present in the form of an additional sprocket cluster Sc2, comprises in this embodiment of the modular system the sprockets Z8 to Z11, and thus corresponds to the additional sprocket cluster Sc2 according to FIG. 8, for example.

Furthermore, the modular system shown comprises the distance unit Db which functions as a link across the functional groups B1, B2 and B3 and for this purpose assumes an advantageous multiple function. The distance unit Db in FIG. 13 is illustrated in a quarter cross-sectional illustration, similar as in FIG. 2 and FIG. 9. The function as a cross-linking member and the multiple function, described in greater detail below, of the distance unit Db is intended to be symbolized by the horizontal flat region F in FIG. 13.

As has been described further above in particular with reference to FIG. 2 to FIG. 5, the distance unit Db herein serves firstly as a rotational bearing device by means of which the first sprocket cluster Sc1 in the area of its outboard side is mounted so as to be rotatable in relation to the driver device.

Figures 15A, 15B, 15C:
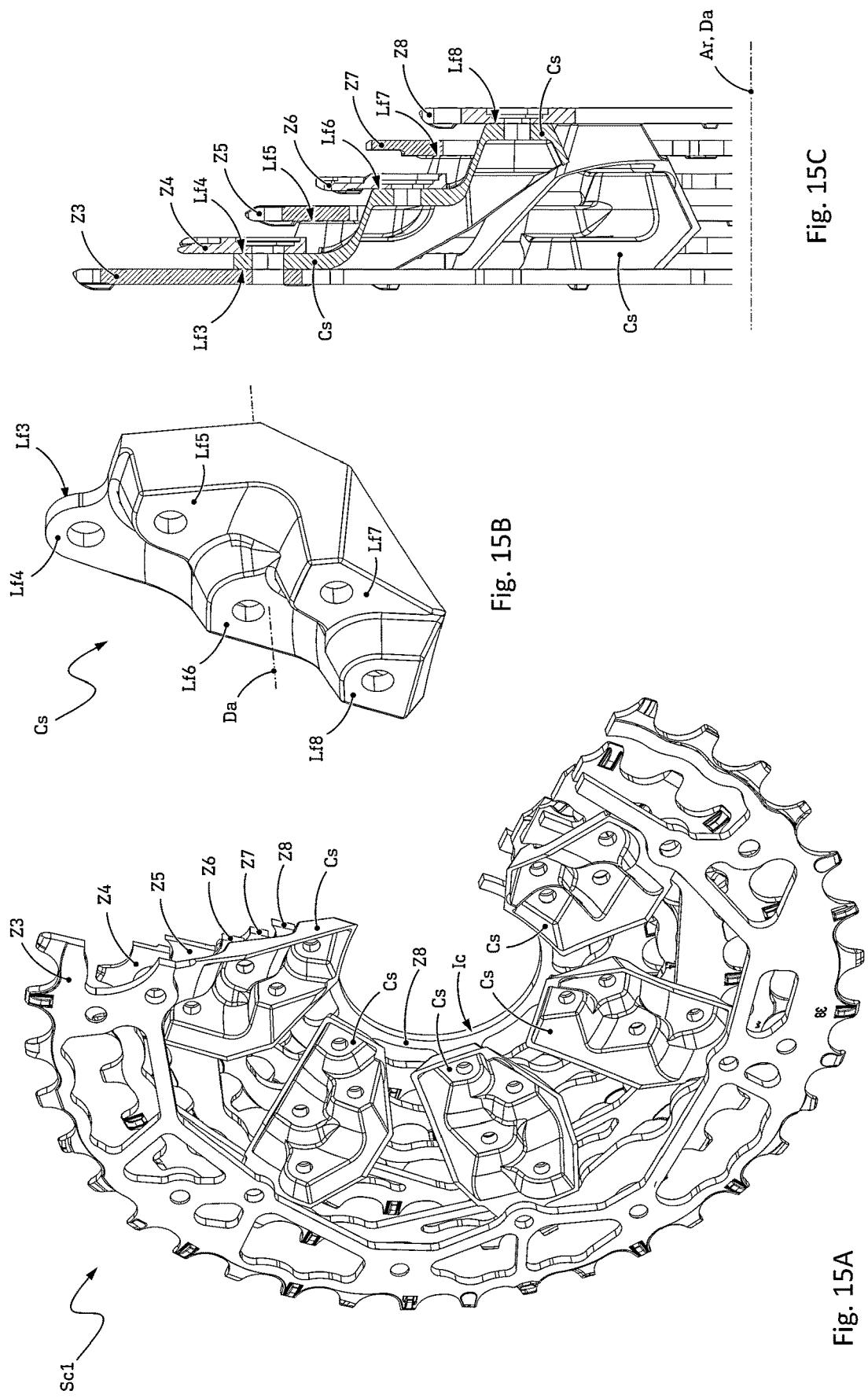
FIGS. 15A-C show an alternative embodiment of a first sprocket cluster of a sprocket assembly according to FIGS. 2 to 14.

The outboard side of the first sprocket cluster Sc1, which is specified for the rotatable mounting on the bearing section Sb of the bearing device Db (cf. FIGS. 2 to 6 and 9), herein is formed by the outboard terminating sprocket Z7 which for this purpose, on its inner circumference, has an inner circumferential area Ic which is configured to correspond in terms of shape to the bearing section Sb of the bearing device Db, thus is likewise configured so as to be substantially in the shape of a cylindrical surface (cf. inner circumferential area Ic in FIG. 10 and FIG. 15A). The rotatable mounting of the first sprocket cluster Sc1 on the inner circumferential area Ic of the outboard terminating sprocket Z7 of the latter is symbolized by the double arrow A in FIG. 13.

It goes without saying that the outboard terminating sprocket Z7 during operation will never rotate about a large angular range of the type indicated by the double arrow A. Rather, the outboard terminating sprocket Z7 will typically rotate by fractions of angular degrees due to the elastic rotational deformation of the first sprocket cluster Sc1, which arises when a drive torque is applied in particular to the outboard sprockets of the first sprocket cluster Cp1, for example when a drive torque is applied to the sprockets Z6 or Z7.

By contrast, in the prior art the first sprocket cluster Sc1 is typically received in a clamping manner on the outboard side in a force flow of the sprocket assembly that runs axially in the direction of the rear axle, and is therefore not rotatably mounted as in the present sprocket assembly Ap. Breakaway effects associated therewith in the prior art lead to the disadvantages set forth in the introduction to the description, for example to undesirable noises such as crunching and squeaking, in particular when the first sprocket cluster is impinged with a drive torque on the outboard side. Owing to the uncontrolled occurrence of the breakaway effects in the prior art, and thus owing to the associated abrupt changes in the force flow in the first sprocket cluster, and owing to the intense vibrations arising therein, this can also compromise the durability of the first sprocket cluster.

These undesirable effects are avoided thanks to the mounting of the first sprocket cluster Sc1 on the rotational bearing device Db so as to be rotatable on the outboard side. When the sprockets of the first sprocket cluster Sc1, in particular the outboard sprockets of the first sprocket cluster Sc1 such as Z6 and Z7, for example, are impinged with a drive torque, the mounting of the first sprocket cluster Sc1 so as to be rotatable on the outboard side leads to the first sprocket cluster Sc1 being able to rotate on the outboard side in a controlled manner by minor angular values and to inherently deform elastically without intense breakaway effects or vibrations being created in the first sprocket cluster Sc1. This improves the durability of the first sprocket cluster Sc1 and prevents undesirable noises such as crunching and squeaking being created. Owing to the durability being improved in this way, the first sprocket cluster Sc1 can also be embodied with generally thinner walls and thus with a lighter weight.

In an advantageous combination of functions, the distance unit Db, in addition to the mounting of the additional sprocket cluster Sc1 so as to be rotational on the outboard side as described above, furthermore serves for establishing the relative distance Da1 between the sprocket spider Sp and the additional sprocket cluster Sc2. This can be clearly seen in FIG. 3, for example, and is explained further above in the associated description of the figure. The relative distance Da1 between the sprocket spider Sp and the further sprocket cluster Sc2 in FIG. 13 is symbolically visualized by a corresponding distance arrow Da1 between the two vertical flat regions B1/Pti and B3/Sc2.

In a furthermore advantageous combination of functions, the distance unit Db serves not only for the mounting of the first sprocket cluster Sc1 so as to be rotational on the outboard side and for establishing and maintaining the relative distance Da1 between the sprocket spider Sp and the additional sprocket cluster Sc2, but also for establishing and maintaining the relative distance Da2 between the sprocket spider Sp and the outboard terminating sprocket Z7 of the first sprocket cluster Sc1. This can be clearly seen in particular in FIG. 5, and is explained in the associated description of the figure. The relative distance Da2 between the sprocket spider Sp and the outboard terminating sprocket Z7 of the first sprocket Sc1 in FIG. 13 is symbolically visualized by a corresponding distance arrow Da2 between corresponding delimitations of the two vertical flat regions B1/Pti and B2/Sc1.

This means that the distance unit Db in an advantageous combination of functions also assumes the task of establishing and maintaining the width Da2 of the first sprocket cluster Sc1 (cf. FIG. 5).

Furthermore, the distance unit Db assumes the task of establishing and maintaining the relative distance Da3 between the outboard side of the first sprocket cluster Sc1 and the inboard side of the second sprocket cluster Sc2. This can be seen in FIGS. 2 to 4, and particularly clearly in FIG. 5, and is explained in the associated description of the figures further above. The relative distance Da3 between the outboard side of the first sprocket cluster Sc1 and the inboard side of the second sprocket cluster Sc2 in FIG. 13 is symbolically visualized by a corresponding distance arrow Da1 between the two vertical flat regions B1/Pti and B3/Pto.

As is explained further above in the description pertaining to FIG. 4, the distance unit Db, in addition to the aforementioned functions of the mounting Sb of the first sprocket cluster Sc1 so as to be rotatable on the outboard side and the establishing and maintaining of the relative distances Da1, Da2, Da3 between the sprocket spider Sp, the first sprocket cluster Sc1 and the second sprocket cluster Sc2, additionally also assumes the function of an axial tensioning element for assembling the sprocket assembly Ap on the driver device Dd.

The distance unit Db serves in particular for transmitting an assembly tensioning force in the axial direction of the rear axle Da between the sprocket spider Sp and the additional sprocket cluster Sc2. In a state of the sprocket assembly Ap in which it is assembled on the driver device Dd, the assembly tensioning force is part of a closed fixing force flow Ff which runs substantially parallel to the rear axle through the driver device Dd and the sprocket assembly Ap, cf. FIG. 4 and the associated description of the figure.

As opposed to the prior art mentioned at the outset, the outboard terminating sprocket Z7 of the first sprocket cluster Sc1 herein is not clamped in the axial force flow Ff, which in the prior art leads to the disadvantages described at the outset, in particular in terms of the generation of noise and durability of the sprocket assembly, but remains rotatable in relation to the driver device Dd by way of a friction which is very minor in comparison to the prior art and independent of the axial preload Ff. This is prevalent in particular when the distance unit Db is composed of plastics material.

In summary, the distance unit Db is configured with an advantageous multiple function as a mounting of the first sprocket cluster Sc1 so as to be rotational on the outboard side as well as for establishing all relative distances Da1, Da2 and Da3, and moreover for transmitting all axial tensioning forces with respect to the rear axle between the sprocket spider Sp, the outboard terminating sprocket Z7 of the first sprocket cluster Sc1 and the second sprocket cluster Sc2.

Owing to these multiple functions, the distance unit Db in the sprocket assembly Ap configured as a modular system according to FIG. 13 thus plays a substantial role in terms of the permanent reliability of the sprocket assembly Ap and the accuracy when shifting gear by means of the rear derailleur Rd, and is moreover a central linking member for the functional groups B1, B2 and B3 of the modular system that are interchangeable in a modular manner.

In terms of the modular system according to FIG. 13 it is moreover to be noted that the embodiment illustrated in FIG. 13 is a sprocket assembly Ap in which all of the sprockets Z1-Z11 are thick-thin sprockets. Using the modular system according to FIG. 13, it is thus possible to combine the most current sprocket technology of the thick-thin sprockets and the standard driver device Dd known for decades, or corresponding standard cassette hubs, and for said modular system in this way to be adapted to almost every bicycle or rear running wheel that has a corresponding standard driver device Dd or standard cassette hub. This applies in an analogous manner also to the sprocket assemblies Ap according to FIG. 2 to FIG. 12B, and FIGS. 14A to 15C.

FIG. 14 shows a further embodiment of a multi-sprocket assembly Ap having a distance unit Db for the mounting Sb of the first sprocket cluster Sc1 so as to be rotatable on the outboard side.

To be seen again are firstly a standard driver device Dd having a driven profile Pd. The sprocket assembly Ap again comprises an inboard terminating sprocket arrangement Pti which here is present in the form of a terminating sprocket Z1, the latter in the industry also being referred to as a spider sprocket because it assumes the function of a sprocket as well as the function of a supporting spider. Presently, the spider sprocket supports its own toothing Z1 as well is the inboard terminating sprocket Z2 of the self-supporting first sprocket cluster Sc1.

Furthermore, the sprocket assembly Ap comprises a first sprocket cluster Sc1 and an outboard terminating sprocket arrangement Pto which here is again present in the form of an additional sprocket cluster Sc2, the latter in the industry also being referred to as a mini cluster in particular when this is an integral sprocket cluster, for example composed of welded individual sprockets.

A closure screw device Sd, which in the industry also is referred to as a lockring, serves for fastening the sprocket assembly Ap on the driver device Dd. The closure screw device Sd here has an external thread Te not shown per se here, which can be screwed into the internal thread Ti of the driver device Dd. This results in a closed fixing force flow Ff running substantially parallel to the rear axle through the driver device Dd and the sprocket assembly Ap, in a similar manner as illustrated in FIG. 4. The fixing force flow Ff holds together the individual constituent parts or modules of the sprocket assembly Ap, and simultaneously ensures that the sprocket assembly Ap is fastened on the driver device Dd, in a manner similar as explained further above in the description pertaining to FIG. 4.

In this embodiment, the first sprocket cluster Sc1 is also mounted outboard so as to be rotatable in relation to the driver device Dd, for which purpose the distance unit Db has a bearing section Sb which may be configured substantially in the shape of a cylindrical surface.

For the mounting of the first sprocket cluster Sc1 so as to be rotatable on the outboard side, the outboard sprocket Z9 of the first sprocket cluster Sc1, has on its inner circumference an inner circumferential area Ic which is configured so as to correspond in terms of shape to the bearing section Sb of the bearing device Db, thus likewise configured substantially in the shape of a cylindrical surface (cf. FIG. 10, FIG. 13 and FIG. 15A).

As opposed to the embodiment according to FIGS. 1 to 13, in which the distance unit Db is integral comprising a substantially cylindrical area as well as a collar stop St, the distance unit Db in the embodiment according to FIG. 14A is configured substantially in two parts to the extent that the collar stop St here is formed by a separate ring element.

The distance unit Db in the embodiment according to FIG. 14A has in particular the further additional function of vibration damping or noise stamping. For this purpose, the distance unit Db is provided with receptacle recesses in which vibration-damping elastomer elements Ee, for example blocks of elastomer or vibration-absorbing foam material, are disposed.

When assembling the sprocket assembly Ap on the driver device Dd, the vibration-damping elastomer elements Ee come to bear on the sprocket arms As of the spider sprocket Pti/Z1 and are clamped between the sprocket arms As and the distance unit Db. In this way, undesirable vibrations can be directed via the sprocket arms As into the vibration-damping elastomer elements Ee and in the latter be converted into heat.

Undesirable vibrations of this type, in particular in the audible sound range, occur in sprocket assemblies Ap, such as those which are the subject matter of the present disclosure, due to the large number of sprockets, due to the large diameter of such sprocket assemblies Ap, and in particular due to the lightweight construction mode of such sprocket assemblies with self-supporting sprocket clusters Sc1, and are often considered to be irritating during the operation of the bicycle.

First sprocket clusters Sc1 of this type, which are configured to be self-supporting, are illustrated in the embodiments of sprocket assemblies Ap according to FIG. 2, FIG. 3, FIG. 5, FIG. 6, FIG. 9, FIG. 13, FIG. 14A and FIG. 15A. The self-supporting sprocket clusters Sc1 shown therein are in this embodiment assembled from individual sprockets Z3 to Z7 (FIG. 2, FIG. 3, FIG. 5, FIG. 6, FIG. 9, FIG. 13) or from individual sprockets Z2 to Z9 (FIG. 14A), respectively, wherein these individual sprockets are connected to one another by pins (or by means of additional consoles in FIG. 15).

Self-supporting sprocket clusters Sc1 of this type, which can for example also be configured as an integral milled part, have the characteristic that such sprocket clusters are connected to other parts or modules of the sprocket assembly only in the area of their two inboard or outboard terminating sprockets, for example connected on the inboard side to a spider sprocket Pti/Z1 as in FIG. 14A, for example, or to a sprocket spider Sp as in FIGS. 2 to 6 and FIGS. 9 and 13, for example. Those sprockets of self-supporting sprocket clusters of this type that are located between the inboard and outboard terminating sprockets are in each case connected only to the adjacent sprocket, this resulting in the self-supporting, conical or frustoconical structure of the sprocket cluster.

An alternative embodiment of a distance unit in comparison to the distance unit Db is the distance unit Db2 in the right-hand area of FIG. 14. This distance unit Db2 also has a vibration-damping elastomer element Ee which in this embodiment is configured as an O-ring. When assembling the sprocket assembly Ap on the driver device Dd, this ring-shaped elastomer element Ee comes to bear on the driver device Dd in a ring-shaped radially inner bearing area of the spider sprocket Pti/Z1 and can in this way contribute towards damping undesirable sound vibrations of the sprocket assembly Ap.

FIG. 14B shows a further embodiment of a distance unit Db3. This distance unit Db3 is again integrally configured, in a manner similar to the distance unit Db according to FIGS. 2 to 5 and FIGS. 9 to 13. It can be seen that the distance unit Db3 has two synchronization extensions Es1, Es2.

The first synchronization extension Es1 forms an extension of the radially inner tooth structure of the distance unit Db3, which points inboard in the axial direction Da and is configured so as to correspond to the shape of the toothed driven profile Pd of the driver device Dd.

Standard driver devices which have been known and used in the industry for decades, such as the driver device Dd according to FIGS. 2 to 9 and FIG. 14A, have a toothed driven profile Pd with a rotational coding. The rotational coding lies in that one of the driven depressions that run in the axial direction Da along the driver device Dd and are disposed so as to be distributed on the outer circumference of the driver device Dd, said driven depressions conjointly forming the toothed driven profile Pd, has larger widths than the remaining driven depressions. In this way, sprockets having an inner toothed profile Pe with a corresponding rotational coding in a corresponding shape can only be attached to the driver device Dd in a specific rotational relative angular position.

This serves the purpose of mutually disposing the shift channels Ci and Co disposed on the sprockets (cf. shift channels Ci and Co in FIG. 2, FIG. 9, FIGS. 12A/B and FIG. 13) in the rotationally correct relative position when assembling the sprocket assembly in order to provide the controlled transition of the chain during a gear shift, and thus to avoid faulty assembling.

The spider sprocket Pti/Z1 of the sprocket assembly Ap according to FIG. 14A however has an inner toothed profile Pe which does not have any rotational coding of this type, because this sprocket spider Pti/Z1, with the exception of the illustrated sprocket assembly Ap, is also largely used without modifications for integral sprocket assemblies or sprocket cassettes. In integral sprocket assemblies or sprocket cassettes, the rotational positioning of the sprocket cassette on the driver device Dd is not relevant because all of the shift channels of all of the sprockets already have the correct rotational relative position in relation to all other sprockets due to the integral configuration of the sprocket cassette. Since the rotational positioning in relation to the driver device Dd is not relevant in the case of integral sprocket cassettes of this type, such integral sprocket cassettes usually have an inner toothed profile Pe without rotational coding, and can thus be pushed onto a driver device Dd in any rotational positioning even when said driver device Dd has a rotationally coded toothed driven profile Pd, as described above.

Prior to assembling on the driver device Dd, the sprocket assembly Ap according to FIG. 14A is composed of at least two separate cassette modules Mc1 and Mc2 which by virtue of the shift channels (cf. for example shift channels Ci and Co in FIG. 2, FIG. 9, FIGS. 12A/B and FIG. 13) present on both cassette modules Mc1 and Mc2 have to be attached to the driver device Dd in a specific rotational relative angular position. However, in the case of the cassette module Mc1 this would not be guaranteed when initially attaching this to the driver device Dd, because the inner toothed profile Pe of the spider sprocket Pti/Z1 of the cassette module Mc1 does not have any rotational coding, as described above.

For this reason, the distance unit Db3 has the synchronization extension Es1. The synchronization extension Es1 forms an axial extension of the rotationally coded inner toothed profile Pe of the distance unit Db3, which is composed of engagement protrusions Ep which run in the axial direction Da and are disposed so as to be distributed on the inner circumference of the distance unit Db3. Specifically, the synchronization extension Es1 forms an axial extension of that engagement protrusion Ep1 of the rotationally coded inner engagement profile Pe that has a larger width than the remaining driven protrusions Ep of the inner toothed profile Pe of the distance unit Db3, and that is therefore provided for engaging in that driven depression of the toothed driven profile Pd of the driver device Dd that correspondingly has a larger width than the remaining driven depressions of the driven profile Pd of the driver device Dd.

In the assembled state of the distance unit Db3, for example on the cassette module Mc1 of the sprocket assembly Ap according to FIG. 14A, the synchronization extension Es1 penetrates the inner toothed profile Pe of the spider sprocket Pti/Z1 of the cassette module Mc1, which is not rotationally coded, and thus transforms the inner toothed profile Pe of the spider sprocket Pti/Z1, which is not rotationally coded, into a rotationally coded inner toothed profile Pe. In this way, the synchronization extension Es1 of the distance unit Db3 ensures that the cassette module Mc1, already at the start of being pushed onto the driver device Db, can be pushed onto the driver device Dd only in the specific, envisaged rotational relative position.

The second synchronization extension Es2 protrudes from the collar stop St of the distance unit Db3 in the axial direction Da inboard. In the assembled state of the distance unit Db3, for example on the cassette module Mc1 of the sprocket assembly Ap according to FIG. 14A, the second synchronization extension Es2 engages in a synchronization notch Ns which is disposed on the outboard end side of the cassette module Mc1, for example on the outboard end side of the outboard terminating sprocket Z7 of the sprocket cluster Sc1. Examples for synchronization notches Ns on an outboard end side of an outboard terminating sprocket Z7 of a sprocket cluster Sc1 can be seen in FIG. 13 and FIG. 17C.

In this way, the second synchronization extension Es2 ensures a correct rotational relative position between the sprocket cluster Sc1 and the distance unit Db3, the latter having its rotationally coded inner toothed profile Pe, in particular during the production of the sprocket assembly, specifically when joining the sprocket cluster Sc1 and the spider sprockets Pti/Z1 by way of the connecting pins Cp. In this production step, the correct rotational relative position of the shift channels Ci and Co (cf. shift channels Ci and Co in FIG. 2, FIG. 9, FIG. 12A/B and FIG. 13) of the sprocket cluster Sc1 and the spider sprocket Pti/Z1 must be ensured before the sprocket cluster Sc1 and spider sprocket Pti/Z1 are connected to one another by means of the connecting pins Cp.

FIG. 15A shows an alternative embodiment of a self-supporting sprocket cluster Sc1. In the self-supporting sprocket cluster Sc1 according to FIG. 15A, the individual sprockets Z3-Z8 are connected to one another not only by connecting pins Cp1, as in the embodiments according to FIG. 2, FIG. 5, FIG. 6, FIG. 9 and FIG. 14A. Additionally or alternatively to the connecting pins Cp1, the individual sprockets Z3-Z8 in the embodiment according to FIG. 15A are connected to one another by way of a plurality of spider consoles Cs.

The connection between the individual sprockets Z3-Z8 and the spider consoles Cs herein can be performed by way of arbitrary connecting elements such as, for example, screws, rivets or pins, which are not illustrated per se in FIGS. 15A to 15C. Alternatively or additionally to connecting elements of this type, the individual sprockets Z3-Z8 can also be connected to the spider consoles Cs by adhesive bonding. The spider consoles Cs here can be composed of metal, or alternatively of non-metallic materials, in particular of a fibre-reinforced plastics material.

The three-dimensional, spatial structure of the spider consoles Cs, which is spatially staged, can be seen in particular in the outboard-side view in FIG. 15B, by way of which structure, when viewed along a direction Da running parallel to the rear axle Ar, six fastening levels Lf3-Lf8 are formed, which are spaced apart axially from one another and on which the six individual sprockets Z3-Z8 come to bear and are fastened.

In this way, a self-supporting sprocket cluster Sc1 is obtained, which has high levels of torsional and flexural stiffness and low mass at the same time.

Figure 16:
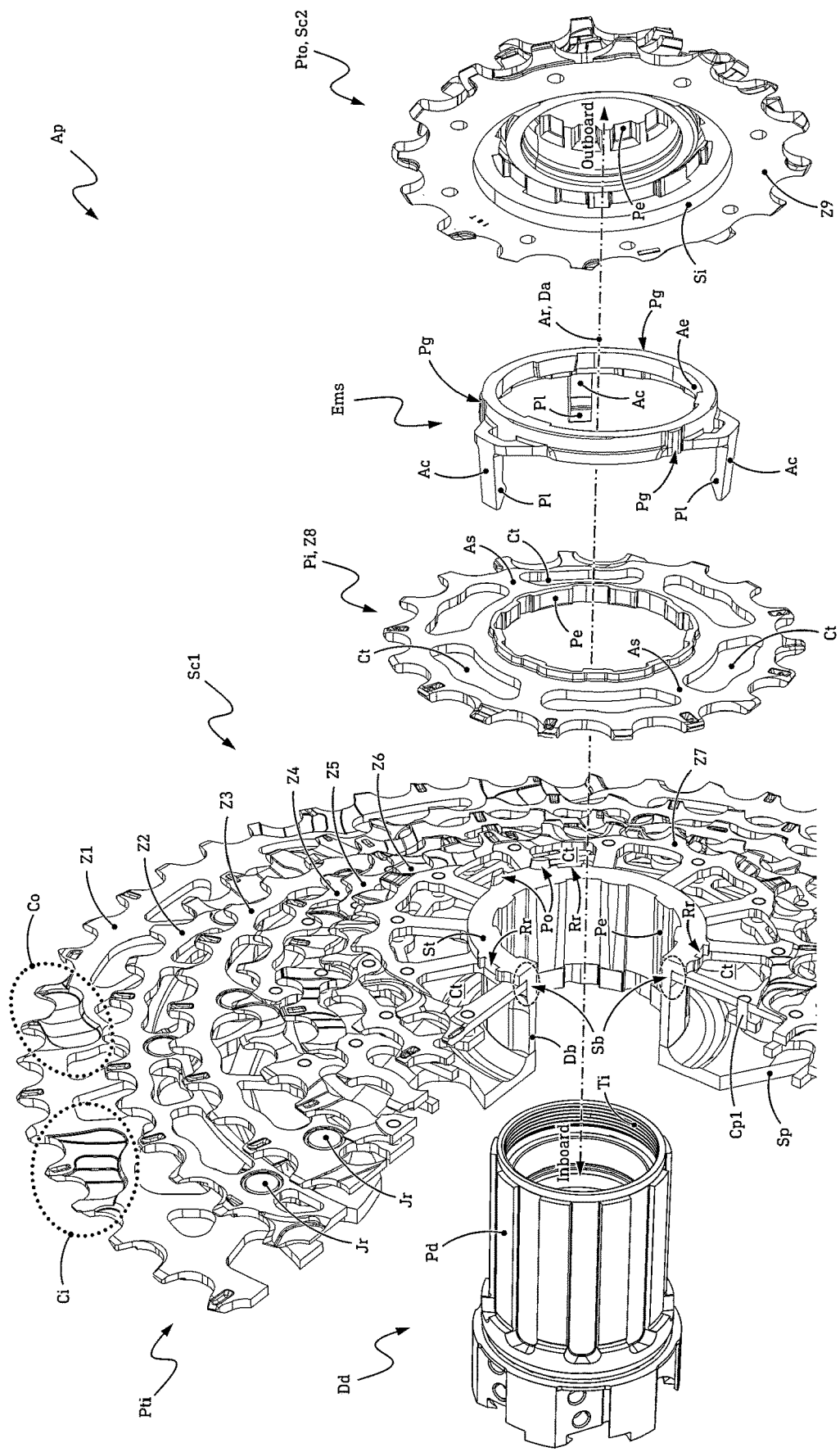
FIG. 16 shows a driver device and further embodiment of a sprocket arrangement in isometric, partially sectioned exploded view similar to FIG. 9.

FIG. 16 shows a further embodiment of a sprocket arrangement Ap in a partially sectioned exploded view similar to FIG. 9. As in FIG. 9, the sprocket arrangement Ap is again shown together with a rear wheel driver device Dd, on which the sprocket arrangement Ap can be mounted in a torque-transmitting manner.

Elements and assemblies corresponding to FIG. 9 are marked in FIG. 16 with the same reference signs as in FIG. 9 and are explained in more detail in the description of FIG. 9.

The essential difference between the embodiment according to FIG. 16 and the embodiment according to FIG. 9, whereby the latter also essentially corresponds to the embodiment according to FIGS. 2 to 8, consists on the one hand in a differently designed individual sprocket Z8 as an additional sprocket device Pi compared to FIG. 9, and on the other hand in the presence of a multi-function spacer element Ems.

The single sprocket Z8 according to FIG. 16 differs from the single sprocket Z8 according to FIGS. 2 to 7 and 9 in that the single sprocket Z8 according to FIG. 16 has an engagement profile Pe on its inner circumference, which is designed in the form of a draw-through produced, for example, by punching or deep drawing. In this way, the width of the contact surface of the engagement profile Pe with the driver device Dd can be significantly widened or enlarged, which reduces the surface pressure between the engagement profile Pe and the gear driven profile Pd arranged on the outer circumference of the driver device Dd. This enables better transmission of high torques between the single sprocket Z8 and the driver device Dd, especially if the single sprocket Z8 and/or the driver device Dd are made of relatively soft light metals instead of steel.

The multi-functional spacer element Ems combines the function of the annular spacer element Ae between the individual sprocket Z8 and the additional sprocket cluster Sc2 (see FIG. 9), on the one hand, and the additional function of connecting all assemblies of the sprocket arrangement Ap to form a unit that can be handled as a single piece, as long as the sprocket arrangement Ap is not mounted on a driver device Dd, for example on a bicycle rear wheel Wr as shown in FIG. 1.

As a combined view of FIGS. 16 and 17A-C shows, the multi-function spacer element Ems engages by means of its three resilient clamping arms Ac through-hole cutouts Ct of the individual sprocket Z8 across the width of the individual sprocket Z8 and across the width of the collar stop St, which is integrally formed here on the bearing device Db.

The three resilient clamping arms Ac of the multi-function spacer element Ems also engage across the width of the outboard-side end sprocket Z7 of the first sprocket cluster Sc1, in that the resilient clamping arms Ac project through corresponding through-hole cutouts Ct of the outboard-side end sprocket Z7.

Latching projections Pl arranged at the inboard end of the resilient clamping arms Ac engage behind the through-hole cutouts Ct of the outboard terminating sprocket arrangement Z7 in such a way that the resilient latching effect of the clamping arms Ac of the multi-function spacer element Ems already holds together all the assemblies of the sprocket arrangement Ap, except for the outboard terminating sprocket arrangement Pto, which is present here as an additional sprocket cluster Sc2.

In other words, the multi-function spacer element Ems holds the outboard-side end sprocket Z7 of the first sprocket cluster Sc1 (which is connected to all other sprockets Z1-Z6 of the first sprocket cluster Sc1 and to the sprocket spider Sp to form a fixed unit Sc1+Pti=Mc1 due to the pinning Cp1 and the rivet joint Jr) together with the single sprocket Z8 and with the rotary bearing device Db in such a way that these components or assemblies, together with the multi-function spacer element Ems, form a unit that can be handled as a single piece.

To additionally accommodate the outboard terminating sprocket arrangement Pto, which is present here in the form of the additional sprocket cluster Sc2, in the aforementioned unit that can be handled in one piece, the multi-function spacer element Ems has at least three clamping projections Pg on an outer circumference. The clamping projections Pg together define an outer diameter which has a certain oversize with respect to a cylindrical inner shoulder Si arranged on an inner circumference of the additional sprocket cluster Sc2, see FIG. 16.

This allows the additional sprocket cluster Sc2 to be pressed or pressed onto the clamping projections Pg of the multi-function spacer element Ems and thus connected to the multi-function spacer element Ems.

In this way, the multi-functional spacer element Ems thus holds the inboard terminating sprocket arrangement Pti, the first sprocket cluster Sc1, the additional sprocket arrangement Pi (here in the form of the intermediate sprocket Z8) and the outboard terminating sprocket arrangement Pto (here in the form of the additional sprocket cluster Sc2) and the bearing arrangement Db together in the form of a unit that can be handled as a single piece, see in particular FIG. 17A.

This is advantageous for most of the handling steps of the sprocket arrangement Ap that follow its production, such as packaging, transportation and logistics, removal from the packaging at the customer's premises and customer-side assembly of the sprocket arrangement Ap on the driver device Dd of a bicycle Rear wheel Wr.

This not only simplifies the handling of the sprocket arrangement Ap, but also prevents incorrect assembly. These could otherwise occur if one or more of the modules or assemblies "cassette module Mc1=inboard terminating sprocket arrangement Pti+first sprocket cluster Sc1", "additional sprocket arrangement Pi", "bearing arrangement Db" and "outboard terminating sprocket arrangement Pto" are assembled by the manufacturer or customer in an incorrect rotational position relative to the other modules or assemblies of the sprocket arrangement Ap. This could significantly impair the power, shifting performance and service life of the sprocket arrangement, or make it impossible to mount the sprocket arrangement AP on the driver device Dd.

The rotational coding or the determination of the rotational relative position of intermediate sprocket Z8 or further sprocket device Pi relative to the outboard-side sprocket Z7 of the first sprocket cluster Sc1 and relative to the bearing device Db by the multifunctional spacer element Ems becomes clear in a synopsis of FIGS. 17A and 17C and is described below. Due to the pinning Cp1 of the intermediate sprocket Z8 and the riveting Jr with all other sprockets Z1-Z6 of the first sprocket cluster Sc1 and with the sprocket spider Sp, this definition of the rotational coding also applies to the entire unit Sc1+Pti=Mc1.

FIG. 17C shows how a synchronization extension Es2 of the bearing device Db, which projects in the axial direction Da inboard from the collar stop St (see FIGS. 2 to 7 and 17A) of the bearing device Db (see also FIG. 14B), engages in a synchronization notch Ns arranged on the outboard-side end face of the cassette module Mc1, for example on the outboard-side end face of the outboard-side end sprocket Z7 of the sprocket cluster Sc1, and thus determines the rotational relative position of the bearing device Db and the cassette module Mc1.

FIG. 17C is based on a highly perspective view in order to be able to clearly recognize all essential elements. The apparent tapering of the bearing device Db in particular in the direction of the inboard is an effect of this perspective view. In fact, the bearing device Db is essentially cylindrical, which can also be seen in most of the other figures, such as FIG. 17A.

At the same time, the multi-function spacer element Ems determines the rotational relative position of bearing device Db and intermediate sprocket Z8 or further sprocket device Pi, in that pairs of orientation protrusions Po, which project outboard in axial direction Da from the collar stop St (see FIGS. 2 to 7 and 17A) of bearing device Db, engage around corresponding sprocket arms As of intermediate sprocket Z8 (see FIG. 17C and FIG. 16).

The grip of the orientation projections Po of the bearing device Db around the sprocket arms As of the intermediate sprocket Z8 simultaneously ensures centering of the intermediate sprocket Z8 relative to the remaining assemblies of the sprocket arrangement Ap, to the driver device Dd and thus to the later rear axle Da of the rear wheel Wr of the bicycle 1, and thus facilitates mounting of the sprocket arrangement Ap on the driver device Dd.

The bearing device Db is responsible for centering the outboard terminating sprocket Z7 of the sprocket cluster Sc1 and thus the entire cassette module Mc1, consisting of the inboard terminating sprocket arrangement Pti and the first sprocket cluster Sc1. For this purpose, the bearing device Db provides a bearing section Sb that is essentially cylindrical in shape and on which the inner diameter of the outboard-side end sprocket Z7 of the sprocket cluster Sc1 comes to rest, see FIGS. 2 to 7 and FIGS. 9, 14A, 16 and 17A.

Finally, radial recesses Rr on the collar stop St of the bearing device Db, which correspond in shape to the resilient clamping arms Ac of the multi-function spacer element Ems, ensure that the rotational relative position between the multi-function spacer element Ems and the bearing device Db is fixed, see FIG. 16.

The interaction of the multi-function spacer element Ems and in particular the elements Es2, Ns, Ac, Rr, Po, As and Db thus ensures the correct rotational relative position and coaxial centering of all modules or assemblies, i.e. of the assemblies "cassette module Mc1=inboard terminating sprocket arrangement Pti+first sprocket cluster Sc1", "additional sprocket arrangement Pi" or "intermediate sprocket Z8", "bearing arrangement Db" and "outboard terminating sprocket arrangement Pto" of the sprocket arrangement Ap. This leads to the advantages already mentioned above with regard to transportation and error-free mounting of the sprocket arrangement Ap on the driver device Dd of the bicycle rear wheel Wr.

In addition to the outboard-side synchronization extension Es2 described above, the bearing device Db of the embodiment of the sprocket arrangement Ap according to FIGS. 16 and 17 can also have an inboard-side synchronization extension Es1, which facilitates the rotationally correct sliding of the sprocket arrangement Ap onto the driver device Dd under certain boundary conditions. This is explained in detail above in the description of FIG. 14B.

FIGS. 18 to 21 show schematic sectional or detailed views, in particular of wide sprocket teeth Tw of a sprocket arrangement Ap as shown in FIGS. 2 to 17, the arrows Rdd in each case indicating the drive rotation direction of the sprocket under driving load from the bicycle chain Cn, see FIG. 1. The sectional or detailed views of sprocket teeth shown in FIGS. 18 to 21 may in particular be wide sprocket teeth Tw of smaller sprockets Z6-Z12 of the sprocket arrangement Ap, as shown for example in FIG. 10. However, the wide sprocket teeth Tw according to FIGS. 18 to 21 can in principle be realized in essentially the same form on each of the sprockets Zx of a sprocket arrangement Ap according to FIGS. 1 to 17C.

The wide sprocket teeth Tw shown in FIGS. 18 to 21 may be wide sprocket teeth Tw of sprockets manufactured using a stamping and pressing process.

The shape of the wide sprocket tooth Tw shown in FIG. 18A essentially corresponds to the shape of the wide sprocket tooth Tw of the sprocket Z6 recognizable in FIG. 10. In accordance with the other figures, which show wide teeth Tw and/or narrow teeth Tn, in FIGS. 18 to 21 the wide teeth Tw are again indicated by small circle markings, and the narrow teeth Tn are again indicated by small square markings.

Similar to FIG. 10, it can also be seen in FIG. 18A that the increased width Ww of the wide teeth Tw compared to the thickness Tb of the sprocket base material (which corresponds to the width of the narrow teeth Tn, see FIG. 10, also recognizable in FIGS. 4 to 7) is produced by the fact that indentations Di are typically made on an end face of the sprocket Zx on the outboard side. The indentations Di lead to a displacement of the material and to corresponding protrusions Dp on the opposite, i.e. typically on the inboard end face of the respective sprocket during the stamping and pressing of the sprocket.

This is also the case with the wide sprocket tooth Tw according to FIG. 18B, which, for example, essentially corresponds to the wide sprocket tooth Tw of the sprocket Z8 recognizable in FIG. 10. The main difference between the wide sprocket tooth Tw according to FIG. 18B and the wide sprocket tooth Tw according to FIG. 18A is that the indentation Di on the outboard side, as well as the protrusion Dp on the inboard side, is asymmetrical along the circumferential direction or direction of rotation Rdd of the sprocket Zx in the case of the wide sprocket tooth Tw according to FIG. 18B. This design has the advantage that the sprocket tooth Tw according to FIG. 18B is less weakened on its load flank side Fl (see also FIG. 10) and has more load-bearing material there.

This is due to the asymmetrical design of the indentation Di and protrusion Dp on the wide sprocket tooth Tw as shown in FIG. 18B and the resulting elimination of the counter embossing Ec on the load flank side, which is still necessary on the wide sprocket tooth Tw as shown in FIG. 18A in order to generate the desired material displacement Di, Dp from the outboard side to the inboard side.

FIG. 18C shows a variant of the wide sprocket tooth Tw as shown in FIG. 18B. In the wide sprocket tooth Tw as shown in FIG. 18C, a counter embossing Ec extending transversely relative to a longitudinal axis of the sprocket tooth extending radially in relation to the sprocket is introduced in such a way that it supports the two side walls Ws of the indentation Di against each other in the circumferential direction of the sprocket Zx with respect to the driving load of the bicycle chain Cn (see FIG. 1). In this way, a sprocket tooth Tw that is particularly resistant to the chain load is obtained as shown in FIG. 18C.

Figure 19A:
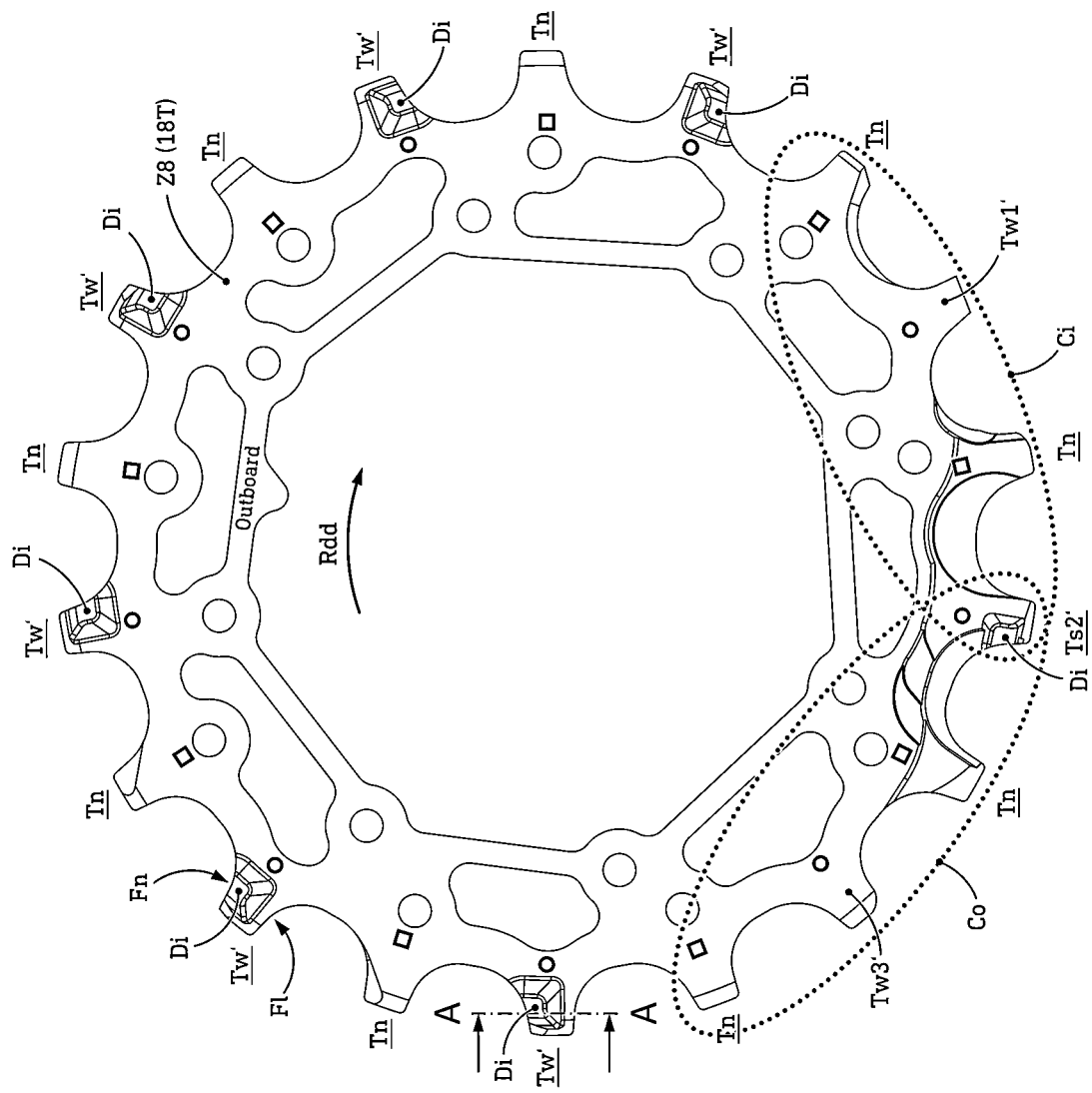
FIG. 19A shows a sprocket of a further embodiment of a sprocket arrangement similar to FIGS. 2 to 17C.

FIG. 19A shows a sprocket Z8 of a further embodiment of a sprocket arrangement according to FIGS. 2 to 17, looking towards the outboard-side end face of the sprocket Z8, i.e. from the same viewing direction as in FIG. 1, for example. The sprocket Z8 is again a sprocket with thick-thin teeth, i.e. with narrow teeth Tn, which can enter both outer link clear widths Wco and inner link clear widths Wci of the bicycle chain (see FIG. 11B), as well as with wide teeth Tw', which can only enter outer link clear widths Wco, but not inner link clear widths Wci of the bicycle chain. In this way, as described in detail above with respect to FIG. 10, advantages are achieved in particular in the stabilization of the chain run and in the shifting behaviour.

The tooth Tw3' of the sprocket Z8 does not have an outboard-side indentation Di, as this tooth is a nominally "wide" tooth Tw, but is located in the area of an outboard shifting lane Co, cf. the also only nominally "wide" teeth Tw1, Tw3 according to FIG. 11A and FIG. 12A+B, which are also located in the area of shifting lanes Co, Ci.

Such teeth Tw1, Tw3, Tw1', Tw3', which are nominally "wide" but arranged in the area of shifting lanes Co, Ci, typically have no outboard-side indentation Di and correspondingly no inboard-side protrusion Dp, since an inboard-side protrusion Dp at least in the inboard-side areas Ri1, Ri2 of the shifting lanes Co, Ci (cf. FIG. 11-12) is undesirable and would interfere with the transition of the chain to the adjacent sprocket during the shifting process, see FIG. 11A and FIG. 12A. The same applies analogously to the also only nominally "wide" tooth Tw1' of the sprocket Z8, which is located in the area of an inboard shifting lane Ci.

Figure 19B:
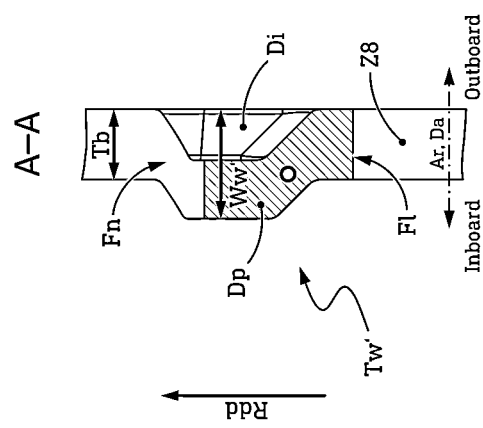
FIG. 19B shows a tooth head of a tooth of the sprocket according to FIG. 19A in schematic sectional view.
Figures 20A, 20B:
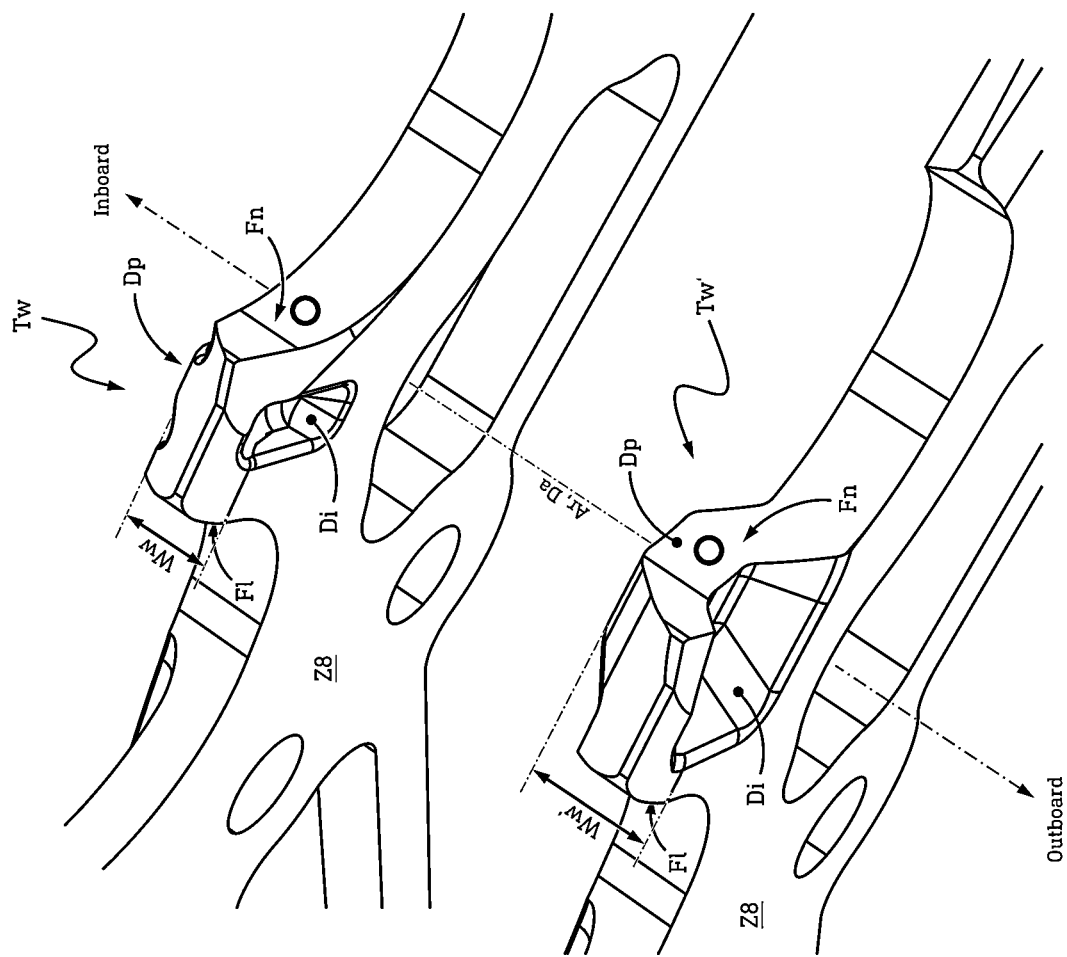
FIGS. 20A and 20B show a schematic comparative representation of the tooth head shape of a sprocket according to FIGS. 19A and 19B with the tooth head shape of a sprocket tooth according to FIG. 18A or FIG. 10.

FIG. 19B shows a wide sprocket tooth Tw' of the sprocket Z8 of FIG. 19A in a sectional view according to the sectional view A-A shown in FIG. 19A. FIG. 20B shows the wide sprocket tooth Tw' of the sprocket Z8 from FIG. 19A in an oblique view. The principle pursued with the wide sprocket tooth Tw' shown in FIG. 19A+B and FIG. 20 and a corresponding tooth geometry can also be found on the wide sprocket tooth Tw of the smallest sprocket Z12 in FIG. 10. In the case of the wide sprocket tooth Tw of sprocket Z12 there, only the inboard/outboard directions are reversed. In other words, on the wide sprocket tooth Tw of the smallest sprocket Z12 there, the indentation Di is on the inboard side and the protrusion Dp is on the outboard side, which serves to optimize the chain run, especially on the smallest sprocket.

In the case of the sprocket Z8 shown in FIGS. 19A, 19B and 20B, the thickness Tb of the sprocket base material again corresponds to the width of the narrow teeth Tn, while the width Ww' of the wide teeth Tw' is again produced by deformation during the punch-pressing of the sprocket Z8 by material displacement Di, Dp from the outboard-side end face of the sprocket Z8 to the inboard-side end face of the sprocket Z8.

A comparison of the tooth shape of the wide tooth Tw according to FIG. 20A (see also FIG. 18A-C) with the tooth shape of the wide tooth Tw' according to FIG. 20B (see also FIG. 19A+B) shows the different arrangement and shape, in particular of the outboard-side indentation Di, which leads to a correspondingly different shape of the inboard-side protrusion Dp on the respective wide tooth Tw or Tw'. In the case of the wide tooth Tw' according to FIG. 20B (see also FIG. 19A+B), this leads in particular to a width Ww' of the wide tooth Tw' which is considerably greater than the width Ww of the wide tooth Tw according to FIG. 20A (see also FIG. 18A-C).

This is due to the fact that the wide sprocket tooth Tw' according to FIG. 20B, which essentially corresponds to the wide sprocket teeth Tw' according to FIG. 19A+B, has a considerably larger-volume and deeper outboard-side indentation Di than the wide sprocket tooth Tw according to FIG. 20A, which essentially corresponds to the wide sprocket tooth Tw according to FIG. 18A. Accordingly, the protrusion Dp on the inboard side of the wide sprocket tooth Tw' according to FIG. 20B and FIG. 19A+B is also considerably larger and wider than that of the wide sprocket tooth Tw according to FIG. 20A and FIG. 18A. The same can be seen when comparing the wide sprocket tooth Tw' according to FIG. 20B, FIG. 19A+B with the wide sprocket teeth Tw according to FIGS. 18B, 18C described above.

The comparatively large-volume and wide protrusion Dp on the inboard side of the wide sprocket tooth Tw' according to FIG. 19A+B and FIG. 20B is achieved by the special shaping of indentation Di and protrusion Dp, which can be clearly seen by looking at FIG. 19A+B and FIG. 20B together. It can be seen that the indentation Di and protrusion Dp of the wide sprocket tooth Tw' shown in FIG. 19A+B and FIG. 20B almost completely enclose the non-load flank Fn of the respective sprocket tooth in the area of material displacement from outboard to inboard.

In contrast, the non-load flank Fn of the wide sprocket teeth Tw according to FIG. 18A-C (similar to the load flank Fl) is located along the rear-axial direction Da at an unchanged basic position within the thickness Tb of the sprocket base material. This means that in the embodiment shown in FIG. 19A+B and FIG. 20B, only a significantly smaller deformation of the sprocket base material is possible.

Figure 21A:
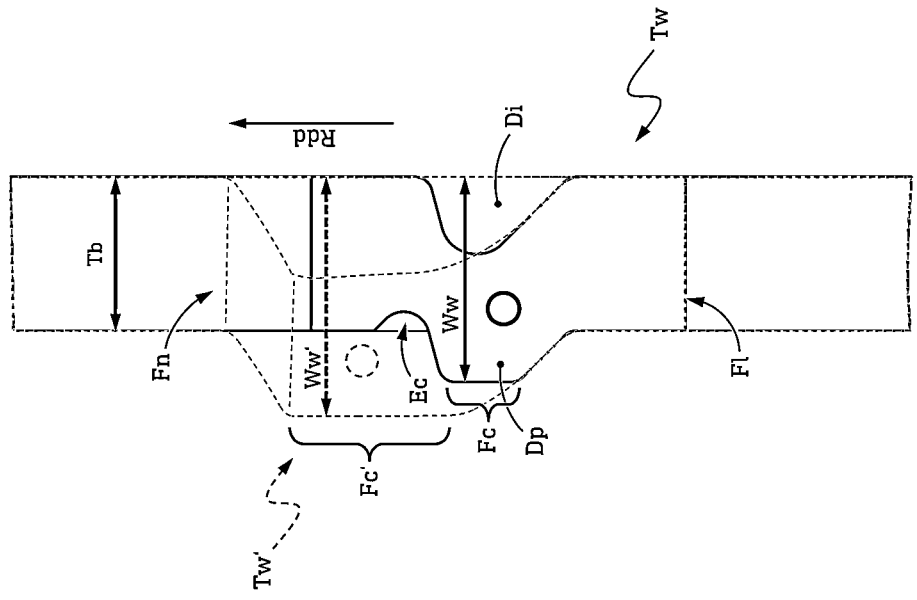
FIGS. 21A and 21B show a schematic comparative representations of the tooth head shape of a sprocket according to FIGS. 19A and 19B with the tooth head shape of a sprocket tooth according to FIG. 18A or according to FIG. 10, or according to FIG. 18B.
Figure 21B:
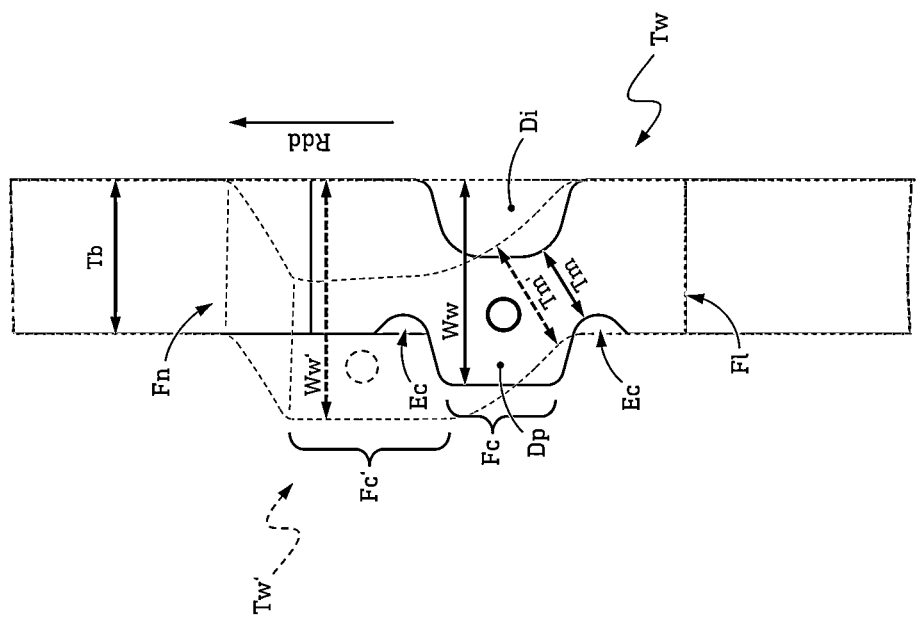

The latter can also be seen again in FIG. 21A and FIG. 21B. FIG. 21A shows a graphic superimposition of the wide tooth Tw according to FIG. 18A and FIG. 20A with the wide tooth Tw' according to FIG. 19A+B and FIG. 20B. FIG. 21B shows a graphic superimposition of the wide tooth Tw according to FIG. 18B with the wide tooth Tw' according to FIG. 19A+B and FIG. 20B.

FIG. 21A and FIG. 21B show that the wide tooth Tw' according to FIG. 19A+B and FIG. 20B (shown in dashed lines in FIG. 21A and FIG. 21B), due to the special design shown in particular in FIG. 20B and described above in the associated description, since it includes the non-load flank Fn into the indentation Di, has a considerably greater width Ww' in relation to the thickness Tb of the sprocket base material than is the case with the wide teeth Tw according to FIG. 18A-C.

Compared to the wide tooth Tw (see FIG. 18A) shown in FIG. 21A with a solid line and its tooth width Ww, the wide tooth Tw' (see FIG. 19A+B and FIG. 20B) shown with a dashed line has a clearly larger width Ww'. This also applies to the wide tooth Tw (see FIG. 18B) shown in FIG. 21B with a solid line. Compared to the wide tooth Tw in FIG. 21A (solid line, see also FIG. 18A and FIG. 20A), the wide tooth Tw' (dashed line in FIG. 21A) also has a greater material thickness Tm' on the side of the load flank Fl, compared to the material thickness Tm of the wide tooth Tw.

In this way, a sprocket Z8 or Zx with wide teeth Tw' according to FIG. 21A+B (cf. FIG. 19A+B and FIG. 20B) can thus achieve particularly good chain guiding properties of the wide teeth Tw'. As described above, in particular in FIG. 11A+B, the wide teeth Tw' are intended to engage exclusively in the outer link clear widths Wco of the outer chain links Lo.

Thanks to the design of the wide teeth Tw' as shown in FIG. 21A+B or FIG. 19A+B and FIG. 20B, the chain is thus guided along the chain movement direction Dmc (see FIG. 1) by narrow and thus particularly effective guiding engagement in the outer link clear widths Wco of the inner chain links Lo in addition to the engagement of the narrow sprocket teeth Tn in the inner link clear width Wci of the inner chain links Li (see FIG. 11A+B).

This also applies in particular to the wide tooth Ts2' positioned at the bottom of the drawing in FIG. 19A, which is located in an overlapping area of the outboard shifting lane Co and inboard shifting lane Ci in the sprocket Z8 with 18 teeth shown there. The tooth Ts2' has a particularly important chain guiding task as a stabilization tooth for the chain run, as the sprocket teeth surrounding the tooth Ts2' are narrowed or even greatly narrowed due to the shifting lanes Ci, Co located there. The corresponding relationships are also explained in detail above in the description of FIG. 11A.

The particularly important guiding task of the tooth Ts2' in the area of the shifting lanes Ci, Co is present regardless of whether an enlarged cross-tooth chain guide dimension Dcw1 is realized on the tooth Ts2' (cf. in particular FIG. 11 and associated description), or whether the tooth Ts2' is a "normal" wide tooth Tw or Tw' whose width Ww or Ww' therefore corresponds to the width Ww or Ww' of the other wide teeth Tw or Tw' of the sprocket Z8 or Zx.

In addition to the larger tooth width Ww' associated with the shaping of the wide teeth Tw' according to FIG. 19A+B, FIG. 20B and FIG. 21A+B (dashed lines), the flat contact surface Fc' of these wide teeth Tw' is also considerably larger than the flat contact surface Fc of the wide sprocket teeth Tw according to FIG. 18A-C, FIG. 20A and FIG. 21A+B (solid lines). This reduces tool wear during sprocket production by stamping. The forming of the non-load flank side Fn, which is not required for the wide teeth Tw' according to FIG. 19A+B, FIG. 20B and FIG. 21A+B (dashed lines) (see FIG. 18A+B), also reduces the forming forces when producing the wide teeth Tw' by inserting the indentations Di and thereby forming the protrusions Dp.

In order to further increase the lateral rigidity of the wide teeth Tw' according to FIG. 19A+B, FIG. 20B and FIG. 21A+B (dashed) under load, stiffening ribs can be introduced in the indentation Di, for example in the form of counter embossings Ec, similar to those described above with reference to FIG. 18C.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed:

1. A multiple sprocket assembly for assembly in a torque-transmitting on a driver of a bicycle rear axle, the driver having a toothed driven profile disposed on an outer circumference of a driver device, the multiple sprocket assembly comprising:
   a plurality of sprocket arrangements having in each case at least one sprocket, the plurality of sprocket arrangements including an inboard terminating sprocket arrangement, a first sprocket cluster configured to be connectable to the inboard terminating sprocket arrangement, and an outboard terminating sprocket arrangement; and
   a rotational bearing device for mounting of the first sprocket cluster so as to be rotatable on an outboard side in relation to the driver device.

2. The multiple sprocket assembly according to claim 1, wherein the rotational bearing device forms a distance unit when the multiple sprocket assembly is assembled on the driver device to establish a relative distance in an axial direction of the bicycle rear axle between at least two of the plurality of sprocket arrangements of the multiple sprocket assembly.

3. The multiple sprocket assembly according to claim 1, wherein the rotational bearing device is configured to transmit an assembly tensioning force in an axial direction of the bicycle rear axle between at least two of the plurality of sprocket arrangements of the multiple sprocket assembly, wherein the assembly tensioning force, when multiple sprocket assembly is assembled on the driver device, is part of a closed force flow running substantially parallel to the bicycle rear axle through the driver device and the multiple sprocket assembly.

4. The multiple sprocket assembly according to claim 3, wherein the rotational bearing device is configured to establish a relative distance in the axial direction of the bicycle rear axle between the inboard terminating sprocket arrangement and the outboard terminating sprocket arrangement, and to transmit the assembly tensioning force between the inboard terminating sprocket arrangement and the outboard terminating sprocket arrangement.

5. The multiple sprocket assembly according to claim 2, wherein the rotational bearing device is configured to establish a relative distance in the axial direction of the bicycle rear axle between the inboard terminating sprocket arrangement and an outboard sprocket of the first sprocket cluster.

6. The multiple sprocket assembly according to claim 3, wherein the rotational bearing device is configured to establish the relative distances in the axial direction of the bicycle rear axle, and to transmit the assembly tensioning forces in the axial direction of the bicycle rear axle between the inboard terminating sprocket arrangement, the outboard terminating sprocket arrangement and an outboard sprocket of the first sprocket cluster.

7. The multiple sprocket assembly according to claim 1, the rotational bearing device is composed of a non-metallic material.

8. The multiple sprocket assembly according to claim 1, wherein the outboard terminating sprocket arrangement comprises an additional sprocket cluster.

9. The multiple sprocket assembly according to claim 8, wherein the additional sprocket cluster is configured as a substantially integral module.

10. The multiple sprocket assembly according to claim 8, wherein the additional sprocket cluster has on an inner circumference engagement profile for engaging in a form-fitting and torque-transmitting manner in the toothed driven profile of the driver device.

11. The multiple sprocket assembly according to claim 8, further comprising a closure screw device configured to engage in an outboard internal thread of the driver device, the closure screw device configured to press the additional sprocket cluster onto the driver device along an axial direction of the bicycle rear axle in relation to the rotational bearing device in such a manner that a closed force flow running substantially parallel to the bicycle rear axle through the driver device and the multiple sprocket assembly is able to be established in order to connect the multiple sprocket assembly and the driver device.

12. The multiple sprocket assembly according to claim 8, wherein the additional sprocket cluster comprises at least one sprocket of which the tooth root diameter is smaller than an outer diameter of the driver device in the area of the driven profile.

13. The multiple sprocket assembly according to claim 8, wherein the additional sprocket cluster comprises at least one sprocket of which a sprocket center plane runs, when the multiple sprocket assembly is assembled on the driver device, outboard, outside an axial end face of the driver device.

14. The multiple sprocket assembly according to claim 1, wherein the multiple sprocket assembly has, in a state in which it is assembled on the driver device, three axial portions mutually spaced apart in an axial direction of the bicycle rear axle, which have in each case on an inner circumference an engagement profile for engaging in a form-fitting and torque transmitting manner in the driven profile of the driver device.

15. The multiple sprocket assembly according to claim 8, wherein disposed in an axial direction of the bicycle rear axle between the first sprocket cluster and the additional sprocket cluster is an additional sprocket arrangement which has on an inner circumference an engagement profile for engaging in a form-fitting and torque-transmitting manner in the toothed driven profile of the driver device.

16. The multiple sprocket assembly according to claim 1, wherein teeth of at least one even-numbered sprocket of the multiple sprocket assembly are assigned in an alternating manner in a circumferential direction to a narrow tooth group or a wide tooth group, wherein the teeth of the narrow tooth group are narrow teeth which are narrower than an inner link clear width of an inner chain link of a bicycle chain assigned to the multiple sprocket assembly, and wherein the wide tooth group comprises at least one wide tooth which is wider than the inner link clear width of the inner chain link and narrower than an outer link clear width of an outer chain link of the bicycle chain.

17. The multiple sprocket assembly according to claim 16 wherein at least one sprocket of the multiple sprocket assembly has in the area of at least one outboard shift channel, at least one stabilization tooth which is assigned to the narrow tooth group and/or at least one stabilization tooth which is assigned to the wide tooth group, and the inboard chain guiding surface of which projects in the inboard direction beyond the inboard chain guiding surface of a widest tooth of the same tooth group in such a manner that the chain when running on the sprocket is deflected inboard by the inboard-projecting inboard chain guiding surface of the at least one stabilization tooth.

18. The multiple sprocket assembly according to claim 16 wherein at least one sprocket of the multiple sprocket assembly has in an area of an inboard shift channel adjacent to the outboard shift channel, at least one stabilization tooth which is assigned to the narrow tooth group and/or at least one stabilization tooth which is assigned to the wide tooth group, and the inboard chain guiding surface of which projects in the inboard direction beyond the inboard chain guiding surface of a widest tooth of the same tooth group in such a manner that the chain when running on the sprocket is deflected inboard by the inboard-projecting inboard chain guiding surface of the at least one stabilization tooth.

19. A modular system for generating multiple sprocket assemblies comprising:
- three functional groups comprising:
  - an inboard terminating sprocket arrangement;
  - a first sprocket cluster; and
  - an outboard terminating sprocket arrangement, wherein the three functional groups are interchangeable in a modular manner, wherein at least one of the three functional groups is able to be assigned to a functional group family of at least two members and, while retaining the other functional groups, is interchangeable with another member of the functional group family which, for example, is made of another material or is of a different manufacturing quality,
- wherein a rotational bearing device for mounting of the first sprocket cluster so as to be rotatable on the outboard side in relation to the driver device, wherein the rotational bearing device is formed by a distance unit which, in a state of the multiple sprocket assembly in which it is assembled on the driver device, is specified to establish the relative distances in an axial direction of the bicycle rear axle and to transmit assembly tensioning forces in the axial direction of the bicycle rear axle between the functional groups.

* * * * *